(12) United States Patent
Chin et al.

(10) Patent No.: US 6,608,625 B1
(45) Date of Patent: Aug. 19, 2003

(54) THREE DIMENSIONAL GRAPHIC PROCESSOR

(75) Inventors: Ken C. Chin, Saratoga, CA (US); Masao Ishiguro, Oume (JP); Keiji Kojima, Kanagawa (JP); Semyon Nisenzon, Palo Alto, CA (US)

(73) Assignees: Hitachi, Ltd., Tokyo (JP); Equator Technologies Inc., Campbell, CA (US)

( * ) Notice: Subject to any disclaimer, the term of this patent is extended or adjusted under 35 U.S.C. 154(b) by 0 days.

(21) Appl. No.: 09/173,289

(22) Filed: Oct. 14, 1998

(51) Int. Cl.[7] .................................................. G06T 1/00
(52) U.S. Cl. ........................................ 345/501; 345/519
(58) Field of Search ................................ 345/501, 505, 345/508, 509, 511, 515, 516, 517, 519, 554, 557, 559

(56) References Cited

U.S. PATENT DOCUMENTS

| | | | | |
|---|---|---|---|---|
| 4,876,651 A | * | 10/1989 | Dawson et al. ............. | 364/449 |
| 4,951,232 A | | 8/1990 | Hannah ...................... | 364/522 |
| 5,005,117 A | | 4/1991 | Ikumi ........................ | 364/200 |
| 5,010,515 A | | 4/1991 | Torborg, Jr. ............... | 364/931 |
| 5,111,425 A | | 5/1992 | Takeuchi et al. .......... | 395/425 |
| 5,276,836 A | | 1/1994 | Fukumaru et al. ......... | 395/425 |
| 5,301,351 A | | 4/1994 | Jippo ........................ | 395/800 |
| 5,303,339 A | | 4/1994 | Ikuma ....................... | 395/132 |
| 5,392,392 A | | 2/1995 | Fischer et al. ............ | 395/162 |
| 5,412,488 A | | 5/1995 | Ogata ....................... | 358/455 |
| 5,442,747 A | * | 8/1995 | Chan et al. ................ | 395/164 |
| 5,442,802 A | | 8/1995 | Brent et al. ........... | 395/200.08 |
| 5,461,266 A | | 10/1995 | Koreeda et al. ........... | 307/125 |
| 5,483,642 A | | 1/1996 | Okazawa et al. .......... | 395/306 |
| 5,493,644 A | | 2/1996 | Thayer et al. ............. | 395/163 |
| 5,506,973 A | | 4/1996 | Okazawa et al. .......... | 395/306 |
| 5,557,733 A | * | 9/1996 | Hicok et al. .............. | 395/162 |
| 5,561,820 A | | 10/1996 | Bland et al. ............... | 395/847 |
| 5,602,984 A | * | 2/1997 | Mieras ...................... | 395/501 |
| 5,646,651 A | | 7/1997 | Spannaus et al. .......... | 345/185 |
| 5,655,131 A | | 8/1997 | Davies ................... | 395/800.34 |
| 5,655,151 A | | 8/1997 | Bowes et al. .............. | 395/842 |
| 5,664,218 A | | 9/1997 | Kim et al. ................. | 395/821 |
| 5,668,956 A | | 9/1997 | Okazawa et al. .......... | 395/306 |
| 5,673,380 A | | 9/1997 | Suzuki ...................... | 395/173 |
| 5,675,808 A | | 10/1997 | Gulick et al. .............. | 395/750 |
| 5,682,513 A | | 10/1997 | Candeleria et al. ........ | 395/440 |

(List continued on next page.)

FOREIGN PATENT DOCUMENTS

| | | |
|---|---|---|
| EP | 0817128 | 1/1998 |
| GB | 2297018 | 7/1996 |

OTHER PUBLICATIONS

"Talisman: Commodity Realtime 3D Graphics for the PC", *Computer Graphics Proceedings, Annual Conference Series*, 1996.

"Exemplar System Architectgure," *Technical Computing*, A Hewlett Packard Web Page, 1997.

International Search Report dated Jan. 12, 2000.

*Primary Examiner*—Mark Zimmerman
*Assistant Examiner*—Enrique L Santiago
(74) *Attorney, Agent, or Firm*—Sofer & Haroun, LLP

(57) ABSTRACT

A multimedia processor for performing three dimensional graphics processing in an integrated circuit comprises a microprocessor circuit which is configured to generate triangle set-up information corresponding to a plurality of triangles that define a three-dimensional object displayed on a screen. The screen is defined by a plurality of bins having a predetermined number of pixels. A data cache is coupled to the microprocessor and configured to store the set-up information. A three-dimensional triangle rasterizer is coupled to the data cache and configured to perform bin allocation to the triangles so as to identify all bins that intersect with a triangle on the screen.

22 Claims, 29 Drawing Sheets

U.S. PATENT DOCUMENTS 5,867,166 A * 2/1999 Myhrvold et al. .......... 345/419
5,870,097 A * 2/1999 Snyder et al. .............. 345/426
5,898,437 A * 4/1999 Deolaliker ................. 345/421
5,995,121 A * 11/1999 Alcorn et al. ............... 345/520
5,999,183 A * 12/1999 Kilgariff et al. ............ 345/418
6,016,151 A * 1/2000 Lin ............................ 345/430
6,084,599 A * 7/2000 Nakatsuka et al. ......... 345/501
6,262,748 B1 * 7/2001 Deering et al. ............. 345/519
6,347,344 B1 * 2/2002 Baker et al. ................ 345/501

* cited by examiner

SEND PHASE

RESPONSE PHASE

THREE DIMENSIONAL GRAPHIC PROCESSOR

FIELD OF THE INVENTION

The present invention relates to a data processor having various modules, and more specifically to a graphic module for processing three dimensional, 3D, images.

BACKGROUND OF THE INVENTION

During the recent years, the demand for high quality 3D graphics and animation has been steadily increasing, as the cost for computer hardware is lowering. Two important design constraints in implementing 3D graphics architecture is memory bandwidth and system latency. The third factor is memory cost.

The bandwidth requirements to implement a 3D graphics system depends on the complexity of the system. Typically, 3D graphic systems include multiple modules in a pipe-lined architecture, such as geometry transformation, lighting transformation, shading or rasterizing by interpolation, texture mapping and texture filtering.

The geometry transformation is the process of transforming the model of a three dimensional object in a three dimensional space into a two dimensional screen space. This process includes the steps of defining the three dimensional model by a plurality of polygons, such as triangles, and transforming these polygons into a two dimensional space.

The geometry of lighting transformation or lighting, is the process of representing the intensity of light reflections from the three dimensional model to a two dimensional screen space. A three dimensional model receives light from a plurality of light sources and colors. It is necessary to mathematically express color reflections and lighting. The reflection intensity depends among other things on such parameters as distance of the light source, angle of light incidence, luminance and color effects of the light sources. Typically, the transformation is accomplished only at the three nodes of each triangle and not the pixels within each triangle. Once a triangle and its lighting at three nodes is defined in the two dimensional screen space, the pixels within the triangle are defined by an interpolation process, wherein the three nodes function as boundary conditions. This shading by interpolation technique is also referred to as Guraugh shading.

The texture mapping process provides a mechanism to represent the texture of a three dimensional model. Thus, a texture space is defined in a two dimensional space by two coordinates referred to as horizontal coordinate (u) and a vertical coordinate (v). Each pixel in the texture space is called a texel. Information relating to each texel is stored in an external memory, which can be mapped to the nodes of a corresponding triangle in response to a fetch texel command. The texel color is then blended with the shading color described above resulting in the final color for each node of each triangle. Again a shading by interpolation is employed to find the shades of pixels inside each triangle.

As mentioned above, conventional microprocessor based systems employing 3D graphics processing have experienced bandwidth limitations. For example, a microprocessor, such as X-86 is coupled to a 3D graphics chip via a PCI bus. An external memory stores information relating to the 3D model. The microprocessor performs the geometry and lighting calculations and transfers the results, which are information relating to the nodes of each triangle, via the PCI bus to the 3D graphics chip.

The 3D graphics chip includes a slope calculator that measures the slope of each side of the triangle. An interpolator calculates the shading colors of each pixel within a triangle based on the measured slopes. A texturing unit measures the textures of each pixel within the triangle based on the measured slopes and on the information stored in the texture map.

A separate frame buffer memory is employed to store the texture maps described above. Each texture map corresponds to the texture of an element used in the image. Furthermore, the frame buffer memory includes a separate buffer space referred to as a Z-buffer. The Z-buffer is employed to remove the hidden parts of a triangle when it is not intended to be displayed. Thus, when a plurality of objects are overlapped, invisible planes need to be removed in order to determine which edges and which planes of which objects are visible and display only the visible planes. Conventionally, various algorithms are employed for removing invisible planes as described in *Fundamentals of Interactive Computer Graphics*, J. D. Foley and A. Vandam (Addisson Wesley 1982), and incorporated herein by reference.

The Z-buffer stores, a Z-value, or a depth value of each pixel that needs to be displayed on a screen. Then, a Z-value of each point having x, y coordinate values, within a triangle is calculated and the obtained calculation result is compared with the Z-value corresponding to x,y coordinates. When the Z-value of a point is larger than the stored Z-value that point is considered to be hidden.

Thus, the microprocessor based system described above divides the graphics processing functions between the microprocessor and the 3D graphics chip. The microprocessor does the geometry and lighting steps, and provides triangle data to the graphics chip via the PCI bus. A typical graphics processing operation requires the processing of 1M triangles/sec. Each triangle contains about 50–60 bytes of information. This information includes, the x,y,z coordinates of each node, the color values, R,G, B, the texture values, u,w for each of the three nodes. Thus when each coordinate and color and texture value is represented by 4 bytes of information, the three nodes of each triangle may be defined by 96 (32×3) bytes of information This relates to a data transfer of 96 M bytes/sec from the microprocessor to the 3D graphics chip. Thus, the PCI bus may experience severe bottle necking.

Another bandwidth limitation in implementing 3D graphics processing is data transfers from frame buffers to the 3D graphics chip. Usually, a typical model space may include 2–4 objects overlapping in each area. Thus, shading and texturing may be done 2–4 times in conjunction with Z buffering. For a 60 frame per second display, the data transfer rate between the frame buffer and 3D graphics chip is about 720 M bytes/sec (96 bytes/triangle×1024 pixels/line×768 lines×3 (shadings)×60 frames/sec), without the Z-buffering. For Z-buffering, this transfer rate is twice as high (1440 M bytes/sec) because of the read and write operation involved in Z-buffering. Texel fetching also requires a data transfer rate of 360 Mbytes/sec. Such data transfer rates are not feasible with the current memory technology. Thus, current 3D graphics arrangements employ substantially lower resolutions, which would not lead to realistic images.

Thus, there is a need to reduce the bandwidth delays associated with transfer of data from a microprocessor to a 3D graphics chip and bandwidth delays associated with transfer of data from an external memory to the microprocessor local memory.

SUMMARY OF THE INVENTION

In accordance with one embodiment of the invention in an integrated circuit, a multimedia processor for performing three dimensional graphics processing includes a microprocessor that generates triangle set-up information corresponding to a plurality of triangles that define a three dimensional object displayed on a screen. The screen is defined by a plurality of bins having a predetermined number of pixels. A data cache is coupled to the microprocessor configured to store the set-up information. A three dimensional triangle rasterizer is coupled to the data cache so as to perform bin allocation to the triangles for the purpose of identifying all bins that intersect with a triangle on the screen.

In accordance with another embodiment of the invention, the data cache includes a tile index buffer, that stores information relating to each one of the bins The three dimensional triangle rasterizer includes a binning unit that provides tile data information to a local memory unit. It also includes a screen coordinate interpolator, that provides the coordinates of intersecting pixels along the sides of each triangle that cross a span line as defined by the binning unit. The binning unit provides a tile data information corresponding to the identification of each triangle in a bin. The binning unit divides each one of the triangles into an upper and a lower sub triangles along a horizontal line crossing the middle vertex of each one of the triangles. Thereafter the binning unit identifies the bins in which each one of the er triangles is located by employing the condition $$X=[\min 2(\text{Cross}XAC, \text{Cross}XAC+dxdy\,AC), \max 2\,(\text{Cross}XAB, \text{Cross}\,XAB+dxdyAB)]$$

wherein, Cross XAC is the x coordinate of the cross point between the edge AC of a triangle ABC, and the next span, and, Cross XAB is the x coordinate of the cross point between the edge AB and the next span.

Furthermore, the binning unit identifies the bins in which each one of the lower triangles is located by employing the condition $$X=[\min 2(\text{Cross } XAC, \text{Cross } XAC+dxdyAC), \max 3\,(\text{Cross } XAB, Bx, \text{Cross } XBC)],$$

wherein Cross XAC is the x coordinate of the cross point between the edge AC of a triangle ABC, and the next span, CrossXBC is the x coordinate of the cross point between BC and the next span.

A memory unit is coupled to the data cache to store the tile index information. A data streamer is coupled to the memory unit and the data cache so as to transfer data.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1A:
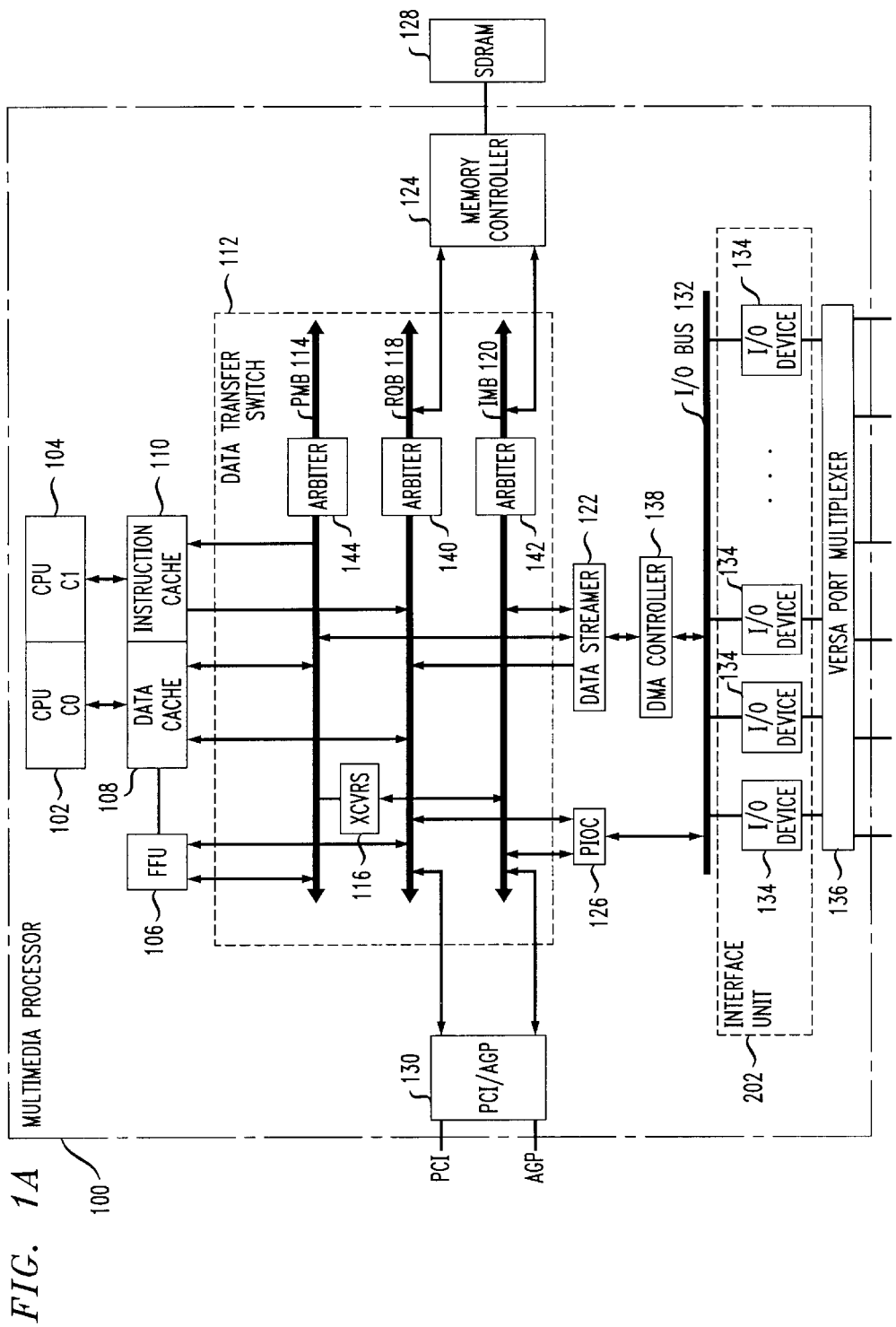
FIG. 1(a) is a block diagram of a multimedia processor system in accordance with one embodiment of the present invention.

In accordance with one embodiment of the present invention, a multimedia processor 100 is illustrated in FIG. 1, although the invention is not limited in scope in that respect. Multimedia processor 100 is a fully programmable single chip that handles concurrent operations. These operations may include acceleration of graphics, audio, video, telecommunications, networking and other multimedia functions. Because all the main components of processor 100 are disposed on one chip set, the throughput of the system is remarkably better than those of the conventional systems as will be explained in more detail below.

Multimedia processor 100 includes a very-long instruction word (VLIW) processor that is usable in both hosted and hostless environment. Within the present context a hosted environment is one where multimedia processor 100 is coupled to a separate microprocessor such as INTEL® X-86, and a hostless environment is one which multimedia processor 100 functions as a stand-alone module. The VLIW processor is denoted as central processing unit having two clusters CPU 102 and CPU 104. These processing units 102 and 104 respectively allow multimedia processor 100, in accordance with one embodiment of the invention, operate as a stand-alone chip set.

The operation of the VLIW processor is well-known and described in John R. Ellis, *Bulldog: A Compiler for VLIW Architectures,* (The MIT Press, 1986) and incorporated herein by reference. Basically, a VLIW processor employs an architecture which is suitable for exploiting instruction-level parallelism (ILP) in programs. This arrangement allows for the execution of more than one basic (primitive) instruction at a time. These processors contain multiple functional units, that fetch from an instruction cache a very-long instruction word containing several primitive instructions, so that the instructions may be executed in parallel. For this purpose, special compilers are employed which generate code that has grouped together independent primitive instructions—executable in parallel. In contrast to superscalar processor, VLIW processors have relatively simple control logic, because they do not perform any dynamic scheduling nor reordering of operations. VLIW processors have been described as a successor to RISC, because the VLIW compiler undertakes the complexity that was imbedded in the hardware structure of the prior processors The instruction set for a VLIW architecture tends to consist of simple instructions. The compiler must assemble many primitive operations into a single "instruction word" such that the multiple functional units are kept busy, which requires enough instruction-level parallelism (ILP) in a code sequence to fill the available operation slots. Such parallelism is uncovered by the compiler, among other thins, through scheduling code speculatively across basic blocks, performing software pipelining, and reducing number of operations executed.

An output port of VLIW processor 102 is coupled to a data cache 108. Similarly, an output port of VLIW processor 104 is coupled to an instruction cache 110. Output ports of data cache 108 and instruction cache 110 are in turn coupled to input ports of a data transfer switch 112 in accordance with one embodiment of the present invention. Furthermore, a fixed function unit 106 is disposed in multimedia processor 100 to handle three dimensional graphical processing as will be explained in more detail. Output ports of fixed function unit 106 are also coupled to input ports of data transfer switch 112, as illustrated in FIG. 1. Fixed function unit 106 is also coupled to an input port of data cache 108. The arrangement and operation of the fixed function unit in conjunction with the data cache is described in more detail in reference with FIGS. 20–26. The arrangement and the operation of data cache 108 in accordance with one embodiment of the invention is described in more detail below in reference with FIGS. 17 and 19.

As illustrated in FIG. 1(a), all of the components of multimedia processor 100 are coupled to data transfer switch 112. To this end, various ports of memory controller 124 are coupled to data transfer switch 112. Memory controller 124 controls the operation of an external memory, such as SDRAM 128. Data transfer switch 112 is also coupled to a data streamer 122. As will be explained in more detail below, data streamer 122 provides buffered data movements within multimedia processor 100. It further supports data transfer between memory or input/output I/O devices that have varying bandwidth requirements. In accordance with one embodiment of the present invention, memory devices handled by data streamer 122 may include any physical memory within the system that can be addressed, including external SDRAM 128, data cache 108, and memory space located in fixed function unit 106.

Furthermore, data streamer 122 handles memory transfers to host memory in situations where multimedia processor 100 is coupled to a host processor via a PCI bus as described in more detail below in reference with FIG. 1(c). To this end, multimedia processor 100 also includes a PCI/AGP interface 130, having ports that are coupled to data transfer switch 112. PCI/AGP interface 130 allows multimedia processor 100 communicate with a corresponding PCI bus and AGP bus that employ standard protocols respectively known as PCI Architecture Specification Rev. 2.1 (published by the PCI Special Interest Group), and incorporated herein by reference, and AGP Architecture Specification Rev. 1.0, and incorporated herein by reference.

Multimedia processor 100 can function as either a master or a slave device when coupled to either PCI or AGP (Accelerated Graphics Port) bus via interface unit 130. Because the two buses can be coupled to multimedia processor 100 independent from each other, multimedia processor 100 can operate as the bus master device on one channel and a slave device on the other. To this end multimedia processor 100 appears as a multifunction PCI/AGP device, when it operates as a slave device from the point of view of a host system.

Data streamer 122 is also coupled to an input/output I/O bus 132 via a direct memory access, DMA, controller 138.

A plurality of I/O device controllers 134 are coupled also to I/O bus 132. In accordance with one embodiment of the present invention, the output ports of I/O device controllers 134 are coupled to input ports of a versa port multiplexer 136.

A programmable input/output controller (PIOC) 126 is coupled to data transfer switch 112 at some of its ports and to I/O bus 132 at other of its ports.

In accordance with one embodiment of the invention, I/O device controllers 134 together define an interface unit 202 that is configured to provide an interface between multimedia processor 100 and the outside world. As will be explained in more detail in reference with FIG. 1(b), multimedia processor 100 can be configured in a variety of configurations depending on the number of I/O devices that are activated at any one time.

As illustrated in FIG. 1(a), data transfer switch 112 includes a processor memory bus (PMB) 114, which is configured to receive address and data information from fixed function unit 106, data cache 108 and instruction cache 110 and data streamer 122.

Data transfer switch 112 also includes an internal memory bus (IMB) 120, which is configured to receive address and data information from memory controller 124, data streamer 122, programmable input/output (I/O) controller 126, and a PCI/AGP controller 130.

Data transfer switch 112 also includes a request bus 118, which is configured to receive request signals from all components of multimedia processor 100 coupled to the data transfer switch.

Data transfer switch 112 also includes a switchable transceiver 116, which is configured to provide data connections between processor memory bus (PMB) 114 and internal memory bus (IMB) 120. Furthermore, data transfer switch 112 includes three bus arbiter units 140, 142 and 144 respectively. Thus, a separate bus arbitration for request and data buses is handled, based on system needs as explained in detail below. Furthermore, as illustrated in FIG. 1(a), whereas different components in multimedia processor 100 are coupled to either processor memory bus 114 or internal memory bus 120 as separate groups, data streamer 122 is coupled to both memory buses directly. In accordance with one embodiment of the present invention, both processor memory bus 114 and internal memory bus 120 are 64 bits or 8 bytes wide, operating at 200 MHZ for a peak bandwidth of 1600 MB's each.

In accordance with one embodiment of the invention, each bus arbiter, such as 140, 142 and 144, includes a four level first-in-first-out (FIFO) buffer in order to accomplish scheduling of multiple requests that are sent simultaneously. Typically, each request is served based on an assigned priority level.

All of the components that are coupled to data transfer switch 112 are referred to as a data transfer switch agent. Furthermore, a component that requests to accomplish an operation is referred to in the present context as an initiator or bus master. Similarly, a component that responds to the request is referred to in the present context as a responder or a bus slave. It is noted that an initiator for a specific function or at a specific time may be a slave for another function or at another time. Furthermore, as will be explained in more detail, all data within multimedia processor 100 is transmitted using one or both of data buses 114 and 120 respectively.

The protocol governing the operation of internal memory bus (IMB) and processor memory bus (PMB) is now explained in more detail. In accordance with one embodiment of the present invention, request buses 114, 118 and 120 respectively, include signal lines to accommodate a request address, which signifies the destination address. During a request phase the component making a request is the bus master, and the component located at the destination address is the bus slave. The request buses, also include a request byte read enable signal, and a request initiator identification signal, which identifies the initiator of the request.

During a data transfer phase, the destination address of the request phase becomes the bus master, and the initiating component during the request phase becomes the bus slave. The buses also include lines to accommodate for a transaction identification ID signal, which are uniquely generated by a bus slave during a data transfer phase.

Additional lines on the buses provide for a data transfer size, so that the originator and the destination end points can keep a track on the size of the transfer between the two units. Furthermore, the buses include signal lines to accommodate for the type of the command being processed.

Figure 1B:
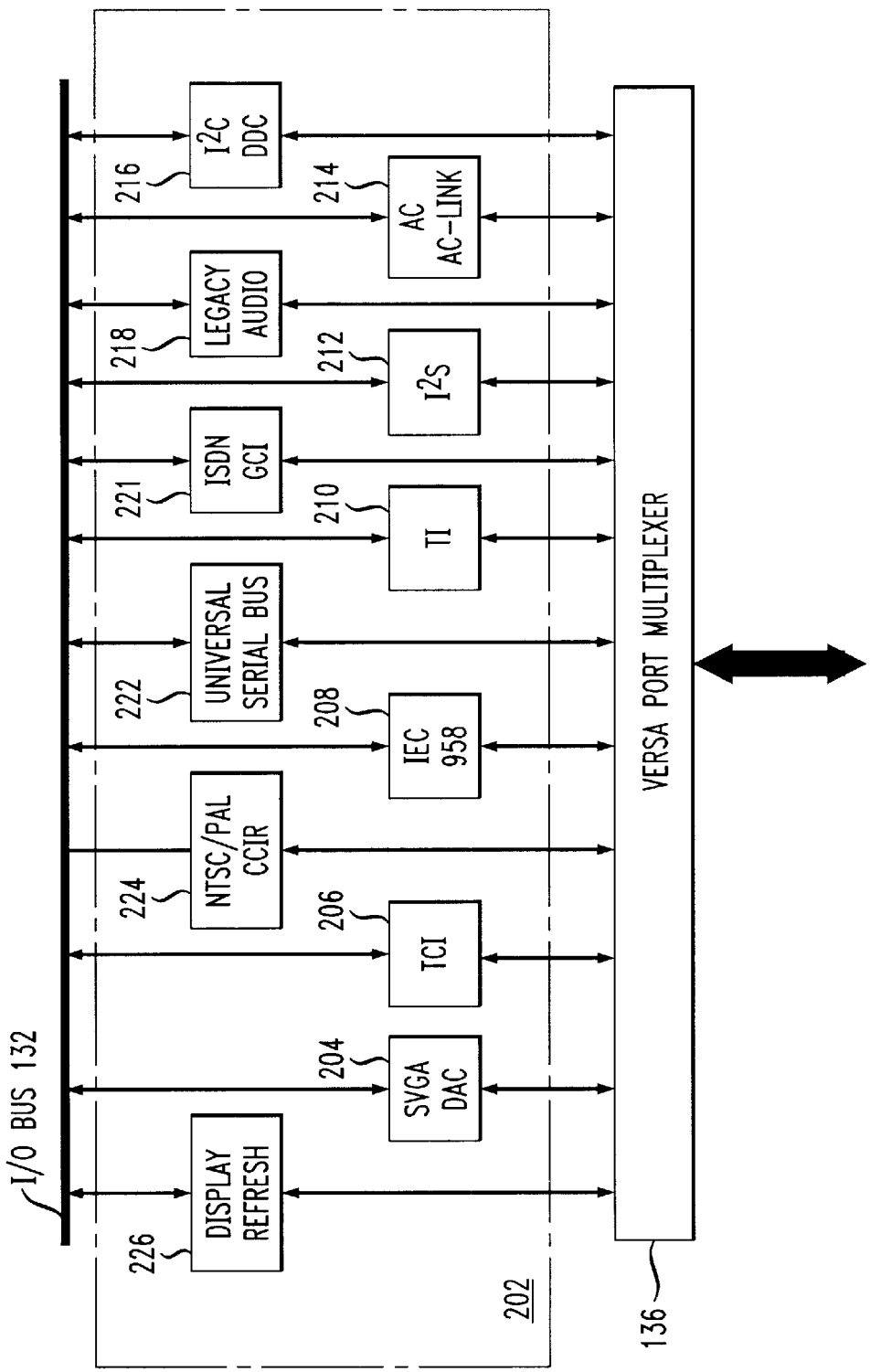
FIG. 1(b) is a block diagram of an input/output (I/O) unit of the multimedia processor system illustrated in FIG. 1(a)

The operation of interface unit 202 in conjunction with multiplexer 136 is described in more detail hereinafter in reference with FIG. 1(b).

INTERFACE UNIT & MULTIPLEXER

Multimedia processor 100 enables concurrent multimedia and I/O functions as a stand alone unit or on a personal computer with minimal host loading and high media quality. Multiplexer 136 provides an I/O pinset which is software configurable when multimedia processor 100 is booted. This makes the I/O functions flexible and software upgradable. The I/O pinset definitions depend on the type of I/O device controller 134 being activated.

Thus, in accordance with one embodiment of the invention, the I/O interface units configured on multimedia processor 100 can be changed, for example, by loading a software upgrade and rebooting the chip. Likewise as new standards and features become available, software upgrades can take the place of hardware upgrades.

I/O interface unit includes an NTSC/PAL encoder and decoder device controller 224, which is coupled to I/O bus 132 and multiplexer 136. ISDN GCI controller unit 220 is also coupled to I/O bus 132 and multiplexer 136. Similarly a T1 unit 210 is coupled to I/O bus 132 and multiplexer 136. A Legacy audio signal interface unit 218 is coupled to I/O bus 132 and multiplexer 136, and, is configured to provide audio signal interface in accordance with an audio protocol referred to as Legacy. Audio codec unit 214 is configured to provide audio-codec interface signals. Audio codec unit 214 is coupled to I/O bus 132 and multiplexer 136. A universal serial bus (USB) unit 222 is coupled to I/O bus 132 and multiplexer 136. USB unit 222 allows multimedia processor 100 communicate with a USB bus for receiving control signals from, for example, keyboard devices, joy sticks and mouse devices. Similarly, an IEC958 interface 208 is coupled to I/O bus 132 and multiplexer 136.

An I$^2$S (Inter-IC Sound) interface 212 is configured to drive a digital-to-analog converter (not shown) for home theater applications. I$^2$S interface is commonly employed by CD players where it is unnecessary to combine the data and clock signals into a serial data stream. This interface includes separate master clock, word clock, bit clock, data and optional emphasis flag.

An I$^2$C bus interface unit 216 is configured to provide communications between multimedia processor 100 and external on-board devices. The operation of IIC standard is well known and described in Phillips Semiconductors *The I²C-bus and How to Use it (including specifications)* (April 1995), and incorporated herein by reference.

Bus interface unit 216 operates in accordance with a communications protocol known as display data channel interface (DDC) standard. The DDC standard defines a communication channel between a computer display and a host system. The channel may b e used to carry configuration information, to allow optimum use of the display and also, to carry display control information. In addition, it may be used as a data channel for Access bus peripherals connected to the host via the display. Display data channel standard calls for hardware arrangements which are configured to provide data in accordance with VESA (Video Electronics Standard Association) standards for display data channel specifications.

The function of each of the I/O device controllers mentioned above is described in additional detail hereinafter.

RAMDAC or SVGA DAC interface 204] provides direct connection to an external RAMDAC. The interface also includes a CRT controller, and a clock synthesizer. The RAMDAC is programmed through I²C serial bus.

NTSC decoder/encoder controller device 224 interfaces directly to NTSC video signals complying with CCIR601/656 standard so as to provide an integrated and stand-alone arrangement. This enables multimedia processor 100 to directly generate high-quality NTSC or PAL video signals. This interface can support resolutions specified by CCIR601 standard. Advanced video filtering on processor 102 produces flicker-free output when converting progressive-to-interlaced and interlaced-to-progressive output. The NTSC encoder is controlled through the I²C serial bus.

Similarly, the NTSC decoder controller provides direct connection to a CCIR601/656 formatted NTSC video signal which can generate up to a 16-bit YUV at a 13.5 MHZ Pixel rate. The decoder is controlled through the I²C serial bus.

ISDN (Integrated Services Digital Networks standard) interface 220 includes a 5-pin interface which supports ISDN BRI (basic rate interface) via an external ISDN U or S/T interface device. ISDN standard defines a general digital telephone network specification and has been in existence since the mid 1980's. The functionality of this module is based on the same principle as a serial communication controller, using IDL2 and SCP interfaces to connect to the ISDN U-Interface devices.

T1 interface 210 provides a direct connection to any third party T1 CSU (channel service unit) or data service unit (DSU) through a T1 serial or parallel interface. The CSU/DSU and serial/parallel output are software configurable through dedicated registers. Separate units handle signal and data control. Typically the channel service unit (CSU) regenerates the waveforms received from the T1 network and presents the user with a clean signal at the DSC-1 interface. It also regenerates the data sent. The remote test functions include loopback for testing from a network side. Furthermore, a data service unit (DSU) prepares the customer's data to meet the format requirements of the DSC-1 interface, for example by suppressing zeros with special coding. The DSU also provides the terminal with local and remote loopbacks for testing.

A single multimedia processor, in accordance with one embodiment of the invention is configured to handle up to 24 channels of V.34 modem data traffic, and can mix V.PCNL and V.34 functions. This feature allows multimedia processor 100 to be used to build modem concentrators.

Legacy audio unit 218 is configured to comply with Legacy audio Pro 8-bit stereo standard. It provides register communications operations (reset, command/status, read data/status), digitized voice operations (DMA and Direct mode), and professional mixer support (CT1 345, Module Mixer). The functions of this unit include:

8-bit monaural/stereo DMA slave mode play/record;
8-bit host I/O interface for Direct mode play/record;
Reset, command/data, command status, read data and read status register support;
Professional mixer support;
FM synthesizer (OPLII, III, or IV address decoding);
MPU401 General MIDI support;
Joystick interface support;
Software configuration support for native DOS mode; and
PnP (plug and play) support for resources in Windows DOS box.

A PCI signal decoder unit provides for direct output of PCI legacy audio signals through multiplexer 136 ports.

AC Link interface 214 is a 5 pin digital serial interface which is bidirectional, fixed rate, serial PCM digital stream. It can handle multiple input and output audio streams, as well as control register accesses employing a TDM format. The interface divides each audio frame into 12 outgoing and 12 incoming data streams, each with 20-bit sample resolution. Interface 214 includes a codec that performs fixed 48 KS/S DAC and ADC mixing, and analog processing.

Transport channel interface (TCI) 206 accepts demodulated channel data in transport layer format. It synchronizes packet data from satellite or cable, then unpacks and places byte-aligned data in the multimedia processor 100 memory through the DMA controller. Basically, the transport channel interface accepts demodulated channel data in transport layer format. A transport layer format consists of 188 byte packets with a four byte header and a 184 byte payload. The interface can detect the sync byte which is the first byte of every transport header. Once byte sync has been detected, the interface passes byte aligned data into memory buffers of multimedia processor 100 via data streamer 122 and data transfer switch 112 (FIG. 1(*a*)). The transport channel interface also accepts MPEG-2 system transport packets in byte parallel or bit serial format.

Multimedia processor 100 provides clock correction and synchronization for video and audio channels.

Universal Serial Bus (USB) interface 222 is a standard interface for communication with low-speed devices. This interface conforms to the standard specification. It is a four-pin interface (two power and two data pins) that expects to connect to an external module such as the Philips PDI-USBll.

Multimedia processor 100 does not act as a USB hub, but can communicate with both 12 Mbps and 1.5 Mbps devices. It is software configurable to run at either speed. When configured to run at the 12 Mpbs speed, it can send individual data packets to 1.5 Mbps devices. In accordance with one embodiment of the invention multimedia processor 100 communicates with up to 256 devices through the USB.

The USB is a time-slotted bus. Time slots are one millisecond. Each time slot can contain multiple transactions that can be isochronous, asynchronous, control, or data. Furthermore, data transactions can be individual packets or can be bulk transactions. Data transactions are asynchronous. Data is NRZI with bit stuffing. This guarantees a transition for clock adjustment at least once every six bits variable length data packets are CRC protected. Bulk data transactions break longer data streams up into packets of up to 1023 bytes per packet, and send one packet per time-slot.

IEC958 interface unit 208 is configured to support several audio standards, such as Sony Philips Digital Interface (SPDIF); Audio Engineering Society/European Broadcast Union (ES/EBU) interface; TOSLINK interface; The TOSLINK interface requires external IR devices. The IEC958 protocol convention calls for each multi-bit field in a sound sample to be shifted in or out with the least significant bit first (little-endian).

Interface unit 202 also includes an I²S controller unit 212 which is configured to drive high-quality (better than 95 dB SNR) audio digital-to-analog (D/A) converters for home theater. Timing is software configurable to either 18 or 16 bit mode.

I²C unit 216 employs the I²C standard primarily to facilitate communications between multimedia processor 100 and external onboard devices. Comprising a two-line serial interface, I²C unit 216 provides the physical layer (signaling) that allows the multimedia processor 100 serve as a master and slave device residing on the I²C bus. As a result the multimedia processor 100 does not require additional hardware to relay status and control information to external devices.

DDC interface provides full compliance with the VESA standards for Display Data Channel (DDC) specifications versions 1, and 2a. DDC specification compliance is offered for: DDC control via two pins in the standard VGA connector; DDC control via I²C connection through two pins in the standard VGA connector.

It is noted that each of the I/O units described above advantageously include a control register (not shown) which corresponds to a PIO register located at a predetermined address on I/O bus 132. As a result, each of the units may be directly controlled by receiving appropriate control signals via I/O bus 132.

Thus, in accordance with one embodiment of the invention, multimedia processor 100 may be employed in a variety of systems by reprogramming the I/O configurations of the I/O unit 202 such that a desired set of I/O devices have access to outside world via multiplexer 136. The pin configurations for multiplexer 136 varies based on the configuration of the I/O unit 202. Some of the exemplary applications that a system employing multimedia processor 100 may be used include a three dimensional 3D geometry PC, a multimedia PC, a set-top box/3D television, or Web TV, and a telecommunications modem system.

During operation, processor 102 may be programmed accordingly to provide the proper signaling via I/O bus 132 to I/O unit 202 so as to couple the desired I/O units to outside world via multiplexer 136. For example, in accordance with one embodiment of the invnetion, TCI unit 206 may be activated to couple to an external tuner system (not shown) via multiplexer 136 to receive TV signals. Multimedia processor 100 may manipulate the received signal and display it on a display unit such as a monitor. In another embodiment of the invention, NTSC unit 224 may be activated to couple to an external tuner system (not shown) via multiplexer 136 to receive NTSC compliant TV signals.

It will be appreciated that other applications may also be employed in accordance with the principles of the present invention. For purposes of illustrations, FIGS. 1(C) and 1(d) show block diagrams of two typical systems arranged in accordance with two embodiments of the present invention, as discussed hereinafter.

Figure 1C:
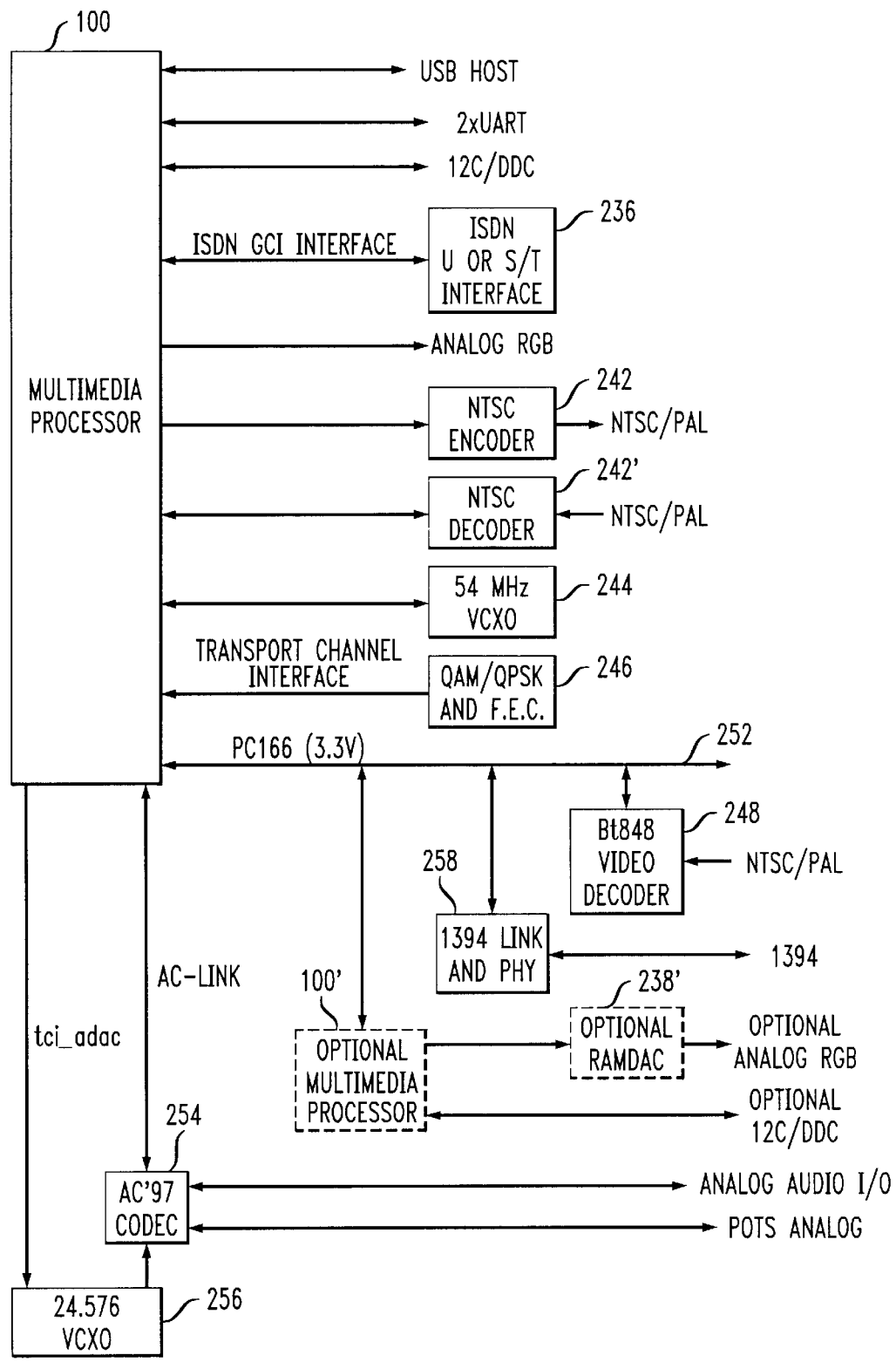
FIG. 1(c) is a block diagram of a multimedia system employing a multimedia processor in conjunction with a host computer, in accordance with one embodiment of the invention.
Figure 1D:
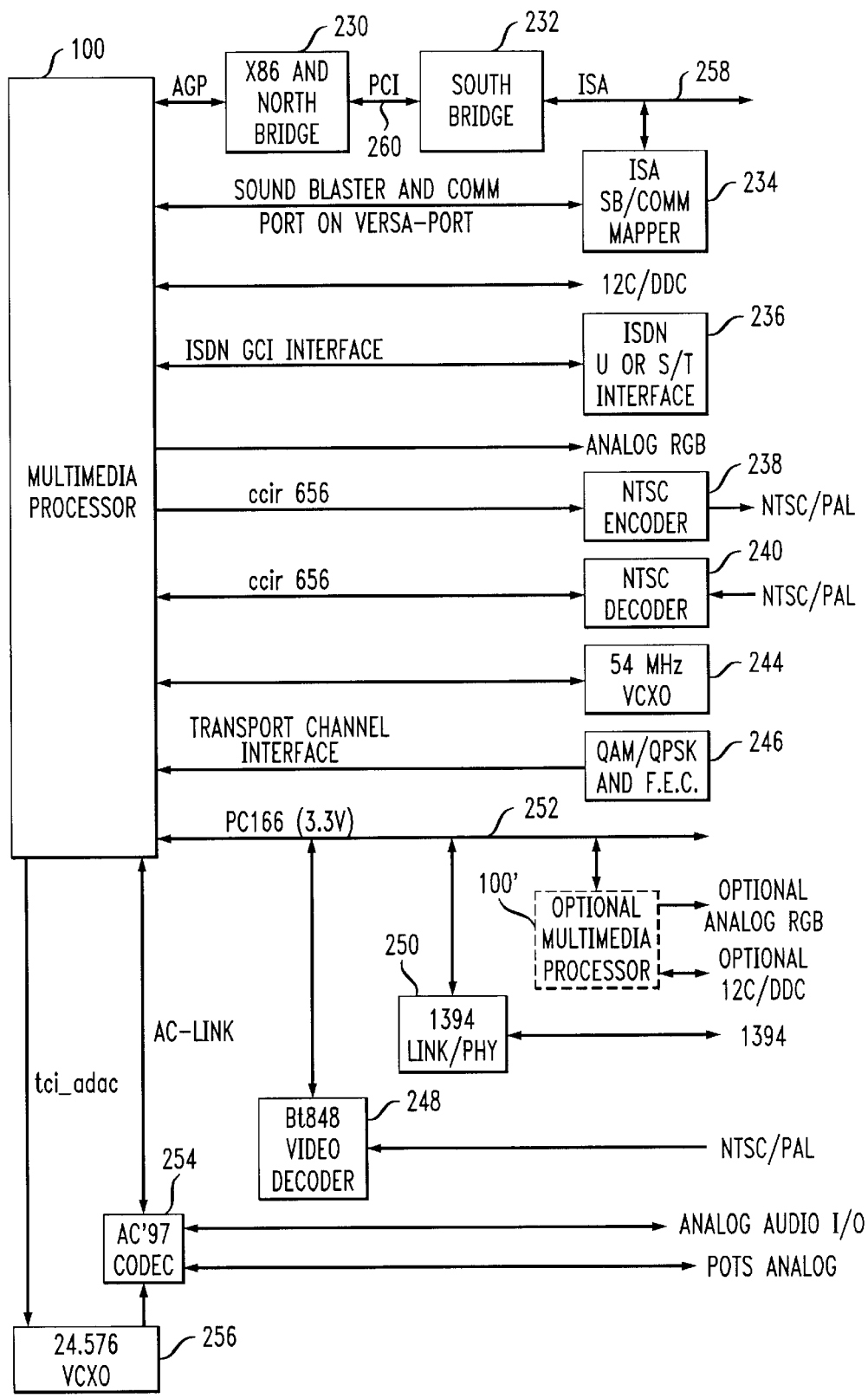
FIG. 1(d) is a block diagram of a stand-alone multimedia system employing a multimedia processor in accordance with one embodiment of the invention.

Thus, a multimedia system employing multimedia processor 100 is illustrated in FIG. 1(c), which operates with a host processor 230, such as an X86®, in accordance with one embodiment of the present invention. Multimedia processor 100 is coupled to a host processor 230 via an accelerated graphics bus AGP. Processor 230 is coupled to an ISA bus via a PCI bus 260 and a south bridge unit 232. An audio I/O controller such as 218 (FIG. 1(b)) is configured to receive from and send signals to ISA bus 258 via ISA SB/Comm mapper 232 and multiplexer 136. Furthermore, I²C/DDC driver unit 216 is configured to receive corresponding standard compliant signals via multiplexer 136. Driver unit 216 receives display data channel signals which are intended to provide signals for controlling CRT resolutions, screen sizes and aspect ratios. ISDN/GCI driver unit 221 of multimedia processor 100 is configured to receive from and send signals to an ISDN U or S/T interface unit 236

Multimedia processor 100 provides analog RGB signals via display refresh unit 226 to a CRT monitor (not shown). Multimedia processor 100 is also configured to provide NTSC or PAL compliant video signals via CCIR/NTSC driver unit 224 and NTSC encoder unit 238. Conversely, multimedia processor 100 is also configured to receive NTSC or PAL compliant video signals via CCIR/NTSC driver unit 224 and NTSC decoder unit 240. A local oscillator unit 244 is configured to provide a 54 MHz signal to multimedia processor 100 for processing the NTSC signals.

A demodulator unit 246 is coupled to transport channel interface driver unit 206 of multimedia processor 100. Demodulator unit 246 is configured to demodulate signals based on quadrature amplitude modulation, or quadrature phase shift keying modulation or F.E.C.

A secondary PCI bus 252 is also coupled to multimedia processor 100 and is configured to receive signals generated by a video decoder 248 so as to provide NTSC/PAL signals in accordance with Bt484 standard, provided by Brooktree®. Furthermore, bus 252 receives signals in accordance with 1394 link/phy standard allowing high speed serial data interface via 1394 unit 250. Bus 252 may be also coupled to another multimedia processor 100.

Finally, multimedia processor 100 is configured to receive analog audio signals via codec 254 in accordance with AC'97 standard. A local oscillator 256 generates an oscillating signal for the operation of AC'97 codec.

FIG. 1(d) illustrates a stand alone system, such as a multimedia TV or WEB TV that employs multimedia processor 100 in accordance with another embodiment of the invention. In a stand-alone configuration, multimedia processor 100 activates universal serial bus (USB) driver unit 222 allowing control via user-interface devices such as keyboards, mouse and joysticks. It is noted that for the stand-alone configuration, VLIW processor performs all the graphic tasks in conjunction with other modules of multimedia processor 100 as will be explained later. However, for the arrangement that operates with a host processor 230, some of the graphic tasks are performed by the host processor.

DATA TRANSFER SWITCH

Figure 2:
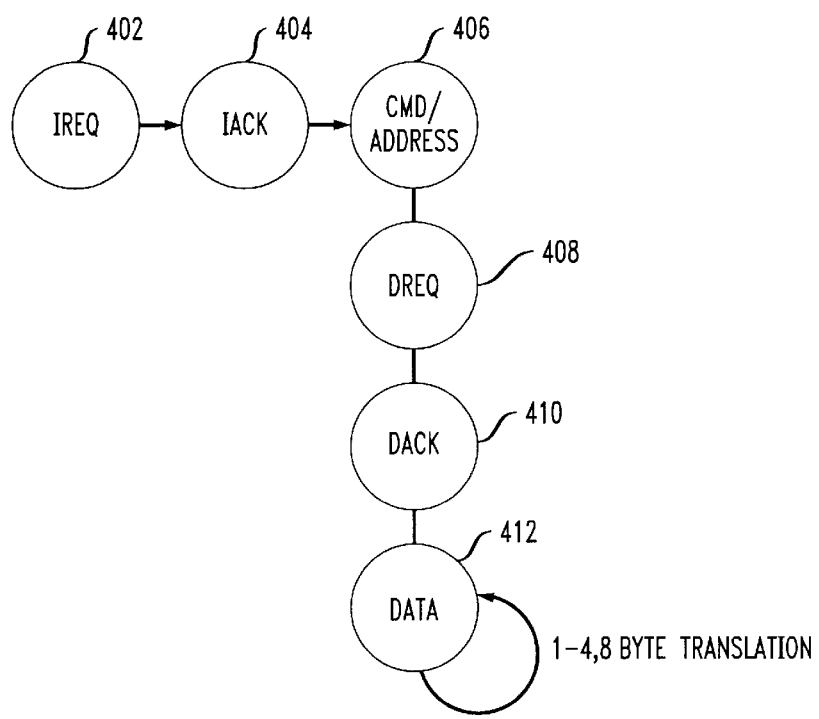
FIG. 2 is a flow chart illustrating a data transfer request operation in conjunction with a data transfer switch in accordance with one embodiment of the invention.

FIG. 2 is a flow diagram of the operation of data transfer switch in accordance with one embodiment of the present invention, although the invention is not limited in scope in that respect.

FIG. 2 illustrates the flow diagram of a bus protocol, which describes an example of the initiation phase in a write transaction from one functional unit in multimedia processor 100 to another unit in multimedia processor 100, such as a transaction to write data in data cache 108 to a location in SDRAM 128 via memory controller 124, although the invention is not limited in scope in that respect. Thus, for this example, the request bus master is data cache 108, and the request bus slave is memory controller 124. At step 402, request bus master sends a write request, along with a responder ID and a specifiable priority level to request bus arbiter 140. At step 404, request bus arbiter determines whether the request bus slave, in this case, memory controller 124, is ready to accept a write request. If so, request bus arbiter 140 sends a grant signal to data cache 108, along with a transaction ID, and in turn sends a write request to memory controller 124.

At step 406, request bus master provides address, command, size and its own identifier ID signals on request bus 118. Meanwhile, request bus slave in response to the previous request signal, sends an updated ready signal to request bus arbiter 140 so as to indicate whether it can accept additional requests. Furthermore, the request bus slave puts the transaction identifier ID on the request bus. This transaction identifier is used to indicate that an entry for this transaction exists in the slave's write queue. The request bus master samples this transaction ID when it receives data corresponding to this request from the bus slave.

For the write transaction explained above, request bus master, for example, data cache 108 also becomes a data bus master. Thus, at step 408, data cache 108 sends a write request, along with a receiver identifier, the applicable priority level and the transaction size to data bus arbiter, in this case processor memory bus 114. At step 410, data bus arbiter 114 sends a grant signal to data bus master, and in turn sends a request signal to data bus slave (memory controller 124 for the present example).

At step 412, data bus master provides data and byte enables up to four consecutive cycles, on the data bus. In response, data bus slave samples the data. The data bus master also provides the transaction ID that it originally received from the request bus slave at step 404. Finally, the data bus arbiter provides the size of the transaction for use by the data bus slave.

Figure 3A:
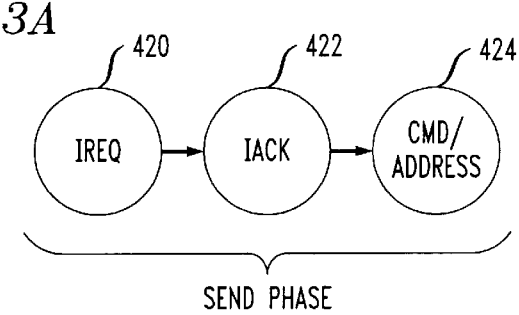
FIGS. 3(a) and 3(b) is a flow chart illustrating a read transaction that employs a data transfer switch in accordance with one embodiment of the invention.

FIG. 3a illustrates a flow diagram of a read transaction that employs data transfer switch 112. For this example, it is assumed that data cache 108 performs a read operation on SDRAM 128. Thus, at step 420 request bus master (data cache 108 for the present example) sends a read request, along with a responder identifier ID signal, and a specifiable priority level to request bus arbiter 140. At step 422, request bus arbiter determines whether request bus slave is available for the transaction. If so, request bus arbiter 140 sends a grant signal to request bus master, along with a transaction ID, and also sends a read request to the request bus slave (memory controller 124 in the present example). At step 424, the request bus master (data cache 108) provides address, size, byte read enable, and its own identification signal ID, on the request bus. Meanwhile, request bus slave updates its ready signal in request bus arbiter 140 to signify whether it is ready to accept more accesses. Request bus master also provides the transaction ID signal on the request bus. This transaction ID, is employed to indicate that a corresponding request is stored in the bus master's read queue.

Figure 3B:
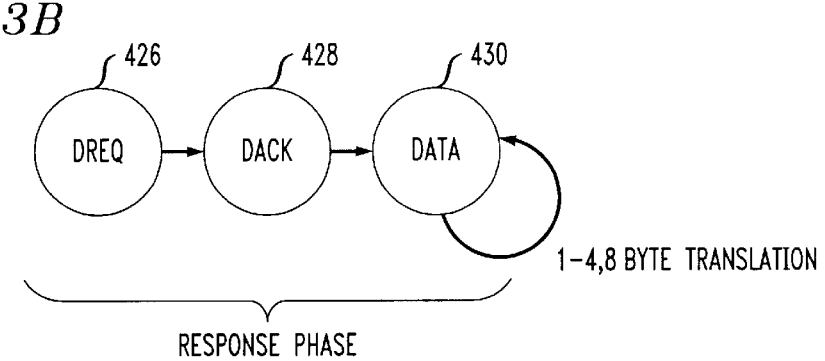

FIG. 3b illustrates the response phase in the read transaction. At step 426, request bus slave (memory controller 124) becomes the data bus master. When the data bus master is ready with the read data, it sends a request, a specfiable priority level signal, and the transaction size to the appropriate data bus arbiter; for this example, internal memory bus arbiter 142. At step 428, internal memory bus arbiter 142 sends a grant signal to the data bus master, and sends a request to the data bus slave—data cache 108. At step 430, data bus master (memory controller 124) provides up to four consecutive cycles of data to internal data bus 120. The data bus master also provides a transaction identification signal, transaction ID, which it received during the request phase. Finally, internal bus arbiter controls the transaction size for the internal bus slave (data cache 108) to sample.

In sum, in accordance with one example of the invention, the initiator components request transfers via the request bus arbiter. Each initiator can request 4, 8, 16, 24 and 32 byte transfer. The transaction, however, must be aligned on the communication size boundary. Each initiator may make a request in every cycle. Furthermore, each write initiator must sample the transaction ID from the responder during the send phase and must then send it out during the response phase.

Furthermore, during the read operations, the responders are configured to determine when to send the requested data. The read responders sample the initiator ID signal during the send phase so that they know which device to send data to during the response phase. The read responders sample the transaction ID signal from the initiator during the send phase and then send it out during the response phase. During the write operations, the responders are configured to accept write data after accepting a write request.

Table 1 illustrates an exemplary signal definition, for request bus 118, in accordance with one embodiment of the invention. Table 2 illustrates an exemplary signal definition, for data buses 114 and 120 in accordance with one embodiment of the invention.

REQUEST BUS

TABLE 1

| | |
|---|---|
| Rqb_addr [31:2] | Physical address |
| Rqb_bre [3:0] | Byte Read Enable (undefined during writes)- Since the request bus address has a 4-byte granularity, the byte read enable signifies which of the four bytes are being read. Rqb_bre[0] is set for byte 0, Rqb_bre[1] is set for byte 1, and so on. All bits are set when reading 4 or more bytes. The read initiator is configured to generate any combinations of byte read enables. |
| Rqb_init_id [3:0] | Request Initiator ID signal, which is the identification signal of the device making the request. |
| Rqb_tr_id [7:0] | Request Transaction ID-This is determined by the device which receives data. Since this device can be the initiator in a read transaction or the responder in a write transaction, it can set the transaction ID so that it can distinguish between these cases when data arrives. Also, since read and write requests can be completed out-of-order, the transaction ID can be used to signify the request that corresponds to the incoming data. |
| Rqb_sz [2:0] | Request size-This can be predetermined request size lengths, such as 4 bytes; 8 bytes; 16 bytes; 24 bytes; and 32 bytes. Since the smallest size is four bytes, a writer initiator signifies which bytes to be written using the data Burst Byte Enables as discussed in Table 2 below. A read initiator signifies which bytes are being read using Rqb_bre [3:0] described above. |
| Rqb_cmd [2:0] | Request Command-This signifies the type of operation being performed. 000 Memory Operation 001 Programmable Input/Output, PIO, operation 010 Memory allocate operation |

DATA BUS

TABLE 2

| | |
|---|---|
| Imb_data [63:0] | Internal Memory Data Bus-The data buses are little-endian: byte 0 is data [7:0], byte 1 is data [15:8], . . . , and byte 7 is data [63:56]. Data is preferably placed in the correct byte positions-it is preferably not aligned to the LSB. |
| Imb_be [7:0] | IMB Byte Write Enables (undefined during reads)-This is used by a write initiator to signify which bytes are to be written. Imb_be[0] is set when writing byte 0, Imb_be[1] is set when writing byte 1, and so on. When writing 8 or more bytes, all bits should be set. The write initiator is allowed to generate any combination of byte enables. |
| Imb_tr_id [5:0] | IMB Transaction ID-This is identical to the transaction ID sent on the Request Bus. |
| Pmb_data [63:0] | Processor Memory Data Bus |
| Pmb_be [7:0] | PMB Byte Write Enables (undefined during reads) |
| Pmb_tr_id [7:0] | PMB Response Transaction ID |

Tables 3 through 9 illustrate command calls employed when transferring data via data transfer switch 112.

TABLE 3

RQB Master to RQB Arbiter

| | |
|---|---|
| Xx_rqb_rd_req1 | Read Request 1 |
| Xx_rqb_wr_req1 | Write Request 1 |
| Xx_rqb_resp_id1 [3:0] | Responder ID 1-the device ID of the responder. It has the same encoding as the initiator ID. |
| Xx_rqb_pri1 [1:0] | Priority 1 |
| 00 | Highest |
| 01 | |
| 10 | |
| 11 | Lowest |
| Xx_rqb_rd_req2 | Read Request 2-in case there is a back-to-back request |
| Xx_rqb_wr_req2 | Write Request 2 |
| Xx_rqb_resp_id2 [3:0] | Responder ID 2 |
| Xx_rqb_pri2 [1.0] | Priority 2 |

TABLE 4

RQB Slave to RQB Arbiter

| | |
|---|---|
| Xx_rqb_rd_rdy1 | Read Ready (1 or more) |
| Xx_rqb_wr_rdy1 | Write Ready (1 or more) |
| Xx_rqb_rd_rdy2 | Read Ready (2 or more) - see back-to-back requests below |
| Xx_rqb_wr_rdy2 | Write Ready (2 or more) |

TABLE 5

RQB Arbiter to RQB Arbiter

| | |
|---|---|
| Dts_rqb_gnt_xx | Bus Grant |

TABLE 6

RQB Arbiter to RQB Slave

| | |
|---|---|
| Dts_rqb_rd_req_xx | Read Request |
| Dts_rqb_wr_req_xx | Write Request |

TABLE 7

Data Bus Master to Data Bus Arbiter

| | |
|---|---|
| Xx_imb_req1 | IMB request 1 |
| Xx_imb_init_id1 | IMB receiver ID 1 |
| Xx_imb_sz1 | IMB size 1 |
| Xx_imb_pri1 | IMB priority 1 |
| Xx_imb_req2 | IMB request 2 |
| Xx_imb_init_id2 | IMB receiver ID 2 |
| Xx_imb_sz2 | IMB size 2 |
| Xx_imb_pri2 | IMB priority 2 |
| Xx_pmb_req1 | PMB request 1 |
| Xx_pmb_init_id1 | PMB slave ID 1-the ID of the device receiving data. It has the same encoding as Rqb_init_id. |
| Xx_pmb_sz1 | PMB size 1-This tells the arbiter how many cycles are needed for the transaction. It has the same encoding as Rqb_sz. |
| Xx_pmb_pri1 | PMB priority 1 |
| Xx_pmb_req2 | PMB request 2-see back-to-back requests below |
| Xx_pmb_init_id2 | PMB receiver ID 2 |
| Xx_pmb_sz2 | PMB size 2 |
| Xx_pmb_pri2 | PMB priority 2 |

TABLE 8

Data Bus Arbiter to Data Bus Master

| | |
|---|---|
| Dts_imb_gnt_xx | IMB grant |
| Dts_pmb_gnt_xx | PMB grant |

TABLE 9

Data Bus Arbiter to Data Bus Slave

| | |
|---|---|
| Dts_imb_req_xx | IMB request |
| Dts_pmb_req_xx | PMB request |

Figure 4A:
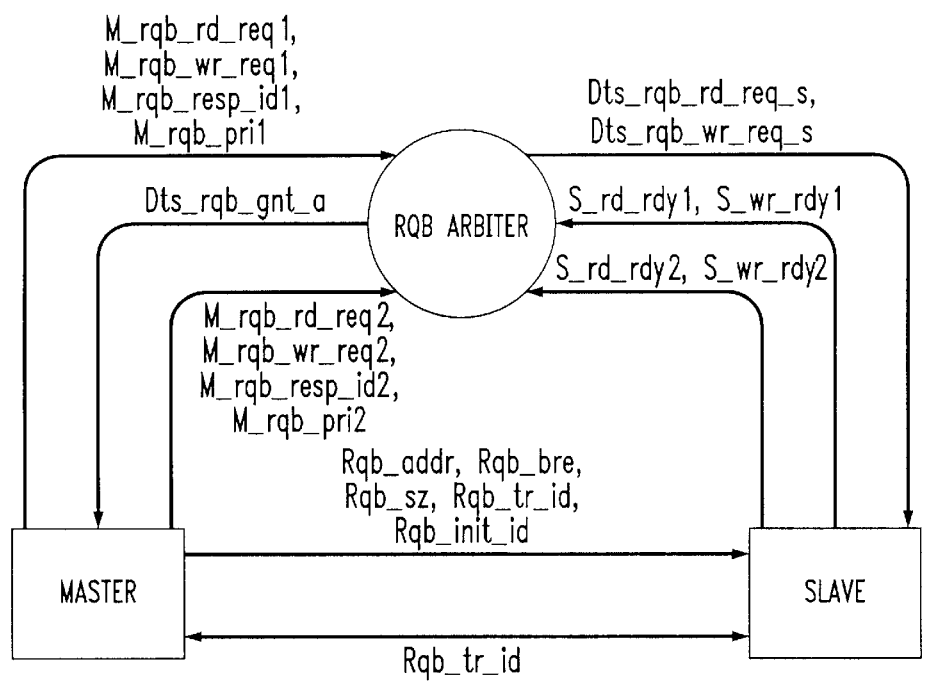
FIGS. 4(a) and 4(b) illustrate the flow of signals during a request bus connection and an internal memory bus connection in accordance with one embodiment of the invention.
Figure 4B:
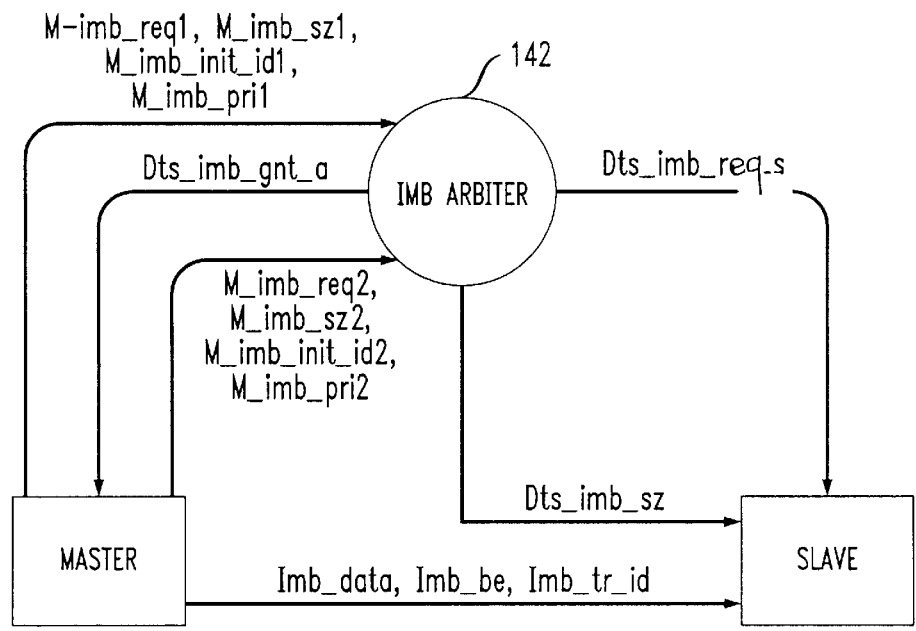

FIGS. 4(*a*) and 4(*b*) illustrate the flow of signals during a request bus connection and an internal memory bus connection, respectively, in accordance with one embodiment of the invention. For example, in FIG. 4(*a*), a request bus initiator sends request information to request bus arbiter 140 in accordance with Table 3. Such request information may include a request bus read/write request. The request bus responder identification signal, ID, and the priority level of the request. The request bus arbiter sends read/write request signals to the identified responder or request bus slave (Table 6), in response to which, the responder sends back ready indication signals to request bus arbiter (Table 4). Upon receipt of the ready indication signal, request bus arbiter sends a request bus grant signal to the initiator (Table 5). Once the grant signal is recognized by the initiator, transaction information in accordance with table -1- is transmitted to the responder via the request bus. To this end a Request bus transaction ID is assigned for the particular transaction to be processed.

FIG. 4(*b*) illustrates a data bus connection using internal memory bus 120. Thus, once the transaction information and identification has been set up during the request bus arbitration phase, the initiator and responder begin to transfer the actual data. The initiator transmits to internal memory bus arbiter 142 the transaction information including the request, size, initiator identification signal, ID, and the priority level in accordance with signals defined in Table 7. Internal memory bus arbiter 142 send a request information to the responder, in addition to the size information in accordance with Table 8. Thereafter the arbiter sends a grant signal to the initiator, in response to which, the actual data transfer occurs between the initiator and the responder in accordance with Table 2.

Figure 5A:
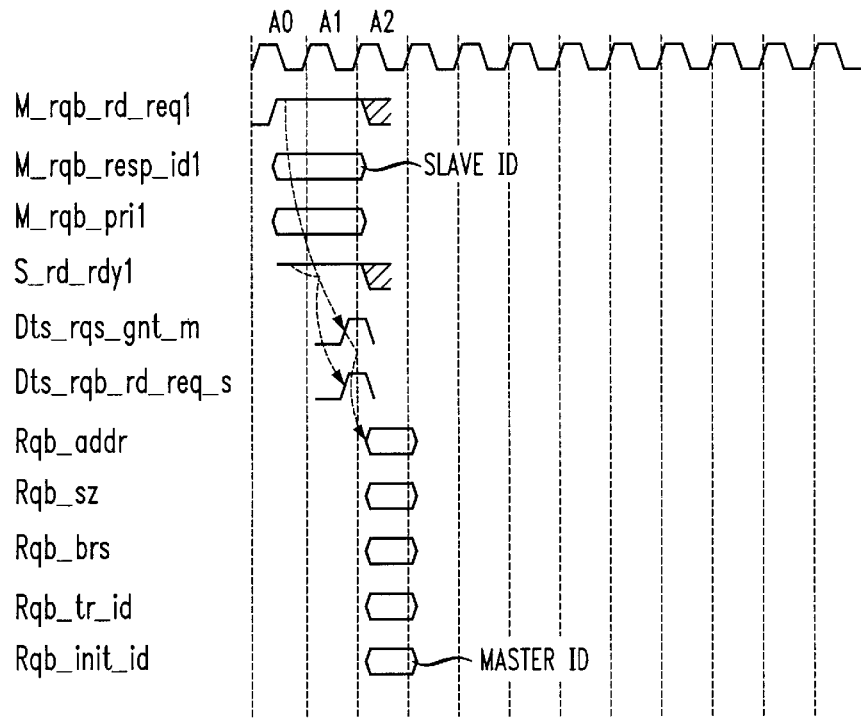
FIG. 5(a) illustrates the timing diagram for a request bus read operation, in accordance with one embodiment of the present invention.
Figure 5B:
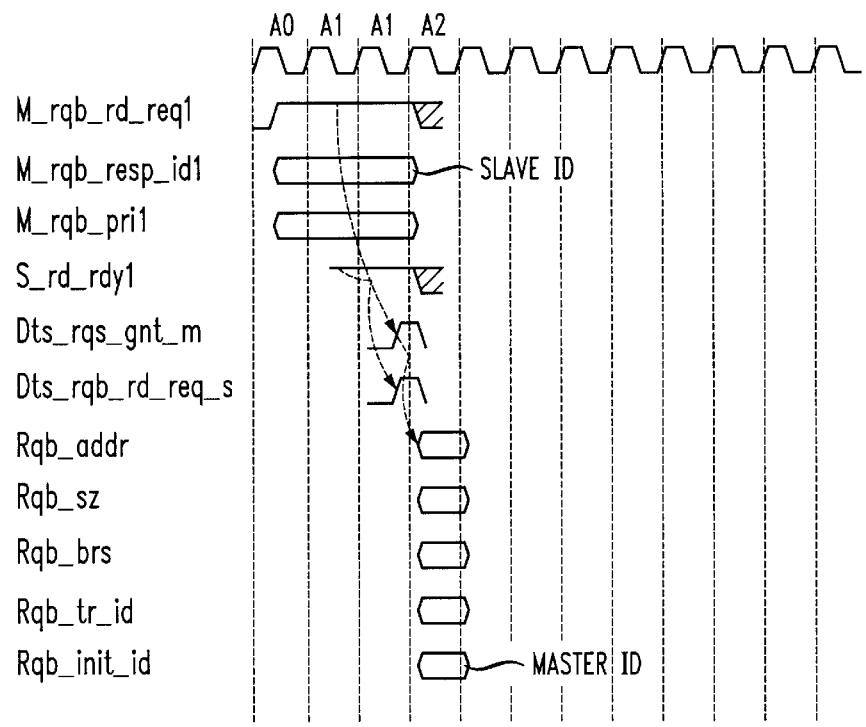
FIG. 5(b) illustrates the timing diagram for a read request where the grant is not given immediately, in accordance with one embodiment of the invention.
Figure 5C:
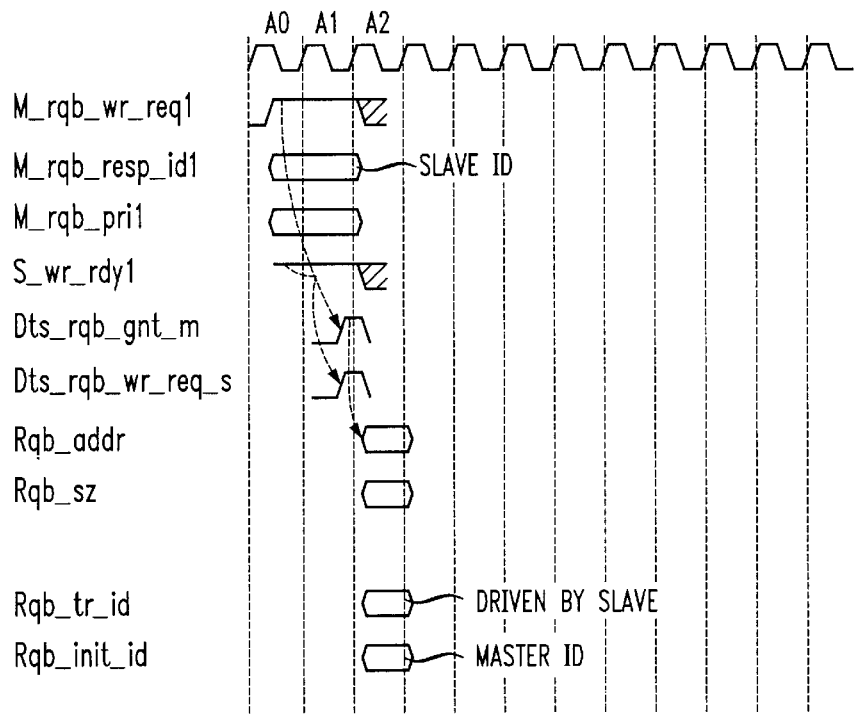
FIG. 5(c) illustrates the timing diagram for a request bus write operation, in accordance with one embodiment of the invention.
Figure 5D:
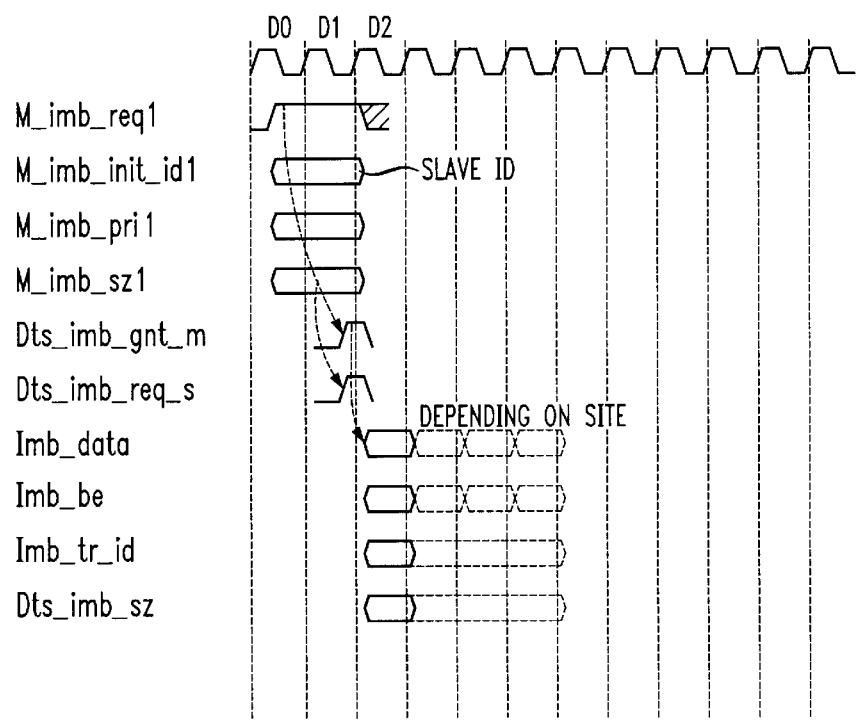
FIG. 5(d) illustrates the timing diagram for a data bus transfer operation, in accordance with one embodiment of the invention.

FIG. 5(a) illustrates the timing diagram for a request bus read operation. FIG. 5(b) illustrates the timing diagram for a read request where the grant is not given immediately. FIG. 5(c) illustrates the timing diagram for a request bus write operation. It is noted that for the write operation, the request bus transaction identification signal, ID, is provided by the responder. Finally, FIG. 5(d) illustrates the timing diagram for a data bus data transfer operation. It is noted that for a read transaction, the data bus master is the read responder and the data bus slave is the read initiator.

Data transfer switch 112 is configured to accommodate back-to-back requests made by the initiators. As illustrated in the timing diagrams, the latency between sending a request and receiving a grant is two cycles. In the A0 (or D0) cycle, arbiter 140 detects a request from a bus master. However, in the A1 (or D1) cycle, the bus master preferably keeps its request signal—as well as other dedicated signals to the arbiter—asserted until it receives a grant. As such, arbiter 140 cannot tell from these signals whether the master wants to make a second request.

In order to accommodate a back-to-back request, a second set of dedicated signals from the bus master to arbiter 140 is provided so that the master can signal to the arbiter that there is a second request pending. If a master wants to perform another request while it is waiting for its first request to be granted, it asserts its second set of signals. If arbiter 140 is granting the bus to a master in the current cycle, it must look at the second set of signals from that master when performing the arbitration for the following cycle. When a master receives a grant for its first request, it transfers all the information in the lines carrying the second set of request signals to the lines carrying first set of request signals. This is required in case the arbiter cannot grant the second request immediately.

The ready signals from a RQB slave are also duplicated for a similar reason. When RQB arbiter 140 sends a request to a slave, the earliest it can see an updated ready signal is two cycles later. In the A0 cycle, it can decide to send a request to a slave based on its ready signals. However, in the A1 cycle, the slave has not updated its ready signals because it has not seen the request yet. Therefore, arbiter 140 cannot tell from this ready signal whether or not the slave can accept another request.

A second set of ready signals from the RQB slave to RQB arbiter 140 is provided so that the arbiter can tell whether the slave can accept a second request. In general, the first set of ready signals signify whether at least one request can be accepted and the second set of ready signals signify whether at least two requests can be accepted. If arbiter 140 is sending a request to a slave in the current cycle, it must look at the second set of ready signals from that slave when performing the arbitration for the next cycle.

It is noted that there are ready signals for reads and writes. RQB slaves may have different queue structures (single queue, separate read queue and write queue, etc.). RQB arbiter 140 knows the queue configuration of the slave to determine whether to look at the first or second read ready signal after a write, and whether to look at the first or second write ready signal after a read.

Figure 6A:
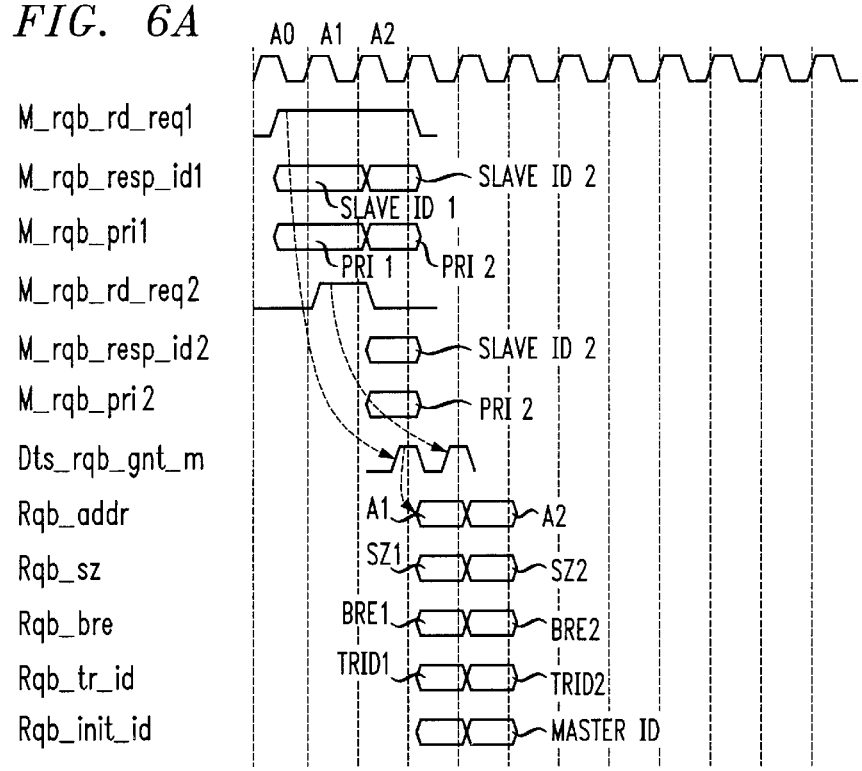
FIG. 6(a) illustrates a timing diagram for a request bus master making a back-to-back read request.
Figure 6B:
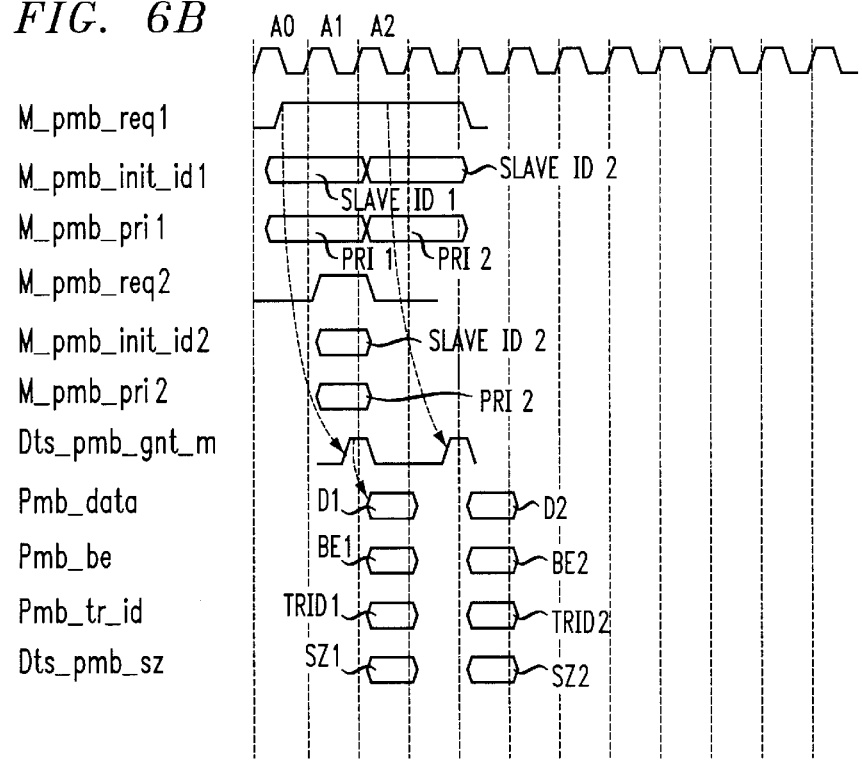
FIG. 6(b) illustrates a timing diagram for a processor memory bus master making a back-to-back request, when grant is not immediately granted for the second request.
Figure 6C:
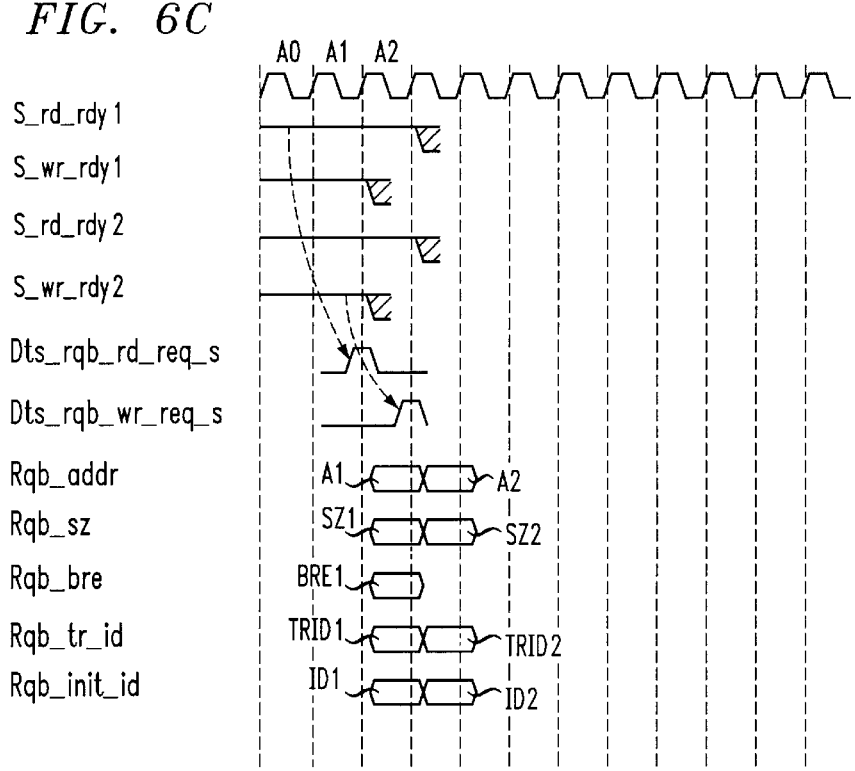
FIG. 6(c) illustrates a timing diagram for a request bus slave receiving a read request followed by a write request.

FIG. 6(a) illustrates a timing diagram for a request bus master making a back-to-back read request. FIG. 6(b) illustrates a timing diagram for a processor memory bus master making a back-to-back request, when the grant is not immediately granted for the second request. Finally, FIG. 6(c) illustrates a timing diagram for a request bus slave receiving a read request followed by a write request, assuming that the request bus slave has a unified read and write queue.

DATA STREAMER

The operation of data streamer 122 is now discussed in additional detail. The data streamer is employed for predetermined buffered data movements within multimedia processor 100. These data movements in accordance with specifiable system configuration may occur between memory or input/output (I/O) devices that have varying bandwidth requirements. Thus, any physical memory in connection with multimedia processor 100 can transmit and receive data by employing data streamer 122. These memory units include external SDRAM memory 128, data cache 108, fixed function unit 106, input/output devices connected to input output (I/O) bus 132, and any host memory accessed by either the primary or secondary PCI bus controller 130. In accordance with one embodiment of the invention, data streamer 122 undertakes data transfer actions under a software control, although the invention is not limited in scope in that respect. To this end a command may initiate a data transfer operation between two components within the address space defined for multimedia processor 100.

Figure 7:
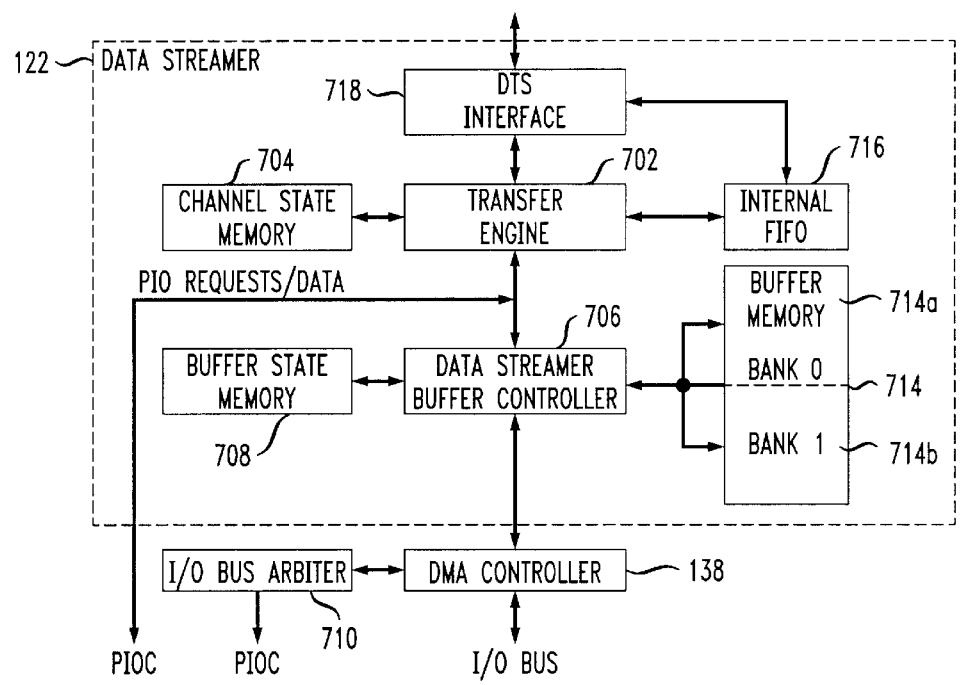
FIG. 7 illustrates a block diagram of a data streamer in accordance with one embodiment of the invention.

FIG. 7 illustrates a block diagram of data streamer 122 in accordance with one embodiment of the invention, although the invention is not limited in scope in this respect. Data streamer 122 is coupled to data transfer switch 112 via a data transfer switch interface 718. A transfer engine 702 within data streamer 122 is employed for controlling the data transfer operation of data streamer 122. As will be explained in more detail below, transfer engine 702 implements a pipeline control logic to handle simultaneous data transfers between different components of multimedia processor 100.

The transfer engine is responsible to execute user programs, referred to herein as descriptors that describe a data transfer operation. A descriptor as will be explained in more detail below, is a data field that includes information relating to a memory transfer operation, such as data addresses, pitch, width, count and control information.

Each descriptor is executed by a portion of data streamer 122 hardware called a channel. A channel is defined by some bits of state in a predetermined memory location called channel state memory 704. Channel state memory 704 supports 64 channels in accordance with one embodiment of the invention. As illustrated in FIG. 7, channel state memory 704 is coupled to transfer engine 702. At any given time a number of these 64 channels are active and demand service. Each active channel works with a descriptor. Data streamer 122 allocates one or two channels for a data transfer operation. These channels remain allocated to the same data transfer operation until data is transferred from its origination address to its destination address within multimedia processor 100. As will be explained in more detail, data streamer 122 allocates one channel for input/output to memory transfers, and allocates two channels for memory to memory transfers.

Transfer engine 702 is coupled to data transfer switch interface 718 for providing data transfer switch request signals that are intended to be sent to data transfer switch 112. Data transfer switch interface 718 is configured to handle outgoing read requests for data and descriptors that are generated by transfer engine 702. It also handles incoming data from data transfer switch 112 to appropriate registers in internal first-in-first-out buffer 716. Data transfer switch interface 718 also handles outgoing data provided by data streamer 122.

Data streamer 122 also includes a buffer memory 714 which in accordance with one embodiment of the invention is a 4 KB SRAM memory, physically implemented within multimedia processor 100, although the invention is not limited in scope in that respect. Buffer memory 714 includes dual ported double memory banks 714(a) and 714(b) in accordance with one embodiment of the invention. It is noted that for a data streamer that handles 64 channels, buffer memory 714 may be divided into 64 smaller buffer spaces.

The data array in buffer memory 714 is physically organized as 8 bytes per line and is accessed 8 bytes at a time, by employing a masking technique. However, during the operation, a 4 kB of memory is divided into smaller buffers, each of which is used in conjunction with a data transfer operation. Therefore, a data transfer operation employs a data path within data streamer 122 that is defined by one or two channels and one buffer. For memory-to-memory transfer two channels are employed, whereas, for I/O-to-memory transfer one channel is employed. It is noted that the size of each smaller buffer is variable as specified by the data transfer characteristics.

In accordance with one embodiment of the invention, the data move operations are carried out based on predetermined chunk sizes. A source chunk size of "k" implies that the source channel should trigger requests for data when the destination channel has moved "k" bytes out of buffer memory 714. Similarly, a destination chunk size of "k" implies that the destination channel should start moving data out of buffer 714 when the source channel has transferred "k" bytes of data into the buffer. Chunk sizes are multiple of 32 bytes, although the invention is not limited in scope in that respect.

Buffer memory 714 is accompanied by a valid-bit memory that holds 8 bits per line of 8 bytes. The value of the valid bit is used to indicate whether the specific byte is valid or not. The sense of the valid bit is flipped each time the corresponding allocated buffer is filled. This removes the necessity to re-initialize the buffer memory each time a chunk is transferred. However, the corresponding bits in the valid-bits array are initialized to zeroes whenever a buffer is allocated for a data transfer path.

Buffer memory 714 is coupled to and controlled by a data streamer buffer controller 706. Buffer controller 706 is also coupled to transfer engine 702, and DMA controller 138, and is configured to handle read and write requests received from the transfer engine and the DMA controller. Buffer controller 706 employs the data stored in buffer state memory 708 to accomplish its tasks. Buffer controller 706 keeps a count of the number of bytes that are brought into the buffer and the number of bytes being taken out. Data streamer buffer controller 706 also implements a pipelined logic to handle the 64 buffers and manage the read and write of data into buffer memory 714.

Buffer state memory 708 is used to keep state information about each of the buffers used in a data path. As mentioned before, the buffer state memory supports 64 individual buffer FIFOs.

DMA controller 138 is coupled to I/O bus 132. In accordance with one embodiment of the invention, DMA controller 138 acts to arbitrate among the I/O devices that want to make a DMA request. It also provides buffering for DMA requests coming into the data streamer buffer controller and data going back out to the I/O devices. The arbitration relating to DMA controller 138 is handled by a round-robin priority arbiter 710, which is coupled to DMA controller 138 and I/O bus 132. Arbiter 710 arbitrates the use of the I/O data bus between physical input/output controller, PIOC 126 and DMA controller 138.

In accordance with one embodiment of the invention, data streamer 122 treats data cache 108 as an accessible memory component and as such allows direct read and write access to data cache 108. As will be explained in more detail data streamer 122 is configured to maintain coherency in the data cache, whenever a channel descriptor specifies a data cache operation. The ability to initiate read and write requests to data cache by other components of multimedia processor 100 is suitable for data applications wherein the data to be used by CPU 102 and 104 respectively is known beforehand. Thus, the cache hit ratio improves significantly, because the application can fill necessary data before CPU 102 or 104 uses the data.

As stated before, data streamer 122 in accordance with one embodiment of the invention operates based on a user specified software program, by employing several application programing interface, or API, library calls. To this end, programmable input/output controller PIOC 126 acts as an interface between other components of multimedia processor 100 and data streamer 122. Therefore, the commands used to communicate with data streamer 122, at the lowest level translate to PIO reads and writes in the data streamer space. Thus, any component that is capable of generating such PIO read and write operations can communicate with data streamer 122. In accordance with one embodiment of the invention, these blocks include fixed function unit 106, central processing units 102, 104, and a host central processing unit coupled to multimedia processor 100 via, for example, a PCI bus.

In accordance with one embodiment of the invention, data streamer 122 occupies 512 K bytes of PIO (physical memory) address space. Each data streamer channel state memory occupies less than 64 bytes in a 4K byte page. Each data streamer channel state memory is in a separate 4K byte page for protection, however, the invention is not limited in scope in that respect.

Table 10, illustrates the address ranges used for various devices. For example, the bit in position 18 is used to select between transfer engine 702 and other internal components of data streamer 122. The other components include the data RAM used for buffer memory, the valid RAM bits that accompany the data RAM, the data streamer buffer controller and the DMA controller.

TABLE 10

| PIO Address Map of the DATA STREAMER | | |
|---|---|---|
| Starting PIO OFFSET | Ending PIO OFFSET | USAGE |
| 0x00000 | 0x3FFFF | Transfer engine channel state memory and other user commands. |
| 0x40000 | 0x40FFF | DS Buffer Data Ram. |
| 0x41000 | 0x41FFF | DS Buffer Valid Ram |
| 0x42000 | 0x42FFF | DS Buffer Controller |
| 0x43000 | 0x43FFF | DMA Controller |
| 0x44000 | 0x44FFF | Data Streamer TLB (Translation Lookaside Buffer) which performs caching mechanism of address translation tables same as general purpose processors. Multimedia processor 100 includes three TLBs for two clusters and a data streamer. |

When bit 18 has a value of 0, the PIO address belongs to transfer engine 702. Table 11, illustrates how bits 17:0 are interpreted for transfer engine 702 internal operations.

TABLE 11

Transfer Engine Decodes

| BIT | NAME | Description |
|---|---|---|
| 18 | Transfer Engine select | 1 = NOT transfer engine PIO operation, see table above. |
| | | 0 = transfer engine PIO operation. |
| 17:12 | Channel Number | Channel number 0 to 63 is selected by this field |
| 11:9 | Unused | |
| 8:6 | TE internal regions and user interface calls | 0 = Channel state memory 1 |
| | | 1 = Channel state memory 2 |
| | | 2 = Reorder table |
| | | 3 = ds_kick-start a data transfer |
| | user interface calls | operation |
| | | 4 = ds_continue |
| | | 5 = ds_check_status |
| | | 6 = ds_freeze |
| | | 7 = ds_unfreeze |
| 5:0 | Address select withn TE regions | The user-interface calls are aliased to all addresses within their region |

When bit 18 has a value of 1, the PIO address belongs to data streamer buffer controller 706, relating to buffer state memory, as shown in Table 12.

TABLE 12

DATA STREAMER BUFFER CONTROLLER DECODES

| BIT | NAME | Description |
|---|---|---|
| 63:19 | PIO region specification and DS device select | PIO device select is obtained for the Data Streamer |
| 18:12 | DS internal component select | 1000010 |
| 11 | BSM select | 0 => BSM1  1 => BSM2 |
| 10:0 | Register select | Select one 64 bit register in each buffer |

The internal structure of each component of data streamer 122 in accordance with one embodiment of the invention is described in more detail hereinafter.

TRANSFER ENGINE

Figure 8:
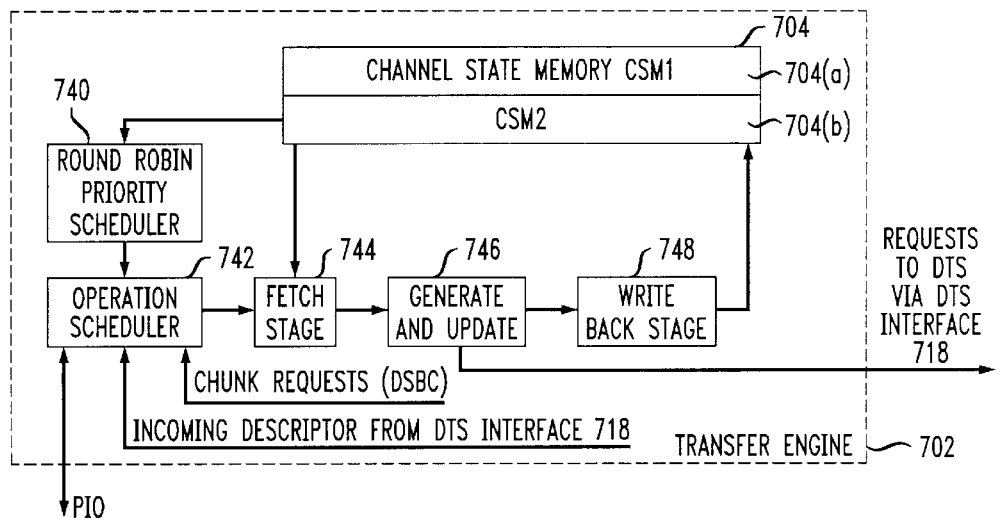
FIG. 8 illustrates a block diagram of a transfer engine employed in a data streamer in accordance with one embodiment of the invention.

FIG. 8 illustrates a block diagram of transfer engine 702 in accordance with one embodiment of the invention, although the invention is not limited in scope in that respect. The main elements of transfer engine 702 comprise an operation scheduler 742, coupled to a fetch stage 744, which in turn is coupled to a generate and update stage 746, which is coupled to write-back stage 748. Together, components 742 through 748 define the transfer engine's execution pipeline. A round-robin priority scheduler 740 is employed to select the appropriate channels and their corresponding channel state memory.

As will be explained in more detail later, information relating to the channels that are ready to be executed are stored in channel state memory 704, which is physically divided to two channel state memory banks 704(a) and 704(b) in accordance with one embodiment of the invention. Priority scheduler 740 performs a round-robin scheduling of the ready channels with 4 priority levels. To this end, ready channels with the highest priority level are picked in a round-robin arrangement. Channels with lower priority levels are considered only if there are no channels with a higher priority level.

Priority scheduler 740 picks a channel once every two cycles and presents it to the operation scheduler for another level of scheduling.

Operation scheduler 742 is configured to receive four operations at any time and execute each operation one at a time. These four operations include: a programmable input/output, PIO, operation from the programmable input/output controller, PIOC, 126; an incoming descriptor program from data transfer switch interface 718; a chunk request for a channel from a chunk request interface queue filled by data streamer buffer controller 706; and a ready channel from priority scheduler 740.

As will be explained in more detail below in reference with FIGS. 13 and 14 a source descriptor program defines the specifics of a data transfer operation to buffer memory 714, and a destination descriptor program defines the specifics of a data transfer operation from buffer memory 714 to a destination location. Furthermore, a buffer issues a chunk request for a corresponding source channel stored in channel state memory 704 to indicate the number of bytes that it can receive. The priority order with which the operation scheduler picks a task, from highest to lowest is PIO operations, incoming descriptors, chunk requests, and ready channels.

Information about the operation that is selected by operation scheduler is transferred to fetch stage 744. The fetch stage is employed to retrieve the bits from channel state memory 704, which are required to carry out the selected operation. For example, if the operation scheduler picks a ready channel, the channel's chunk count bits and burst size must be read to determine the number of requests that must be generated for a data transfer operation.

Generate and update stage 746 is executed a number of times that is equal to the number of requests that must be generated for a data transfer operation as derived from fetch stage 744. For example, if the destination channel's transfer burst size is 4, then generate and update stage 746 is executed for 4 cycles, generating a request per cycle. As another example, if the operation is a PIO write operation to channel state memory 704, generate and update stage is executed once. As will be explained in more detail below, the read/write requests generated by generate and update stage 746 are added to a request queue RQQ 764, in data transfer switch interface 718.

Channel state memory 704 needs to be updated after most of the operations that are executed by transfer engine 702. For example, when a channel completes generating requests in the generate and update stage 746, the chunk numbers are decremented and written back to channel state memory 704. Write back stage 748 also sends a reset signal to channel state memory 704 to initialize the interburst delay counter with the minimum interburst delay value as will be explained in more detail in reference with channel state memory structure illustrated in Table 13.

CHANNEL STATE MEMORY

Information relating to each one of the 64 channels in data streamer 122 is stored in channel state memory 704. Prior and during a data move operation, data streamer 122 employs the data in channel state memory 704 for accomplishing its data movement tasks. Tables 13–19, illustrate the fields that define the channel state memory. The tables also shows the bit positions of the various fields and the value with which they should be initiated when the channel is allocated for a data transfer in accordance with one embodiment of the invention.

Channel state memory 704 is divided into two portions, 704(a) and 704(b) in accordance with one embodiment of the invention. Channel state memory 704(a) has four 64-bit values referred to as 0×00,0×08,0×10, and 0×18. Channel state memory 704(b) has three 64 bit values at positions 0×00,0×08 and 0×10.

TABLE 13

Channel State Memory 1 (OFFSET 0x00)

| BIT | NAME | INITIALIZED WITH VALUE |
|---|---|---|
| 15:0 | Control | xxx (don't cares) |
| 31:16 | Count | xxx |
| 47:32 | Width | xxx |
| 63:48 | Pitch | xxx |

TABLE 14

Channel State Memory 1 (OFFSET 0x08)

| BIT | NAME | INITIALIZED WITH VALUE |
|---|---|---|
| 31:0 | Data Address | xxx (don't cares) |
| 47:32 | Burst Size | set to number of DTS requests the channel must attempt to generate each time that it is scheduled. (Larger burst sizes are used to get back-to-back requests into the memory controller queues, to avoid SDRAM page miss--in conjunction use high DTS priority with larger burst sizes for higher bandwidth transfers). |
| 63:48 | Remaining width count (RCW) | xxx |

TABLE 15

Channel State Memory 1 (OFFSET 0x10)

| BIT | NAME | INITIALIZED WITH VALUE |
|---|---|---|
| 15:0 | Remaining burst count (RBC) | 0 |
| 31:16 | Remaining chunk count (RCCNT) | 0 |
| 35:32 | State | 0 |
| 39:36 | Interburst delay (IBD) | Must be initialized. Specify in multiples of 8 cycles, i.e., value n => minimum delay of 8n cycles before this channel can be considered for scheduling by the priority scheduler. |
| 45:40 | Buffer id (BID) | id of the buffer assigned to this channel |
| 47:46 | DTS command (CMD) | A value that is used on the DTS signal lines. bit 47: if set to 1 implies allocate in the dcache, 0 implies no-allocate bit 46: if set to 1 implies a PIO address |
| 48 | Descriptor prefetch buffer valid (DPBV) | 0 |
| 49 | Descriptor valid (DV) | 0 |
| 51:50 | Channel priority | value between 0 and 3 indicating the priority level of the channel 0 => highest priority 3 => lowest priority |
| 52 | Active Flag (A) | 0 |
| 53 | First descriptor (FD) | 0 |
| 54 | No more descriptors (NMD) | 0 |
| 55 | Descriptor type | 0 => format 1<br>1 => format 2 |
| 59:56 | Interburst delay count (IDBC) | 0 |
| 63:60 | Reserved | xxx |

TABLE 16

Channel State Memory 1 (OFFSET 0x18)

| BIT | NAME | INITIALIZED WITH VALUE |
|---|---|---|
| 7:0 | Address-space id (ASID) | asid of the application using this channel |
| 8 | TLB mode | 0 => don't use TLB<br>1 => use TLB |
| 10:9 | DTS priority | set to required DTS priority to use for requests from this channel<br>0 => highest<br>3 => lowest |
| 12:11 | Cache mode | Access mode on the DTS<br>bit 12: x<br>bit 11: 1 => coherent<br>0 => non-coherent |
| 16:13 | Way mask | way mask for cache accesses. A value of 1 => use way<br>bit 13: way 0 in data cache<br>bit 14: way 1<br>bit 15: way 2<br>bit 16: way 3 |
| 28:17 | Buffer address pointer (BAP) | start address of the corresponding buffer, specifying the full 12 bits. |
| 29 | Read/Write (RW) | 1 => source channel (read)<br>0 => destination channel (write) |
| 35:30 | Buffer start address (BSA) | just as it is set in BSM1 |
| 41:36 | Buffer end address (BEA) | just as it is set in BSM1 |
| 42 | Valid sense | 0 |

TABLE 17

Channel State Memory 2 (OFFSET 0x00)

| BIT | NAME | INITIALIZED WITH VALUE |
|---|---|---|
| 31:0 | Next descriptor address | xxx (don't cares) |
| 47:32 | Control word | xxx |
| 63:48 | Count | xxx |

TABLE 18

Channel State Memory 2 (OFFSET 0x08)

| BIT | NAME | INITIALIZED WITH VALUE |
|---|---|---|
| 15:0 | Width | xxx (don't cares) |
| 31:16 | Pitch | xxx |
| 63:32 | Data location address | xxx |

TABLE 19

Channel State Memory 2 (OFFSET 0x10)

| BIT | NAME | INITIALIZED WITH VALUE |
|---|---|---|
| 31:0 | Base address | xxx (don't cares) |
| 63:32 | New pointer address | xxx |

The bandwidth of data transfer achieved by a channel is based among other things on four parameters as follows: internal channel priority; minimum interburst delay; transfer burst size; and data transfer switch priority. When a path is allocated, these four parameters are considered by the system. Channel features also include three parameters that the system initializes. These include the base address, a cache way replacement mask as will be explained in more detail, and descriptor fetch mode bits. These parameters are explained hereinafter.

Channel priority: Data Streamer 122 hardware supports four internal channel priority levels (0 being highest and 3 lowest). As explained, the hardware schedules channels in a round-robin fashion by order of priority. For channels associated with memory-memory transfers it is preferable to assign equal priorities to both channels to keep the data transfers at both sides moving along at equal pace. Preferably, the channels that are hooked up with high bandwidth I/O devices are set up at lower level priority and channels that are hooked up with lower bandwidth I/O devices employ higher priority. Such channels rarely join the scheduling pool, but when they do, they are almost immediately scheduled and serviced, and therefore not locked out for and unacceptable number of cycles by a higher bandwidth, higher priority channel.

Minimum interburst delay: This parameter relates to the minimum number of cycles that must pass before any channel can rejoin the scheduling pool after it is serviced. This is a multiple of 8 cycles. This parameter can be used to effectively block off high priority channels or channels that have a larger service time (discussed in the next paragraph) for a period of time and allow lower priority channels to be scheduled.

Transfer burst size: Once a channel is scheduled, transfer burst size parameter indicates the number of actual requests it can generate on the data transfer switch, before it is de-scheduled again. For a source channel, this indicates the number of requests it generates for data to be brought into the buffer. For a destination channel, it is the number of data packets sent out using the data in the buffer. The larger the value of this parameter, the longer the service time for a particular channel. Each request can ask for a maximum of 32 bytes and send 32 bytes of data at a time. A channel stays scheduled generating requests until it either runs out of its transfer burst size count, encounters a halt bit in a descriptor, there are no more descriptors, or a descriptor needs to be fetched from memory.

DTS priority: Each request to a request bus arbiter or a memory data bus arbiter on the data transfer switch is accompanied by a priority by the requester. Both arbiters support four levels of priority and the priority to be used for the transfers by a channel is pre-programmed into the channel state. Higher priorities are used when it is considered to be important to get multiple requests from the same channel to be adjacent in the memory controller queue, for SDRAM page hits. (0 is highest priority and 3 is lowest).

Base address, way mask, and descriptor fetch modes: For memory-memory moves, inputting the data path structure (with hits) is optional. If this is null, the system assumes some default values for the various parameters. These default values are shown in table below.

When requesting a path for a memory-I/O or I/O-memory, the system provides a data path structure. This allows to set the booleans that will indicate to the system which transfer will be an I/O transfer and therefore will not need a channel allocation. For an I/O to memory transfer, parameters such as buffer size and chunk sizes are more relevant than for a memory-memory transfer, since it might be important to match the transfer parameters to I/O device bandwidth requirements.

In accordance with one embodiment of this invention, a data path is requested in response to a request for a data transfer operation. For a system that is based on software control a kernel returns a data path structure that fills in the actual values of the parameters that was set, and also the ids of the channel that the application will use to kick them off. If the path involves an I/O device, the buffer id is also returned. This buffer id is passed on by the application to the device driver call for that I/O device. The device driver uses this value to ready the I/O device to start data transfers to that data streamer buffer. If the user application is not satisfied with the type (parameters) of the DS path resources obtained, it can close the path and try again later.

DESCRIPTOR PROGRAM

Data transfers are based on two types of descriptors, as specified in channel state memory field as format 1 descriptor and format 2 descriptor. In accordance with one embodiment of the invention, a format 1 descriptor is defined based on the nature of many data transfers in 3D graphic and video image applications.

Figure 12:
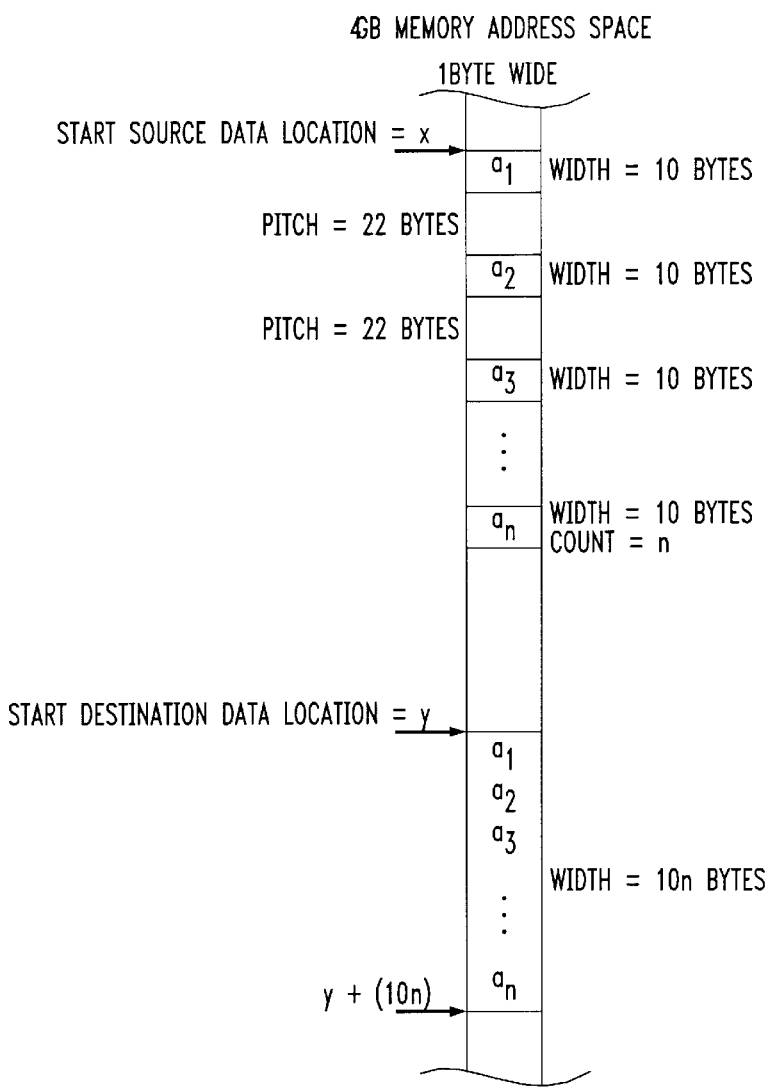
FIG. 12 is an exemplary memory address space employed in accordance with one embodiment of the invention.

Typically, as illustrated in FIG. 12, pixel information, is stored at scattered locations in the same arrangement that the pixels are intended to be displayed. Sometimes it is desired to proceed with a data gather operation, where "n" pieces of data or pixels are gathered together from n locations starting at "start source data location=x" in the memory space into one contiguous location beginning at "start destination data location=y." Each piece of data gathered is 10 bytes wide and separated from the next one by 22 bytes (pitch). To enable a transfer as illustrated in FIG. 12, two separate descriptors need to be set up, one for the source channel that handles transfers from source to buffer memory 714 (FIG. 7), and the other for the destination channel that handles transfers from the buffer memory to the destination.

Figure 13:
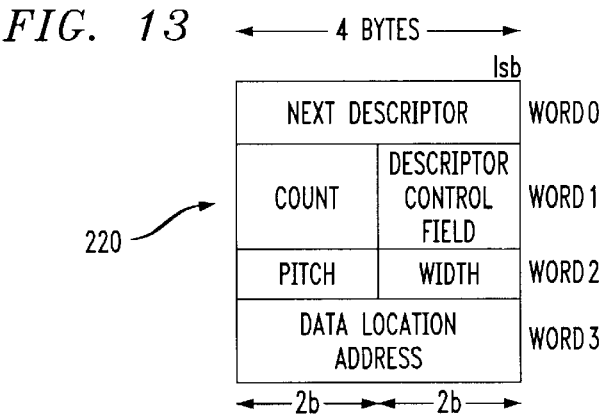
FIG. 13 illustrates a data structure for a channel descriptor in accordance with one embodiment of the invention.
Figure 14:
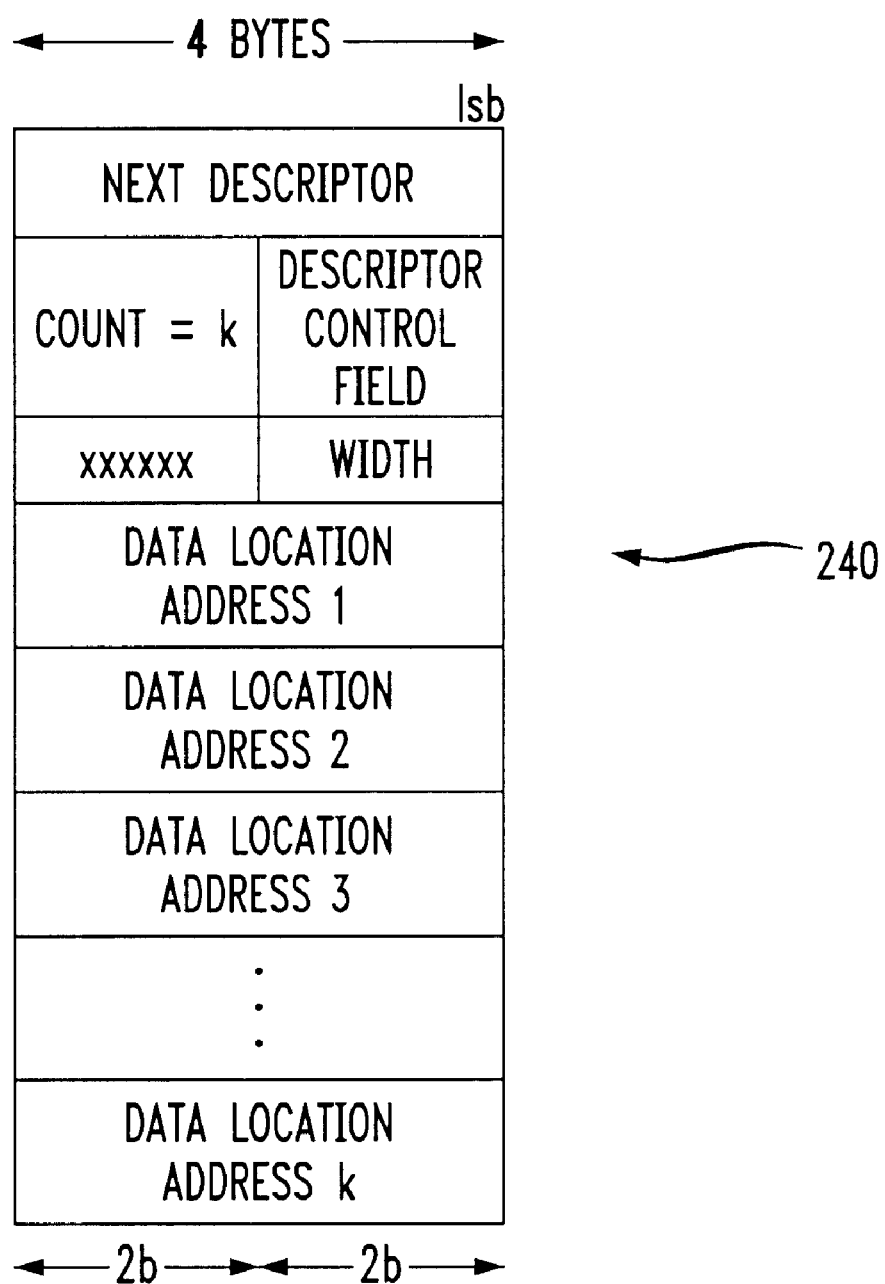
FIG. 14 illustrates a data structure for a channel descriptor in accordance with another embodiment of the invention.

FIG. 13 illustrates a data structure 220 for a format 1 descriptor in accordance with one embodiment of the invention. The size of descriptor 220 is 16 bytes, comprising two 8 byte words. The list below describes the different fields of the descriptor and how each field is employed during a data transfer operation.

1. Next Descriptor: The first 32 bits hold the address of another descriptor. This makes its possible to chain several descriptors together for complicated transfer patterns or for those that cannot be described using a single descriptor.
2. Descriptor Control Field. The 16 bits of this field are interpreted as follows:
   [15:14]—unused
   [13]—interrupt the host cpu (on completion of this descriptor)
   [12]—interrupt the cpu of multimedia processor 100 (on completion of this descriptor)
   [11:9]—reserved for software use

[8]—No more descriptor (set when this is the last descriptor in this chain).

[7:4]—data fetch mode (for all the data fetched or sent by this descriptor)

[7]: cache mode 0=>coherent, 1=>non-coherent

[6]: 1=>use way mask, 0=>don't use way mask

[5]: 1=>allocate in data cache, 0=>no-allocate in data cache

[4]: 1=>data in PIO space, 0=>not

[3]—prefetch inhibit if set to 1

[2]—halt at the end of this descriptor of set to 1

[1:0]—descriptor format type

00: format 1

01: format 2

10: control descriptor

It is noted that the coherence bit indicates whether the data cache should be checked for the presence of the data being transferred in or out. In accordance with a preferred embodiment of this invention it is desired that this bit is not turned off unless the system has determined that the data was not brought into the cache by the CPUs 102 or 104. Turning off this bit results in a performance gain by bypassing cache 108 since it reduces the load on the cache and may decrease the latency of the read or write (by 2–18 cycles, depending on the data cache queue fullness, if you choose no-allocate in the cache).

The way mask is employed in circumstances wherein data cache 108 has multiple ways. For example in accordance with one embodiment of the invention, data cache 108 has four ways, with 4k Bytes in each way. Within the present context, each way in a data cache is defined as a separate memory space that is configured to store a specified type of data. The "use way mask" bit simply indicates whether the way mask is to be used or not, in all the transactions initiated by the current descriptor to the data cache.

The "allocate", "no-allocate" bit is relevant only if the coherent bit is set. Basically, no-allocate is useful when the user wants to check the data cache for coherence reasons, but does not want the data to end up in the data cache, if it is not already present. Allocate must be set when the user wants to pre-load the data cache with some data from memory before the cpu begins computation.

Table 20 shows the action taken for the different values of the coherent and allocate bits in bits 7:4 of descriptor control field relating to data fetch modes.

TABLE 20

MEMORY TRANSFER ACCESS MODES

| Command - mode | Cache hit | Cache miss |
| --- | --- | --- |
| READ Descriptor and Source data (like a cpu load) coherently-allocate | Read from the data cache | Read from memory and allocate cache line |
| READ Descriptor and Source data coherently-no-allocate. | Read from the data cache | Read from memory and DO NOT allocate cache line |
| READ Descriptor and Source data non-coherently-no-allocate | Ignore cache | Read data directly from the memory and DO NOT allocate cache line |
| WRITE Destination data (like a store) coherently-allocate | Write the data into the cache and set the dirty flag. | Allocate a data cache line and write the data into the cache line. No memory transaction for the refill occurs if the cache recognizes the whole of the cache line is being overwritten. Set the dirty flag. |

TABLE 20-continued

MEMORY TRANSFER ACCESS MODES

| Command - mode | Cache hit | Cache miss |
| --- | --- | --- |
| WRITE Destination data Coherently-no-allocate | Write the data into the data cache line and set the dirty flag | Write it to memory directly and DO NOT allocate a cache line. |
| WRITE Destination data non-coherently-no-allocate | Ignore cache | Write data into memory and DO Not allocate a cache line. |

Returning to the explanation of descriptor, the PIO bit is needed when transferring data from/to PIO (Programmed I/O) address space. For example, data streamer 122 can be used to read the data streamer buffer memory (which lies in PIO address space).

The halt bit is used for synchronizing with data streamer 122 from the user-level. When set, data streamer 122 will halt the channel when it is done transferring all the data indicated by this descriptor. The data streamer will also halt when the "no more descriptors" bit is set.

When a data streamer channel fetches a descriptor and begins its execution, it immediately initiates a prefetch of the next descriptor. It is possible for the user to inhibit this prefetch process by setting the "prefetch inhibit" bit. It is valid only when the halt bit is also set. That is, it is meaningless to try to inhibit the prefetch when not halting.

As illustrated in the following list, not all combinations of the data fetch mode bits are valid. For example, "allocate" and "use way mask" only have meaning when the data cache is the target and since the data cache does not accept PIO accesses any combination where PIO=1 and (other bit)=1 is not used.

| coherent | use-way-mask | allocate | PIO space |
| --- | --- | --- | --- |
| 0 | 0 | 0 | 1 valid - PIO |
| 1 | — | — | 1 invalid |
| — | 1 | — | 1 invalid |
| — | — | 1 | 1 invalid |
| 0 | 0 | 0 | 0 valid - non-coherent |
| 0 | 1 | — | — invalid |
| 0 | — | 1 | — invalid |
| 1 | 0 | 0 | 0 valid - coherent no-allocate |
| 1 | 0 | 1 | 0 valid - coherent allocate |
| 1 | 1 | 0 | 0 invalid |
| 1 | 1 | 1 | 0 valid - coherent allocate, masked |

3. Count: This indicates the number of pieces of data to be transferred using this descriptor.

4. Width: is the number of bytes to be picked up from a given location.

5. Pitch: is the offset distance between the last byte transferred to the next byte. Destination is sequential and hence pitch is 0. Pitch is a signed value which enables the data locations gathered to move backwards through memory.

6. Data Location Address: is the address where the first byte for this descriptor can be located. In Example 1, for the source side, this is "x" and for the destination transfer it is "y". Every data location address used by a channel is first added to a base address. This base address value is held in the channel's state memory. When a channel is initialized by the ds_open_path ()

call, this base address value is set to zero. This value can be changed by the user using the Control descriptor (described below).

Table 21 below shows how the descriptors for the source and destination transfers are configured, for a data transfer from SDRAM 128 into data cache 108, i.e., a cache pre-load operation.

The control word at the source indicates coherent data operation, but does not allocate. The halt bit is not set since there are no more descriptors, and the channel automatically halts when done transferring this data. The "No more descriptor" bit must be set.

TABLE 21

| Source Descriptor | | |
|---|---|---|
| Source Descriptor | Bits | Explanation |
| 0:31 next descriptor | 0 | only one descriptor |
| 34:47 count | n | |
| 48:63 control word | 0x0100 | format 1, no-allocate, coherent, no more descriptors |
| 64:79 pitch | +22 | |
| 80:95 width | 10 | |
| 96:127 data address | x | |

The control word for the destination descriptor in table 22 indicates that the data cache is the target by making a coherent reference that should allocate in the cache if it misses. As for the source case, the halt bit is not set since the channel will automatically halt when it is done with this transfer, since the next descriptor field is zero. Also the "No more descriptor" bit is set as for the source case.

TABLE 22

| Destination Descriptor | | |
|---|---|---|
| Destination Descriptor | Bits | Explanations |
| 0:31 next descriptor | 0 | only one descriptor |
| 34:47 count | 1 | gathered together in one big contiguous piece |
| 48:63 control word | 0x0120 | format 1, coherent, allocate, no more descriptors |
| 64:79 pitch | 0 | only one piece |
| 80:95 width | 10n | |
| 96:127 data address | y | |

Format 2 Descriptor: FIG. 14 illustrates a data structure 240 corresponding to a format 2 descriptor in accordance with one embodiment of the invention. A data movement operation in accordance with a format 2 descriptor is similar to format 1 descriptor operation in many aspects. However, one difference with the format 1 descriptor structure is that a unique data location address is supplied for each data block intended to be transferred. Furthermore, the data structure in accordance with format 2 descriptor does not employ a pitch field. Format 2 descriptor is employed in data transfer operations when it is desired to transfer several pieces of data that are identical in width, but which are not separated by some uniform pitch.

Accordingly, the first field in format 2 descriptor contains the next descriptor address. The count field contains the number of data pieces that are intended to be transferred. The control field specification is identical to that of format 1 descriptor as discussed in reference with FIG. 13. The width field specifies the width of data pieces that are intended to be transferred. In accordance with one embodiment of the invention, format 2 descriptors are aligned to a 16 byte boundary for coherent accesses and 8 byte boundary for non-coherent accesses. The length of a format 2 descriptor varies from 16 bytes to multiples of 4 bytes greater than 16.

DATA TRANSFER SWITCH INTERFACE

Figure 9:
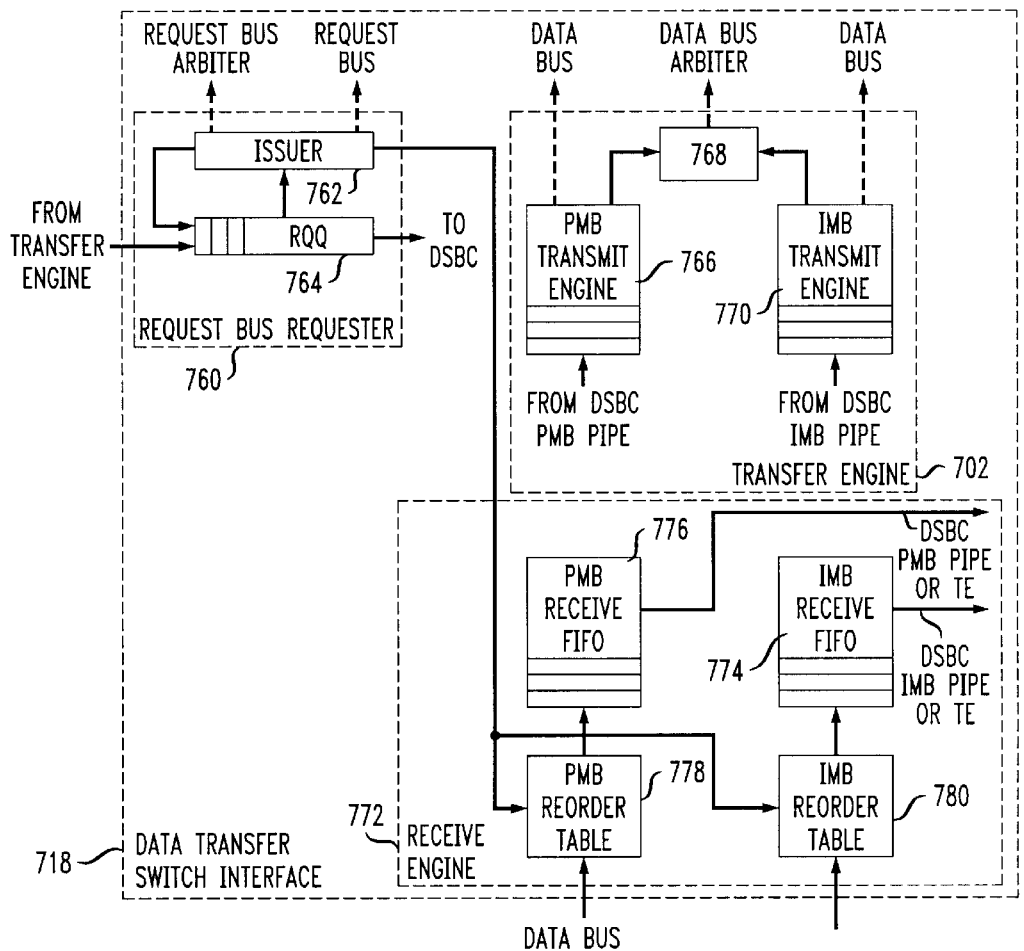
FIG. 9 is a block diagram of a data transfer switch in accordance with one embodiment of the invention.

FIG. 9 illustrates a block diagram of data transfer switch (DTS) interface 718 in accordance with one embodiment of the invention, although the invention is not limited in scope in that respect. It is to be understood that a data transfer switch interface is employed by all components of multimedia processor 100 that transfer data via data transfer switch 112 (FIG. 1(*a*)).

DTS interface 718 includes a bus requester 760 that is coupled to request bus 118 of data transfer switch 112. Bus requester 760 comprises a request issuer 762 which is configured to provide request signals to o a request bus queue (RQQ) 764. Request bus queue 764 is a first-in-first-out FIFO buffer that holds data and descriptor requests on a first come first served basis.

The other input port of request bus queue 764 is configured to receive read/write requests generated by transfer engine 702 via generate and update stage 746. Read requests include requests for data and for channel descriptors. Write requests include requests for data being sent out.

Issuer 762 is configured to send a request signal to data transfer switch request bus arbiter 140. When granted, bus requester 760 sends the request contained at the top of first-in-first-out request queue 764. A request that is not granted by data transfer switch request bus arbiter 140, after a few cycles, is removed from the head of request queue 764 and re-entered at its tail Thus, the data transfer operation avoids unreasonable delays when a particular bus slave or responder is not ready. As mentioned before, requests to different responders correspond to different channels. Thus, the mechanism to remove a request from the queue is designed in accordance with one embodiment of the invention so that one channel does not hold up all other channels from making forward progress.

Data transfer switch interface also includes a receive engine 772, which comprises a processor memory bus (PMB) receive FIFO buffer 776, a PMB reorder table 778, an internal memory bus (IMB) receive FIFO 774 and an IMB reorder table 780. An output port of PMB receive FIFO buffer 776 is coupled to data switch buffer controller (DSBC) 706 and to operation scheduler 742 of transfer engine 702. Similarly, an output port of IMB receive FIFO 774 is coupled to data switch buffer controller 706 and to operation scheduler 742 of transfer engine 702. An output port of issuer 762 is coupled to an input port of processor memory bus (PMB) reorder table 778, and to an input port of internal memory bus (IMP) reorder table 780. Another input port of PMB reorder table 778 is configured to receive data from data bus 114. Similarly, another input port of IMB reorder table 780 is configured to receive data from data bus 120.

Processor memory bus (PMB) reorder table 778 or internal memory bus (IMB) reorder table 780 respectively store indices that correspond to read requests that are still outstanding. These indices include a transaction identification signal (ID) that is generated for the read request, the corresponding buffer identification signal (ID) assigned for each read request, the corresponding buffer address and other information that may be necessary to process the data when it is received.

First-in-first-out buffers 776 and 774 are configured to hold returned data until it is accepted by either the data streamer buffer controller 706, for the situation where buffer data is returned, or by transfer engine 702 for the situation where a descriptor is retrieved from a memory location.

Issuer 762 stalls when tables 778 and 780 are full. This in turn may stall transfer engine 702 pipes. In accordance with one embodiment of the invention tables 778 and 780 each support 8 outstanding requests per bus. By using tables that store the buffer address for the return data, it is possible to handle out-of-order data returns. As will be explained in more detail in reference with the data streamer buffer controller, each byte stored in buffer memory 714 includes a valid bit indication signal, which in conjunction with a corresponding logic in the buffer controller assures that out-of-order returns are handled correctly.

Data transfer switch interface 718 also includes a transmit engine 782, which comprises a processor memory bus (PMB) transmit engine 766 and an internal memory bus (IMB) transmit engine 770, both of which are first-in-first-out FIFO buffers. A buffer 768 is configured to receive request signals from transmit engines 766 and 770 respectively and to send data bus requests to data bus arbiters 140 and 142 respectively. Each transmit engine is also configured to receive data from data streamer buffer controller 706 and to transmit to corresponding data buses.

During operation, when the request to request bus 118 is for read data, issuer 762 provides the address to request bus 118 when it receives a grant from request bus arbiter 140. Issuer 762 also makes an entry in reorder tables 778 and 780 respectively, to keep track of outstanding requests. If the request is for write data, the issuer puts out the address to request bus 118 and queues the request into internal FIFO buffer 716 (FIG. 7) for use by data streamer buffer controller 706, which examines this queue and services the request for write data as will be explained hereinafter in more detail in reference with data streamer buffer controller 706.

Figure 10:
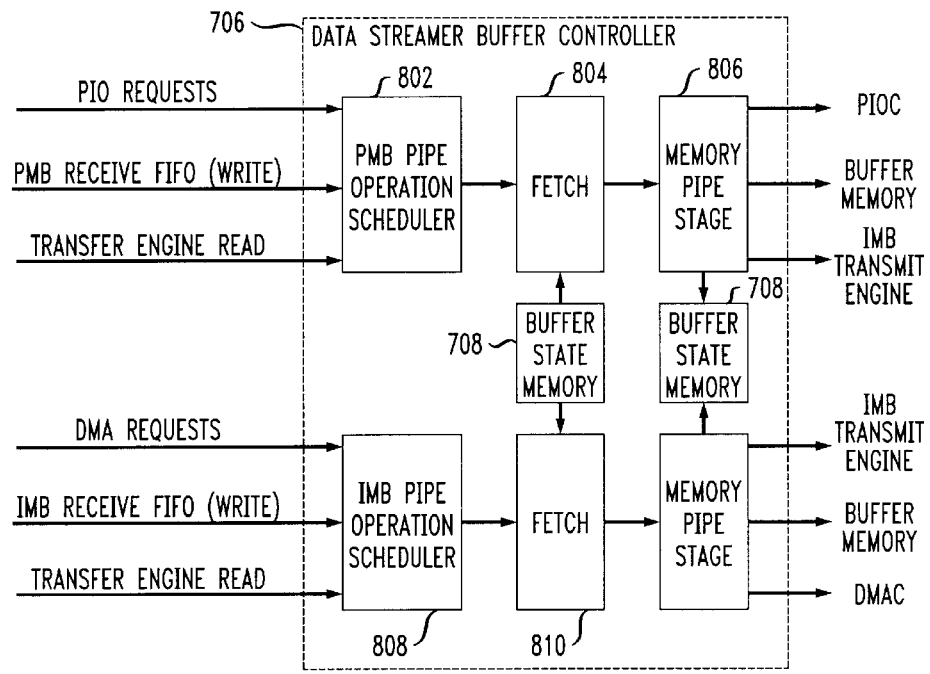
FIG. 10 is a block diagram of a data steamer buffer controller in accordance with one embodiment of the invention.

FIG. 10 is a block diagram of data streamer buffer controller 706 in accordance with one embodiment of the invention, although the invention is not limited in scope in that respect. Data streamer buffer controller 706 manages buffer memory 714 and handles read/write requests generated by transfer engine 702, and request generated by DMA controller 138 and PIO controller 126 of FIG. 1.

Data streamer buffer controller 706 includes two pipes for processing buffer related functions. The first processing pipe of data streamer buffer controller 706 is referred to as processor memory bus, (PMB), pipe, and the second pipe is referred to as internal memory bus (IMB) pipe. The operation of each pipe is the same except that the PMB pipe handles the transfer engine's data requests that are sent out on processor memory bus 114, and the IMB pipe handles the transfer engine's data requests that are sent out on internal memory bus 120.

As illustrated in FIG. 10, each pipe is configured to receive three separate data inputs. To this end data streamer buffer controller 706 includes a processor memory bus PMB pipe operation scheduler 802, which is configured to receive three input signals as follows: (1) all request signals from programmable input/output (PIO) controller 126; (2) data signals that are received from processor memory bus (PMB), receive FIFO buffer 776 of data transfer switch 718 (FIG. 9)—These data signals are intended to be written to buffer memory 714, so as to be retrieved once an appropriate chunk size is filled inside buffer memory 714 for a particular channel; and (3) transfer engine read signal indication for retrieving appropriate data from buffer memory 714 for a particular channel. The retrieved data is then sent to its destination, via data transfer switch interface 718 of data streamer 122, as illustrated in FIGS. 1 and 9.

Operation scheduler 802 assigns an order of execution to incoming operation requests described above. In accordance with one embodiment of the present invention, programmable input/output PIO operations are given top priority, followed by buffer read operations to retrieve data from buffer memory 714, and the lowest priority is given to buffer write operations to write data to buffer memory 714. Thus, read operations bypass write operations in appropriate FIFO buffers discussed in connection with FIG. 9. It is noted that when data is targeted to a destination memory, or has arrived from a destination memory, it needs to be aligned before it can be sent from buffer memory 714 or before it can be written into buffer memory 714.

The output port of operation scheduler 802 is coupled to an input port of fetch stage 804. The other input port of fetch stage 804 is coupled to an output port of buffer state memory 708.

Once the operation scheduler 802 determines the next operation, fetch stage 804 retrieves the appropriate buffer memory information from buffer state memory 708 so as to read or write into the corresponding channel buffer, which is a portion of buffer memory 714.

An output port of fetch stage 804 is coupled to memory pipe stage 806, which is configured to process read and write requests to buffer memory 714. Memory pipe stage 806 is coupled to buffer state memory 708 so as to update buffer state memory registers relating to a corresponding buffer that is allocated to one or two channels during a data transfer operation. Memory pipe stage 806 is also coupled to buffer memory 714 to write data into the buffer memory and to receive data from the buffer memory. An output port of memory pipe stage 806 is coupled to processor memory bus (PMB) transmit engine 766 so as to send retrieved data from buffer memory 714 to data transfer switch 718 for further transmission to a destination address via data transfer switch 112. Another output port of memory pipe stage 806 is coupled to programmable input/output (PIO) controller 126 for sending retrieved data from buffer memory 714 to destination input/output devices that are coupled to multimedia processor 100.

Data streamer buffer controller 706 also includes an internal memory bus (IMB) pipe operation scheduler 808, which is configured to receive three input signals as follows: (1) all request signals from DMA controller 712; (2) data signals that are received from internal memory bus (IMB), receive FIFO buffer 774 of data transfer switch 718 (FIG. 9)—These data signals are intended to be written to buffer memory 714, so as to be retrieved once an appropriate chunk size is filled inside buffer memory 714 for a particular channel; and (3) transfer engine read signal indication for retrieving appropriate data from buffer memory 714 for a particular channel. The retrieved data is then sent to its destination, via data transfer switch interface 718 of data streamer 122, as illustrated in FIGS. 1 and 9.

Operation scheduler 808 assigns an order of execution to incoming operation requests described above. In accordance with one embodiment of the present invention, DMA requests are given top priority, followed by buffer read operations to retrieve data from buffer memory 714, and the lowest priority is given to buffer write operations to write data to buffer memory 714. Thus, read operations bypass write operations in appropriate FIFO buffers discussed in connection with FIG. 9. It is noted that when data is targeted to a destination memory, or has arrived from a destination memory, it needs to be aligned before it can be sent from buffer memory 714 or before it can be written into buffer memory 714.

The output port of operation scheduler 808 is coupled to an input port of fetch stage 810. The other input port of fetch stage 810 is coupled to an output port of buffer state memory 708. Once the operation scheduler 802 determines the next operation, fetch stage 804 retrieves the appropriate buffer memory information from buffer state memory 708 so as to read or write into the corresponding channel buffer, which is a portion of buffer memory 714.

An output port of fetch stage 810 is coupled to memory pipe stage 812, which processes read and write requests to buffer memory 714. An output port of memory pipe stage 812 is coupled to an input port of buffer state memory 708 so as to update buffer state memory registers relating to a corresponding buffer that is allocated to one or two channels during a data transfer operation. Memory pipe stage 812 is coupled to buffer memory 714 to write data into the buffer memory and to receive data from the buffer memory. An output port of memory pipe stage 812 is coupled to internal memory bus (IMB) transmit engine 770 so as to send retrieved data from buffer memory 714 to data transfer switch 718 for further transmission to a destination address via data transfer switch 112. Another output port of memory pipe stage 812 is coupled to DMA controller 712 for sending retrieved data from buffer memory 714 to destination input/output devices that are coupled to multimedia processor 100.

It is noted that because buffer memory 714 is dual-ported, each of the pipes described above can access both buffer memory banks 714(a) and 714(b), without contention. As mentioned before, in accordance with one embodiment of the invention, buffer memory 714 is a 4KB SRAM memory. The data array is organized as 8 bytes per line and is accessed 8 bytes at a time. A plurality of smaller buffer portions are divided within the buffer memory 714, wherein each buffer portion is allocated to a particular channel during a data transfer operation.

Buffer memory 714 is accompanied by a valid bit memory that holds 8 bits per line of 8 bytes in the buffer memory. The value of the valid bit is used to indicate whether the specific byte is valid or not. The valid bit is flipped each time the corresponding allocated buffer is filled. This removes the need to reinitialize the allocated buffer portion each time it is used during a data transfer operation. However, each time a buffer is allocated for a path, the corresponding bits in the valid-bits array must be initialized to zeroes.

BUFFER STATE MEMORY

As explained before, buffer state memory 708 holds the state for each of the 64 buffers that it supports. Each buffer state comprises 128 bit field that is divided to couple of 64 bit sub fields, referred to as buffer state memory one (BSM1) and two (BSM2). Tables 23 and 24 describe the bits and fields of the buffer state memory.

BUFFER STATE MEMORY 1 (0×00)

TABLE 23

| BIT | NAME | INITIALIZED WITH VALUE |
|---|---|---|
| 11:0 | Initial input pointer | Initialized to the buffer start address. That is, the full 12 bits, comprising the 6 bits of the buffer start address (BSA) appended with 6 zeros |

TABLE 23-continued

| BIT | NAME | INITIALIZED WITH VALUE |
|---|---|---|
| 23:12 | Initial output pointer | [BSA] [000000] Initialized to the buffer start address similar to the initial output pointer. |
| 29:24 | Buffer end address (BEA) | Initialize with 6 bits of the higher 6 bits that comprise the full 12 bits of the buffer address for it's end and start address respectively. |
| 35:30 | Buffer start address (BSA) | i.e., specified in multiples of 64 bytes. The actual buffer start address is obtained by appending 6 zeros to the buffer start address and the end address is obtained by appending 6 ones to the buffer end address. Example 1: for a buffer of size 64 bytes starting at the beginning of the buffer BSA = 000000 BEA = 000000 actual start address is 000000000000 actual end address is 000000111111 Example 2: for a buffer of size 128 bytes starting 64*11 bytes from the beginning of the buffer BSA = 001011 BEA = 001100 actual start address is 001011000000 actual end address is 001100111111 |
| 41:36 | Output chunk size | Specify in multiples of 32 bytes. Is the number of bytes that must be brought into the buffer by the input channel or input i/o device before the output (destination) channel is activated to transfer "output chunk size" number of bytes out of the buffer. 0 => 0 bytes 1 => 32 bytes 2 => 64 bytes, and so on. |
| 47:42 | Input chunk size | Similar to output chunk size, but used to trigger the input (or source) channel, when input chunk size number of bytes have been moved out of the buffer. |
| 53:48 | Output channel id | Value between 0 and 63, representing the output (destination) channel tied to this buffer, if one exists, as indicated by the output channel memory flag. |
| 59:54 | Input channel id | Value between 0 and 63, representing the input (source) channel tied to this buffer, if one exists, as indicated by the input channel memory flag. |
| 60 | Output channel memory flag | Used to indicate whether this transfer direction is represented by a channel or an I/O device. 0 => I/O, 1 => channel. |
| 61 | Input channel memory flag | Used to indicate whether this transfer direction is represented by a channel or an I/O device. 0 => I/O, 1 => channel. |
| 63:62 | reserved | xx |

BUFFER STATE MEMORY 2 (0×00)

TABLE 24

| BIT | NAME | INITIALIZED WITH VALUE |
|---|---|---|
| 11:0 | Current input count | 0 |
| 23:12 | Current output count | 0 |
| 24 | Input valid sense | 0 |
| 25 | Output valid sense | 0 |
| 26 | Last input arrived | 0 |
| 63:27 | reserved | xxx |

DMA CONTROLLER

Figure 11:
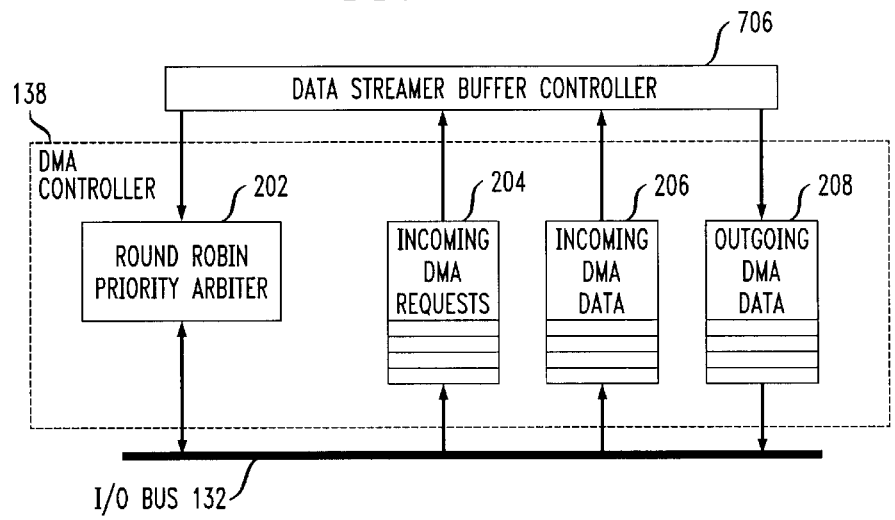
FIG. 11 is a block diagram of a direct memory access controller in accordance with one embodiment of the invention.

FIG. 11 illustrates a DMA controller 138 in accordance with one embodiment of the invention, although the invention is not limited in scope in that respect. As mentioned before, DMA controller 138 is coupled to input/output bus 132 and data streamer buffer controller 706.

A priority arbiter 202 is configured to receive a direct memory access DMA request from one or more I/O devices that are coupled to I/O bus 132.

An incoming DMA request buffer 204 is coupled to I/O bus 132 and is configured to receive pertinent request data from I/O devices whose request has been granted. Each I/O device specifies a request data comprising the buffer identification of a desired buffer memory, the number of bytes and the type of transfer, such as input to the buffer or output from the buffer. Each request is stored in incoming DMA request 204 buffer to define a DMA request queue. An output port of DMA request buffer 204 is coupled to data streamer buffer controller 706 as described in reference with FIG. 10.

An incoming DMA data buffer 206 is also coupled to I/O bus 132 and is configured to receive the data intended to be sent by an I/O device whose request has been granted and whose request data has been provided to incoming DMA request buffer 204. An output port of DMA data buffer 206 is coupled to data streamer buffer controller 706 as described in reference with FIG. 10.

An outgoing DMA data buffer 208 is also coupled to I/O bus 132 and is configured to transmit the data intended to be sent to an I/O device. Outgoing DMA data buffer 208 is configured to receive data from data streamer buffer controller 706 as explained in reference with FIG. 10.

Thus during operation, DMA controller 138 performs two important functions. First, it arbitrates among the I/O devices that intend to make a DMA request. Second, it provides buffering for DMA requests and data that are sent to data streamer buffer controller and for data that are sent to an I/O device via I/O bus 132. Each DMA transfer is initiated by an I/O device coupled to I/O bus 132. The I/O device that makes a DMA request, first requests priority arbiter 202 to access I/O bus for transferring its intended data. Arbiter 202 employs the DMA priority value specified by the I/O device to arbitrate among the different I/O devices. DMA controller 138 assigns a higher priority to data coming from I/O devices over data sent from the I/O devices. Conflicting requests are arbitrated according to device priorities.

Preferably, device requests to DMA controller 138 are serviced at a rate of one per cycle, fully pipelined. Arbiter 202 employs a round robin priority scheduler arrangement with four priority levels. Once a requesting I/O device receives a grant signal from arbiter 202, it provides its request data to DMA request buffer 204. If the request is an output request, it is provided directly to data streamer buffer controller 706. If the buffer associated with the buffer identification contained in request data is not large enough to accommodate the data transfer, data streamer buffer controller informs DMA controller 138, which in turn signals a not acknowledge NACK indication back to the I/O device.

If the request from a request I/O device is for a data input, DMA controller signals the I/O device to provide its data onto I/O bus 132, when it obtains a cycle on the I/O data bus. Data streamer buffer controller generates an interrupt signal when it senses buffer overflows or underflows. The interrupt signals are then transmitted to the processor that controls the operation of multimedia processor 100.

DMA controller 138 employs the buffer identification of each request to access the correct buffer for the path, via data streamer buffer controller 706, which moves the requested bytes into or out of the buffer and updates the status of the buffer.

Figure 15A:
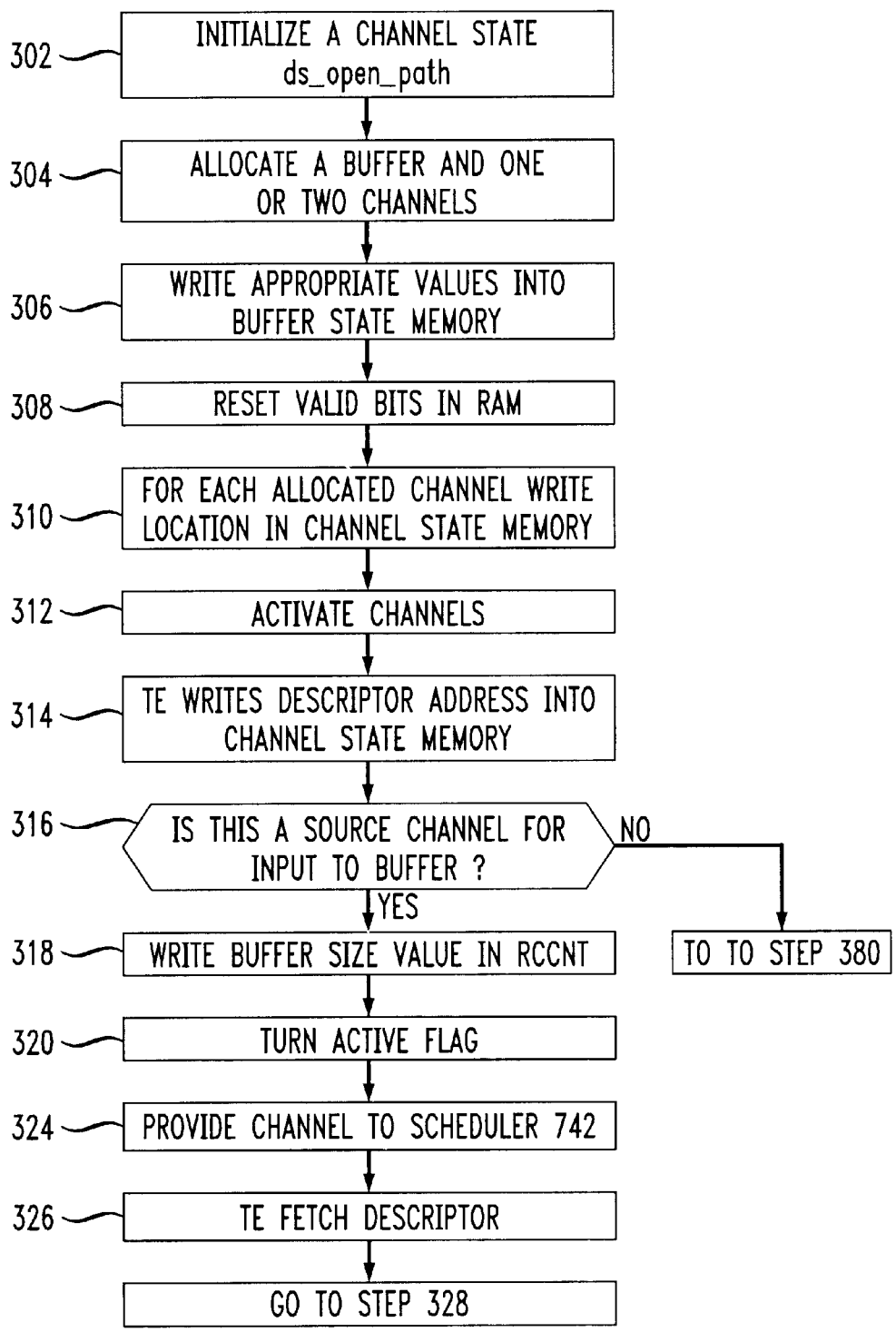
FIGS. 15(a)–15(c) illustrate a flow chart for setting a data path in accordance with one embodiment of the invention.
Figure 15B:
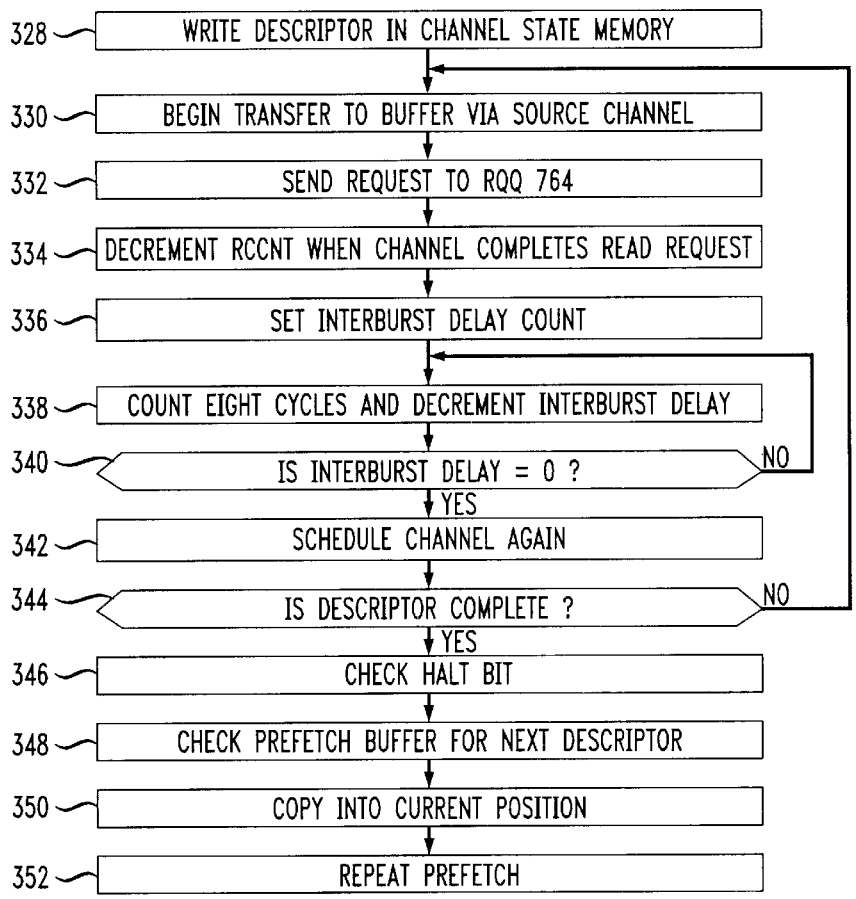
Figure 15C:
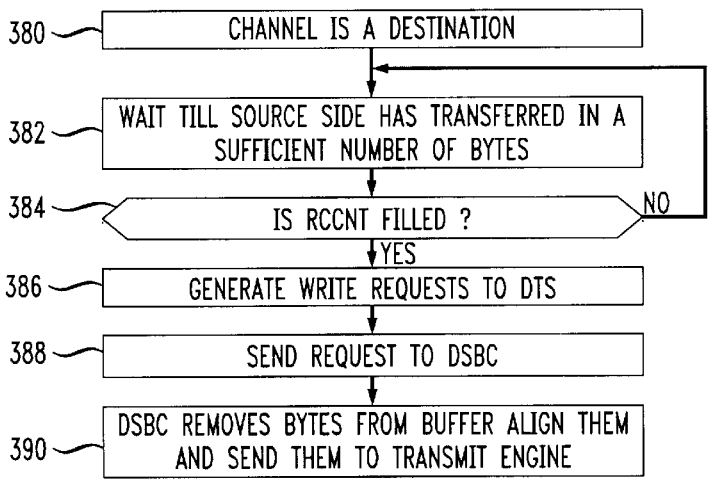
Figure 16:
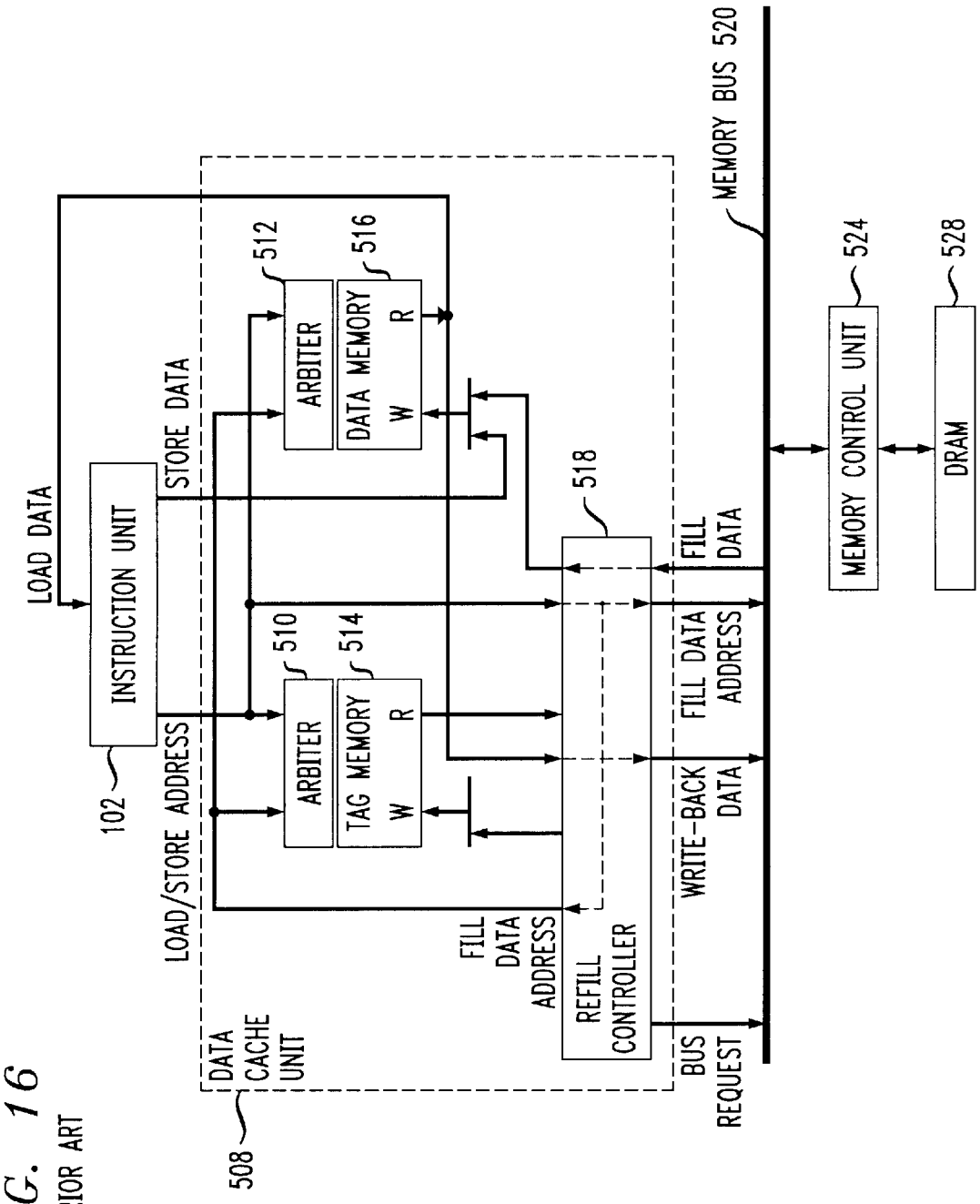
FIG. 16 illustrates a block diagram of a prior art cache memory system.

An exemplary operation of data streamer channel functions is now explained in more detail in reference with FIGS. 15(a) through 15(c), which illustrate a flow diagram of different steps that are taken in data streamer 122.

In response to a request for a data transfer operation, a channel's state is first initialized by, for example, a command referred to as ds_open_path, at step 302. At step 304, the available resources for setting up a data path is checked and a buffer memory and one or two channels are allocated in response to a request for a data transfer operation.

At step 306 the appropriate values are written into buffer state memory 708 for the new data path, in accordance with the values described in reference with Tables 23 and 24. At step 308, valid bits are reset in buffer memory 714 at locations corresponding to the portion of the allocated data RAM that will be used for the buffer. At step 310, for each allocated channel corresponding channel state memory locations are initialized in channel state memory 704, in accordance with Tables 13–19.

Once a data path has been defined in accordance with steps 302 through 310, the initialized channel is activated in step 312. In accordance with one embodiment of the invention, the activation of a channel may be a software call referred to as a ds_kick command. Internally, this call translates to a channel ds_kick operation which is an uncached write to a PIO address specified in the PIO map as explained in reference with Tables 10–12. The value stored in channel state memory is the address of the descriptor, such as descriptor 220 (FIG. 13) or descriptor 240 (FIG. 14), the channel begins to execute.

At step 314 transfer engine 702 receives the channel activation signal from PIO controller 126 and in response to this signal writes the descriptor address into a corresponding location in channel state memory 704. At step 316, transfer engine 702 determines whether the channel activation signal is for a source (input to buffer) channel. If so, at step 318, the buffer size value is written in the remaining chunk count (RCCNT) field as illustrated in Table 15. The value of the remaining chunk count for a source channel indicates the number of empty spaces in the buffer memory allocated for this data transfer and hence the number of bytes that the channel can safely fetch into the buffer. It is noted that the value of the remaining chunk count for a destination channel indicates the number of valid bytes in the buffer, and hence the number of bytes that the channel can safely transfer out.

Finally, at step 320, transfer engine 702 turns on the active flag in the corresponding location in channel state memory as described in Table 15. The corresponding interburst delay field in channel state memory 704 for an allocate source channel is also set to zero.

At step 324, a channel is provided to operation scheduler 742 (FIG. 8). Each channel is considered for scheduling by operation scheduler 742 of transfer engine 702 (FIG. 8), when the channel has a zero interburst-delay count, its active flag is turned on, and its corresponding remaining chunk count (RCCNT) is a non-zero number.

When a channel's turn reaches by scheduler 742, transfer engine 702 starts a descriptor fetch operation at step 326. When the descriptor arrives via the data transfer switch interface 718 (FIG. 9), receive engine 772 routes the arrived descriptor to transfer engine 702. At step 328, the values of the descriptor are written in the allocated channel location in channel state memory 704. At step 330 the source channel is ready to start to transfer data into the allocated buffer in buffer memory 714.

When the source channel is scheduled, it begins to prefetch the next descriptor and at step 332 generates read request messages for data, which are added to request buffer queue RQQ 764 of data transfer switch interface 718 of FIG. 9. It is noted that in accordance with one embodiment of the invention, the prefetch of the next descriptor may be inhibited by the user by setting both the halt and prefetch bits in the control word descriptor as described in reference with FIGS. 13 and 14. Furthermore, prefetch is not performed when a "last descriptor" bit is set in the control word of the current descriptor.

The number of read requests added to request queue 764 depends on several parameters. For example, one such parameter is the burst size value written into the channel state memory for the currently serviced channel. A burst size indicates the size of data transfer initiated by one request command. Preferably, the number of requests generated per schedule of the channel does not exceed the burst size. Another parameter is the remaining chunk count. For example, with a burst size of 3, ff, the buffer size is 64 bytes, and therefore, two requests may be generated, since each data transfer switch request may not exceed 32 bytes, in accordance with one embodiment of the invention. Another parameter is the width, pitch, and count fields in the descriptor. For example, if the width is 8 bytes separated by a pitch of 32 bytes, for a count of 4, then, with a burst size of 3, and a remaining chunk count RCCNT of 64, the channel will generate 3 read requests of 8 bytes long. Then it will take another schedule of the channel to generate the last request that would fulfill the descriptor's need for the forth count.

Once the channel completes its read requests, at step 334, the value of remaining chunk count is decremented appropriately. The interburst delay count field is set to a specifiable minimum interburst delay value. This field is decremented every 8 cycles at step 338. When the value of this field is zero at step 340, the channel is scheduled again to continue its servicing.

At step 342 the channel is scheduled again. For the example described above, the channel generates one request to fulfill the 1st 8 bytes. On completion of the descriptor at step 344, the active flag is turned off and the channel is not considered again by the priority scheduler 740 until the active flag field in Table 15 is set again, for example by a data path continue operation command referred to as ds_continue call. If the halt bit is not set, at step 346, the channel will check whether the prefetched descriptor has been arrived. If the descriptor has already arrived, it will copy the prefetched descriptor to the current position in step 350, and start the prefetch of the next descriptor at step 352.

Transfer engine 702 continues to generate read requests for this channel until, burst size has been exceed; remaining chunk count RCCNT has been exhausted; a halt bit is encountered; the next descriptor has not arrived yet; or the last descriptor has been reached.

Referring to FIG. 15(a) at step 316, when the currently considered channel is a destination channel, step 380 is executed wherein the channel is not immediately scheduled like a source channel, because the value of the remaining chunk count field is zero. The destination channel waits at step 382 until the source side has transferred a sufficient number of data to its allocated buffer. As explained before, the data source that provides data to the allocated buffer may be another channel or an input/output I/O device. It is noted that data streamer buffer controller 706 (FIG. 10) keeps track of incoming data. When the number of bytes of the incoming data exceeds the output chunk count as described in Table 23, it sends the chunk count to transfer engine 702 (FIG. 8) for that destination channel. Transfer engine 702 adds this value to the destination channel's RCCNT field in the appropriate channel location in channel state memory 704. At step 384, when this event happens, the destination channel is ready to be scheduled. Thereafter at step 386, transfer engine 702 generates write requests to data transfer switch 112 via data transfer switch interface 718.

The manner in which write requests are generated are based on the same principle described above with reference to the manner that read requests are generated in accordance with one embodiment of the invention. Thus, the parameters to be considered may include, the burst size, the remaining chunk count value, and descriptor fields such as pitch, width and count.

Once the write request address has been provided to the request bus, data transfer switch interface 718 forwards the request to data streamer buffer controller 706 at step 388. In response, data streamer buffer controller 706 (FIG. 10) removes the necessary number of bytes from buffer memory 714, aligns the retrieved data and puts them back in transmit engine 782 of FIG. 9 as described above, in reference with FIGS. 8–10.

DATA CACHE

The structure and operation of data cache 108 in accordance with one embodiment of the invention is described in more detail hereinafter, although the invention is not limited in scope to this embodiment.

Figure 17:
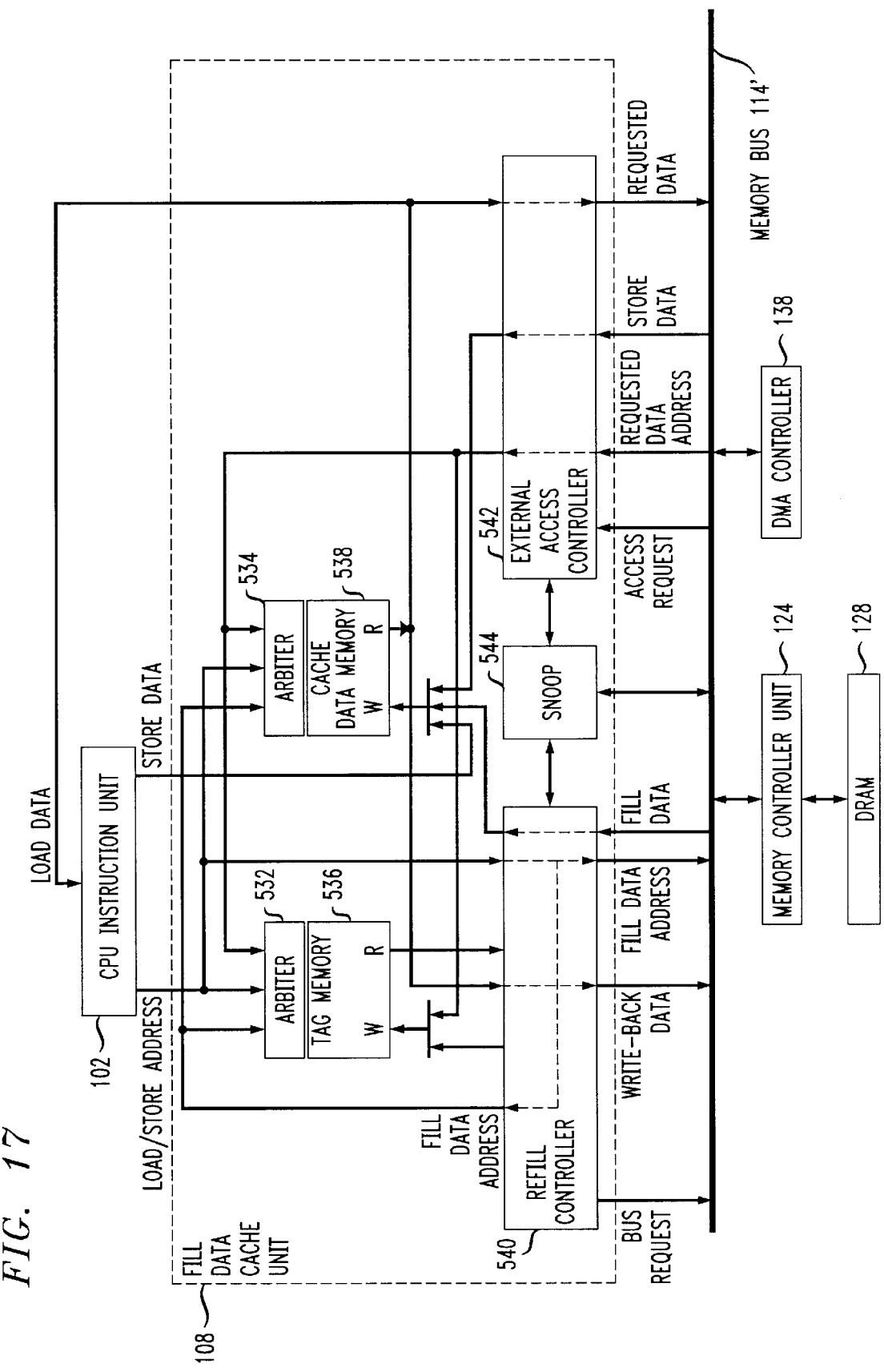
FIG. 17 illustrates a block diagram of a cache memory system in accordance with one embodiment of the present invention.

FIG. 17 illustrates a block diagram of data cache 108 coupled to a memory bus 114'. It is noted that memory bus 114' has been illustrated for purposes of the present discussion. Thus, in accordance with one embodiment of the invention, data cache 108 may be coupled to data transfer switch 112, and hence, to processor memory bus 114 and internal memory bus 120 via transceiver 116.

Data cache 108 includes a tag memory directory 536 for storing tag bits of addresses of memory locations whose contents are stored in the data cache. A data cache memory 538 is coupled to tag memory 536 to store copies of data that are stored in a main external memory. Both tag memory directory 536 and data cache memory 538 are accessible via arbiters 532 and 534 respectively. An input port of each tag memory 536 and data cache memory 538 is configured to receive "write" data as described in more detail below. Furthermore, another input port of each tag memory 536 and data cache memory 538 is configured to receive "read" data as described in more detail below.

A refill controller unit 540 also referred to as data cache controller 540 is employed to carry out all of a fixed set of cache policies. The cache policies are the rules chosen to implement the operation of cache 108. Some of these policies are well-known and described in J. Handy, *Data Cache Memory Book,* (Academic Press, Inc. 1993), and incorporated herein by reference. Typically, these policies may include direct-mapped vs. N-Way caching, write-through vs. write-back arrangement, line size allocation and snooping.

As described above a "way" or a "bank" in a cache relates to the associativity of a cache. For example, an N-way or N-bank cache can store data from a main memory location into any of N cache locations. For a multiple-way arrangement each way or bank includes its own tag memory directory and data memory (not shown). It is noted that as the number of the ways or banks increases so does the number of bits in the tag memory directory corresponding to each data stored in the data memory of each bank. It is further noted that a direct-mapped cache is a one-Way cache, since any main memory location can only be mapped into the single cache location which has matching set bits.

The snoop feature relates to the process of monitoring the traffic in bus 114' to maintain coherency. In accordance with one embodiment of the invention, a snoop unit 544 is coupled to memory bus 114' to monitor the traffic in bus 114'. Snoop unit 544 is coupled to both refill controller 540 and to external access controller 542. When a memory bus transaction occurs to an address which is replicated in data cache 108, snoop unit 544 detects a snoop hit and takes appropriate actions according to both the write strategy (write-back or write-through) and to the coherency protocol being used by the system. In accordance with one embodiment of the invention, data cache 108 performs a snoop function on data transfer operations performed by data streamer 122.

Returning to the description of refill controller 540, an output port of the refill controller is coupled to tag memory 536 and data memory 538 via arbiters 532 and 536 respectively. Another output port of refill controller 540 is coupled to the write input port of tag memory 532. Another output port of refill controller 540 is coupled to the write input port of cache data memory 538.

Other output ports of refill controller 540 include bus request port coupled to memory bus 114' for providing bus request signals; write-back data port coupled to memory bus 114' for providing write-back data when data cache 108 intends to write the contents of a cache line into a corresponding external memory location; fill data address port coupled to memory bus 114' for providing the data address of the cache line whose contents are intended for an external memory location.

An input port of refill controller 540 is configured to receive data signals from a read output port of data memory 516. A second input port of refill controller 540 is configured to receive tag data from tag memory directory 532. Another input port of refill controller 540 is configured to receive a load/store address signal from an instruction unit of a central processing unit 102.

In accordance with one embodiment of the invention, data cache 108 also includes an external access controller 542. External access controller 542 allows data cache 108 function as a slave module to other modules in media processor system 100. Thus, any module in system 100 may act as a bus master for accessing data cache 108, based on the same access principle performed by central processing unit 102.

An output port of external access controller 542 is coupled to tag memory 536 and cache data memory 538 via arbiters 532 and 534 respectively, and to the write input port of tag memory 536. Another output port of external access controller 542 is coupled to the write input port of cache data memory 538. Finally, an output port of external access controller 542 is coupled to memory bus 114' for providing the data requested by a bus master.

An input port of external access controller 542 is configured to receive data from cache data memory 538. Other input port of external access controller 542 include an access request port coupled to memory bus 114' for receiving access requests from other bus masters; a requested data address port coupled to memory bus 114' for receiving the address of the data relating to the bus master request; and a store data port coupled to memory bus 114' for receiving the data provided by a bus master and that is intended to be stored in data cache 108.

Memory bus 114' is also coupled to DRAM 128 via a memory controller 124. Furthermore memory bus 114' is coupled to a direct memory access controller 138. An output port of central processing unit 102 is coupled to tag memory 536 and cache data memory 538 via arbiters 532 and 534 respectively, so as to provide addresses corresponding to load and store operations. Another output port of central processing unit 102 is coupled to the write input port of cache data memory 538 to provide data corresponding to a store operation. Finally, an input port of central processing unit 102 is coupled to read output port of cache data memory 538 to receive data corresponding to a load operation.

Figure 18:
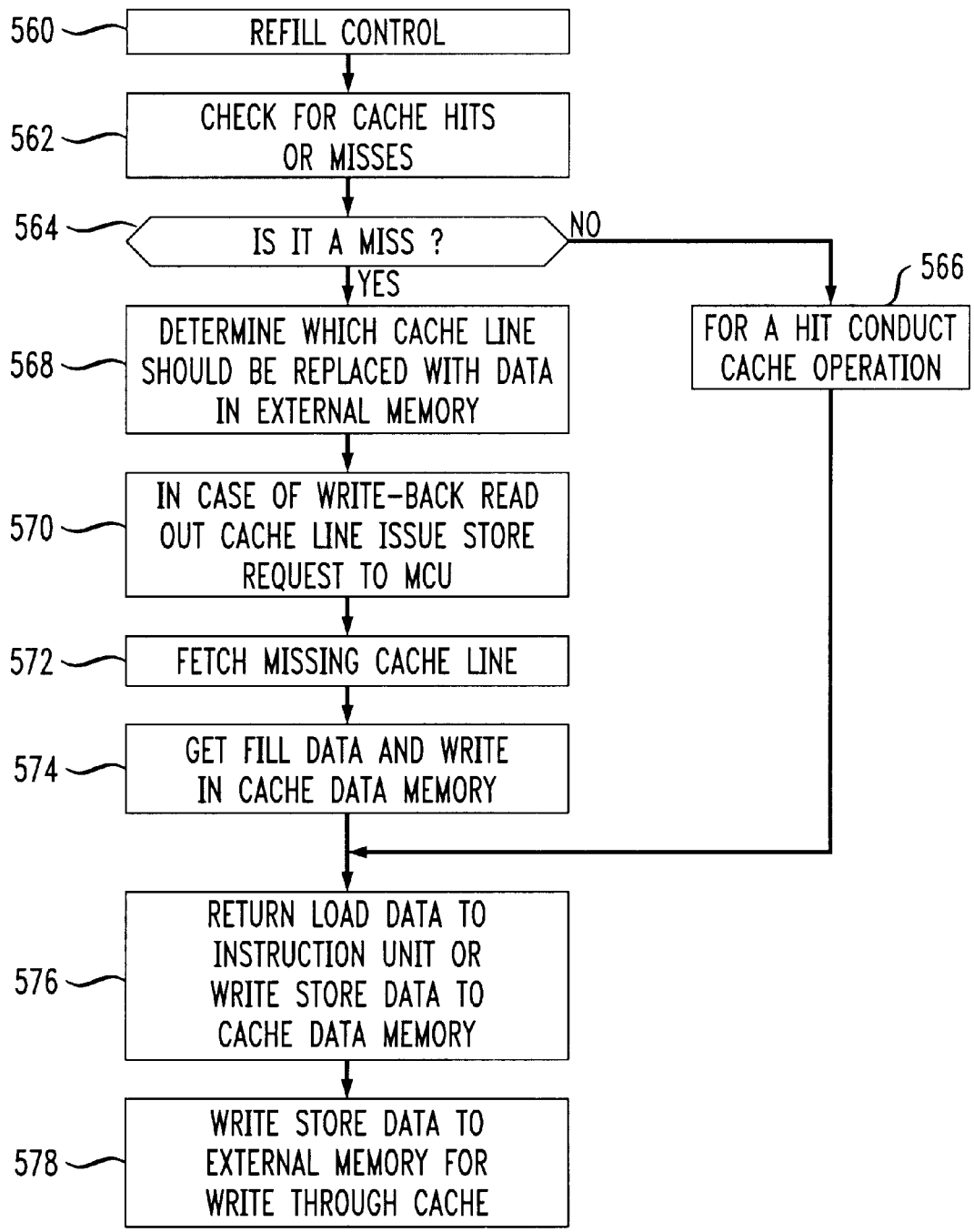
FIG. 18 is a flow chart illustrating the operation of a prior art cache memory system.

The operation of refill controller 540 is now described in reference with FIG. 18. At step 560 refill controller begins its operation. At step 562, refill controller 540 determines whether a request made to data cache unit 108 is a hit or a miss, by comparing the tag value with the upper part of a load or store address received from central processing unit 102.

At step 564, if a cache miss occurred in response to a request, refill controller 540 goes to step 568, and determines the cache line that needs to be replaced with contents of corresponding memory locations in external memory such as DRAM 128. At step 570, refill controller determines whether cache 108 employs a write-back policy. If so, refill controller 540 provides the cache line that is being replaced to DRAM 128 by issuing a store request signal to memory controller 124. At step 572, refill controller 540 issues a read request signal for the missing cache line via fill data address port to memory controller 124. At step 574, refill controller 540, retrieves the fill data and writes it in cache data memory 538 and modifies tag memory 536.

Refill controller 540 then goes to step 576 and provides the requested data to central processing unit 102 in response to a load request. In the alternative, refill controller 540 writes a data in cache data memory 538 in response to a store request from central processing unit 102. At step 578, refill controller 540 writes the data to external memory, such as DRAM 128 in response to a store operation provided by central processing unit 102.

If at step 564, it is determined that a hit occurred in response to a load or store request from central processing unit 102, refill controller 540 goes to step 566 and provides a cache line from cache data memory 538 for either a read or a write operation. Refill controller 540 then goes to step 576 as explained above.

Figure 19:
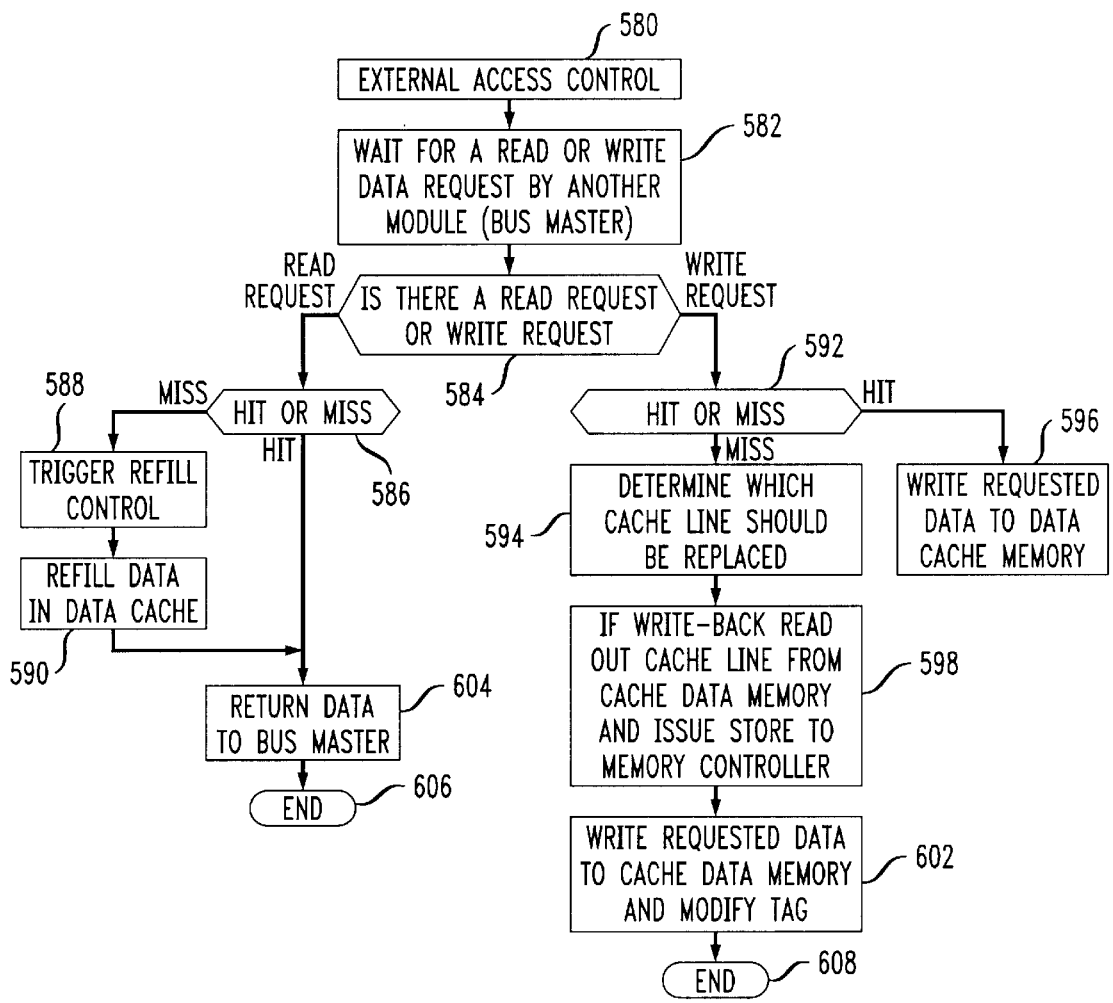
FIG. 19 is a flow chart illustrating the operation of a cache memory system in accordance with one embodiment of the invention.

The operation of external access controller 580 in conjunction with refill controller 540 in accordance with one embodiment of the present invention is now described in reference with FIG. 19.

At step 580 external access controller begins its operation in response to a bus master access request. In accordance with one embodiment of the invention, the bus master may be any one of the modules described above in reference with FIG. 1(a), and the access request may be issued as explained in connection with the operation of data streamer 122 and data transfer switch 112. At step 582 external access controller 542 waits for a read or write request by any of the bus masters.

Once external access controller 542 receives a request, it goes to step 584 to determine whether the bus master has requested a read or a write operation. If the request is a read, external access controller 542 goes to step 586 to determine whether a hit or a miss occurred. If in response to the read request a cache hit occurs, external access controller goes to step 604 and provides the requested data to the bus master.

If however, in response to the read request a cache miss occurs, external access controller goes to step 588 and triggers refill controller 540 so that refill controller 540 obtains the requested data and fills the data cache at step 590. After the refill of data, external access controller 542 provides the requested data to the bus master at step 604.

If at step 584 external access controller determines that the bus master requested to write a data to data cache 108, it goes to step 592 to determine whether a cache hit or a cache miss occurred. In response to a cache hit, external access controller 542 goes to step 596 and allows the bus master to write the requested data to data cache memory 538.

If at step 592, however, a cache miss occurred, external access controller goes to step 594 and determines which cache line in cache data memory needs to be replaced with contents of an external memory such as DRAM 128. External access controller then goes to step 598. If data cache 108 is implementing a write-back policy, external access controller at step 598 provides the cache line to be replaced from data cache memory 538 and issues a store request to memory controller 124 via memory bus 114'.

Thereafter, external access controller 542 goes to step 602 and writes the requested data to cache data memory and modifies tag memory 536 accordingly.

As mentioned before the external access controller 542 remarkably increases the cache hit ratio for many applications where it is possible to predict in advance the data that a central processing unit may require. As an example, for many 3D graphic applications, information about texture mapping is stored in an external memory such as DRAM 128. Because, it can be predicted which information will be necessary for the use by central processing unit 102, it is beneficial to transfer this information to data cache 108 before the actual use by central processing unit 102. In that event, when the time comes that central processing unit 102 requires a texture mapping information, the corresponding data is already present in the data cache and as a result a cache hit occurs.

THREE DIMENSIONAL (3D) GRAPHICS PROCESSING

With reference to FIG. 1(*a*), fixed function unit 106 in conjunction with data cache memory 108, central processing units 102, 104, and external memory 128, perform 3D graphics with a substantially reduced bandwidth delays in accordance with one embodiment of the invention, although the invention is not limited in scope in that respect.

Figure 20:
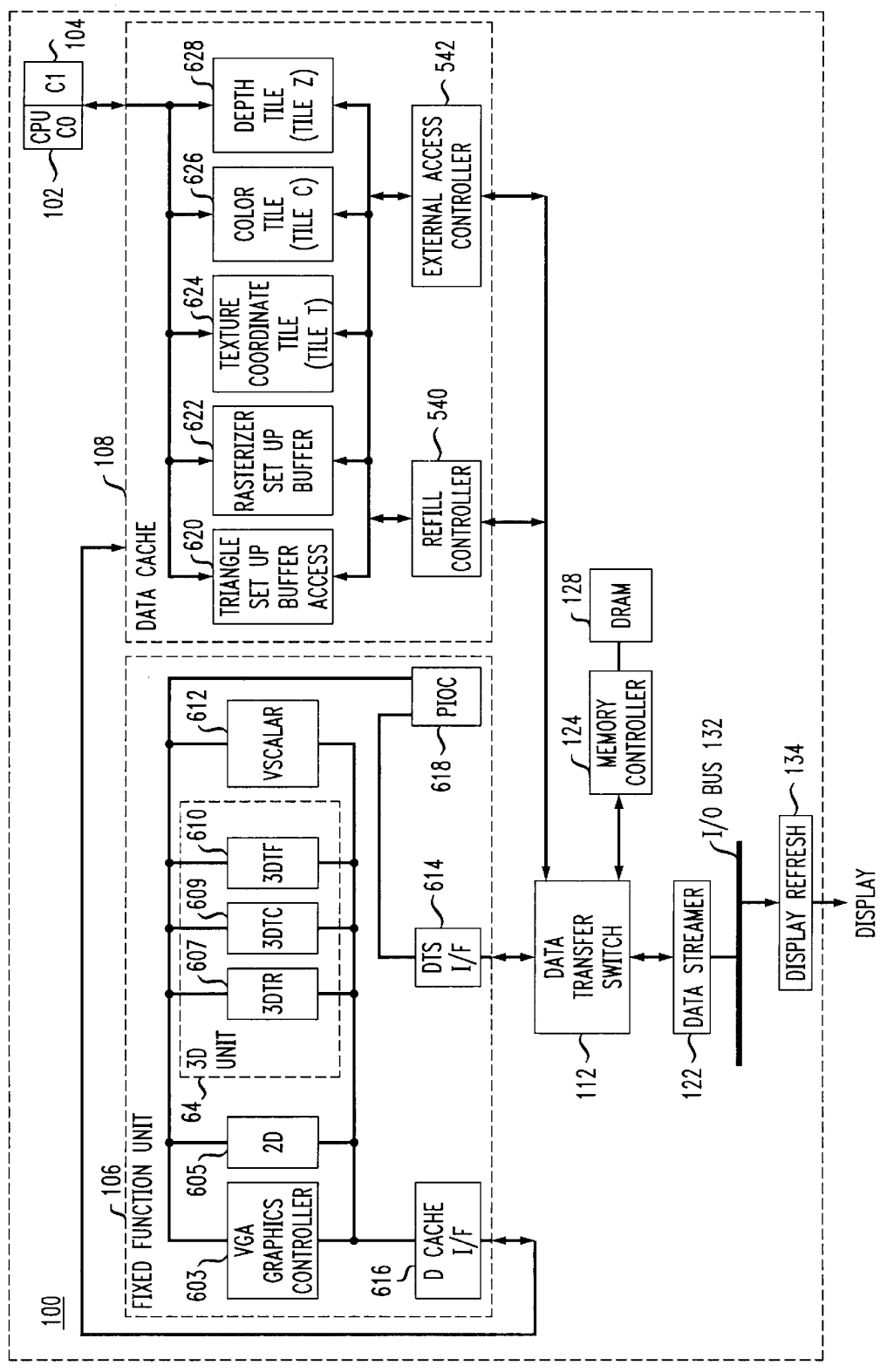
FIG. 20 is a block diagram of a fixed function unit in conjunction with a data cache in a multimedia processor in accordance with one embodiment of the invention.

FIG. 20 illustrates a block diagram with major components in multimedia processor 100 that are responsible for performing 3D graphics processing. Thus, in accordance with one embodiment of the invention, fixed function unit 106 includes a programmable input/output controller 618, which provides a control command for other components in the fixed function unit. The other components of the fixed function unit includes a VGA graphics controller 603, which is coupled to programmable input/output controller, PIOC, 618 and which is configured to process graphics for VGA format. A two dimensional (2D) logic unit 605 is coupled to programmable input/output controller, and is configured to process two-dimensional graphics.

Fixed function unit 106 also includes a three dimensional (3D) unit 611 that employs a bin-based rendering algorithm as will be described in more detail hereinafter. Basically, in accordance with one embodiment of the invention, the 3D unit manipulates units of data referred to as chunks, tiles, or bins. Each tile is a small portion of an entire screen. Thus, the 3D unit in accordance with one embodiment of the invention, preferably employs a binning process to draw 3D objects into a corresponding buffer memory space within multimedia processor 100. Thus, bottle necking problems encountered with the use of external memory for rendering algorithms can be substantially avoided because the data transfer within the multimedia processor chip can be accomplished at a substantially high bandwidth.

3D unit 611 includes a 3D tile rasterizer 607 that is also coupled to programmable input/output controller 618, and is configured to perform graphics processing tasks. Two major tasks of 3D tile rasterizer 607 include binning and rasterization, depending on its mode of operation, as will be explained in more detail in reference with FIGS. 21 and 22.

3D unit 611 also includes a 3D texture controller 609, which is also coupled to and controlled by programmable input/output controller 618. As will be explained in more detail, in reference with FIG. 23, 3D texture controller derives the addresses for the texels that are intended to be employed by 3D unit 611. Thus, based on the derived addresses, 3D texture controller 609 generates a channel descriptor for use by data streamer 122 to obtain the appropriate texels from a local memory such as SDRAM 128, as described above in reference with the operation of data streamer 122.

3D unit 611 also includes a 3D texture filter unit 610, which is coupled to and controlled by programmable input/output controller 618. As will be explained in more detail hereinafter, in reference with FIGS. 24 and 25, filter unit 610 is configured to perform texture filtering operations such as bi-linear (1 pass) and tri-linear (2 pass) interpolation, in conjunction with shading color blending and accumulation blending.

Fixed function unit 106 includes a video scaler unit 612 that is coupled to and controlled by programmable input/output controller 618. Video scaler unit 612 is configured to provide up and down scaling of video data using several horizontal and vertical taps. Video scaler 612 provides output pixels to a display refresh unit 226 (FIG. 1(*b*)) for displaying 3D objects on a display screen. As will be explained in more detail, in accordance with one embodiment of the invention, some of the functions of texture filter are based on the same principles as the functions of the video scaler. As such, video scaler 612 shares some of its functions with texture filter 610, in accordance with one embodiment of the invention.

Fixed function unit 106 includes a data transfer switch interface 614 that allows different components of the fixed function unit interact with data transfer switch 112 and data streamer 122. Data transfer switch interface 614 operates based on the same principles discussed above in reference with data transfer switch interface 718 as illustrated in FIG. 9. A data cache interface 616 allows fixed function unit 106 have access to data cache unit 108.

FIG. 20 illustrates various components of data cache 108 that are related to 3D graphics processing operation in accordance with one embodiment of the invention. However, for purposes of clarity, other features and components of data cache 108 as discussed in reference with FIGS. 16–19 have not been illustrated in FIG. 20. Furthermore, although the components of data cache 108 have been illustrated to be disposed within the data cache, it is to be understood that one or more components may be disposed as separate cache units in accordance with other embodiments of the invention.

Data cache 108 includes a triangle set-up buffer 620, which is configured to store results of calculations to obtain triangle parameters, such as slopes of each edge of a triangle. Data cache 10 also includes a rasterizer set-up buffer 622, which is configured to store additional parameters of each triangle, such as screen coordinates, texture coordinates, shading colors, depth, and their partial differential parameters. Data cache 108 includes a depth tile buffer, also referred to as tile Z buffer 628 that stores all the depth values of all the pixels in a tile.

Data cache 108 also includes a refill controller 540 and an external access controller 542, as discussed above in reference with FIGS. 17–19. Furthermore, central processing units 102,104 are coupled to data cache 108 as described above in reference with FIG. 1(a). Additional components illustrated in FIG. 20 include data transfer switch 112, data streamer 122, memory controller 124 and SDRAM 128, as disclosed and described above in reference with FIGS. 1–15. I/O bus 132 is configured to provide signals to a display refresh unit 226, which provides display signals to an image display device, such as a monitor (not shown). In accordance with one embodiment of the invention, video scaler 612 is coupled directly to display refresh 226.

As will be explained in more detail below, the geometry and lighting transformations of all triangles on a screen are performed by VLIW central processing units 102 in accordance with one embodiment of the invention. 3D unit 611 is responsible to identify all the bins or tiles and all the triangles that intersect with each tile. Specifically, 3D triangle rasterizer 607 identifies all the triangles in each tile. Thereafter for each bin or tile, VLIW central processing units 102 perform a triangle set-up test to calculate the parameters of each triangle such as slope of the edges of each triangle. 3D triangle rasterizer 607 also rasterizes all the triangles that intersect with each bin or tile. 3D texture controller 607 calculates the texture addresses of all pixels in a bin or a tile.

Once the addresses of texels are obtained, data streamer 122 obtains the corresponding texel information from SDRAM 128. 3D texture filter 610 performs bi-linear and tri-linear interpolation of fetched texels. Data streamer 122 thereafter writes the processed image data of each tile or bin into a frame buffer. Thus, the frame buffer defines an array in DRAM 128 which contains the intensity/color values for all pixels of an image. The graphics display device can access this array to determine the intensity/color at which each pixel is displayed.

Figure 21:
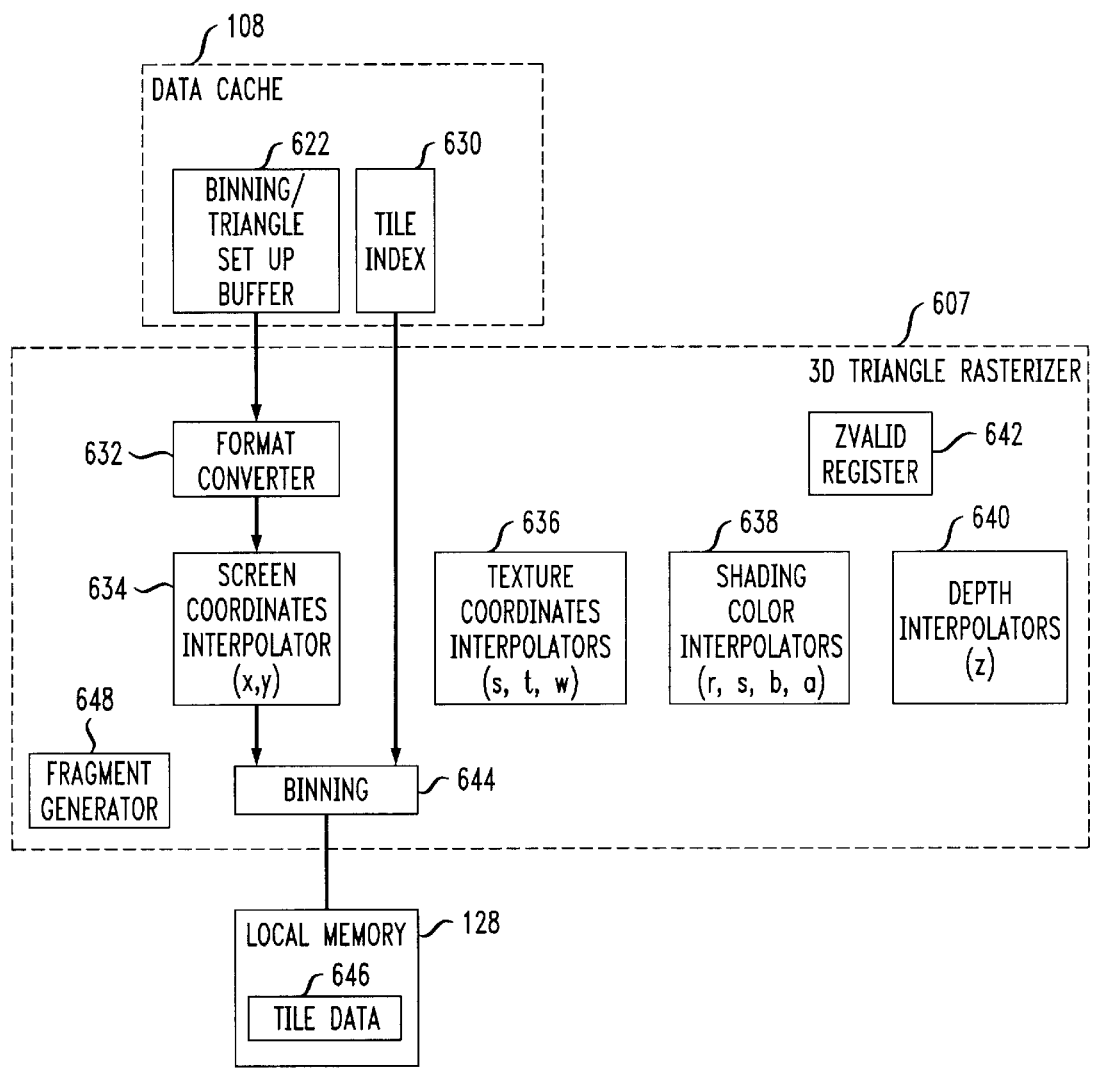
FIG. 21 is a block diagram of a 3D triangle rasterizer in a binning mode in accordance with one embodiment of the invention.

FIG. 21 is a block diagram of 3D triangle rasterizer 607 in accordance with one embodiment of the invention. For purposes of clarity, FIG. 21 illustrates the signal flows that occur when 3D triangle rasterizer 607 is operating in a binning mode as will be explained in more detail below.

Data cache 108 is coupled to 3D triangle rasterizer 607 so as to provide the information necessary for the binning operation. Two of the buffers in data cache 108 that are employed during the binning operation are set-up buffer 622 and tile index buffer 630.

3D triangle rasterizer 607 includes a format converter unit 632 which is configured to receive triangle set-up information from data cache 108. Format converter unit 532 converts the parameters received from data cache 108 from floating point numbers to fixed point numbers. A screen coordinates interpolator 634 is in turn coupled to format converter 632, to provide the x,y coordinates of the pixels that are being processed by 3D triangle rasterizer 607. A binning unit 644 is configured to receive the x,y coordinates from interpolator 634 and perform a binning operation as described in more detail in reference with FIG. 26. The binning unit is also coupled to tile index buffer 630. Information calculated by binning unit 644 is provided to a tile data buffer 646 within memory 128, via data streamer 122.

During operation, 3D triangle rasterizer 607 reads the screen coordinates of each node or vertex of a triangle, taken as an input from data cache 108. Thereafter, the triangle rasterizer identifies all triangles that intersect each bin or tile, and composes data structures called tileindex and tiledata as an output in SDRAM 128.

As mentioned, before a rasterization phase begins, all triangles of an entire screen are processed for geometry and lighting. Setup and rasterization are then repeatedly executed for each bin or tile. Binning involves the separation of the output image up into equal size squares. In accordance with one embodiment of the invention, the size of each bin or tile is a square area defined by 16×16 pixels. Each square is rasterized and then moved to the final frame buffer. In order for a bin to be correctly rasterized, the information relating to all of the triangles that intersect that bin should be preferably present. It is for this purpose that setup and rasterization data for all the triangles in a screen are first obtained prior to the binning process.

Binning involves the process of taking each pixel along the edges of a triangle and identify all the bins that the pixels of a triangle belong to. Thus, the process begins by identifying the pixel representing the top vertex of a triangle and thereafter moving along the left and right edges of the triangle to identify other pixels that intersect with horizontal scan lines, so as the corresponding bins where the pixels belong to are obtained. Once the bins are identified an identification number, or triangle ID, corresponding to the triangle that is being processed is associated with the identified bins.

Tile index buffer 630, is preferably a 2 dimensional array that corresponds to the number of bins on a screen that is being processed. This number is static for a given screen resolution. Thus, tile index buffer 630 includes an index to the first triangle ID in tile data buffer 646. The tile data buffer is a static array of size 265K in local memory, in accordance with one embodiment of the invention. Tile data buffer 646 contains a triangle index, and a pointer to the next triangle. Thus, by following the chain, all the triangles for a given bin can be found, in accordance with one embodiment of the invention.

Figure 26:
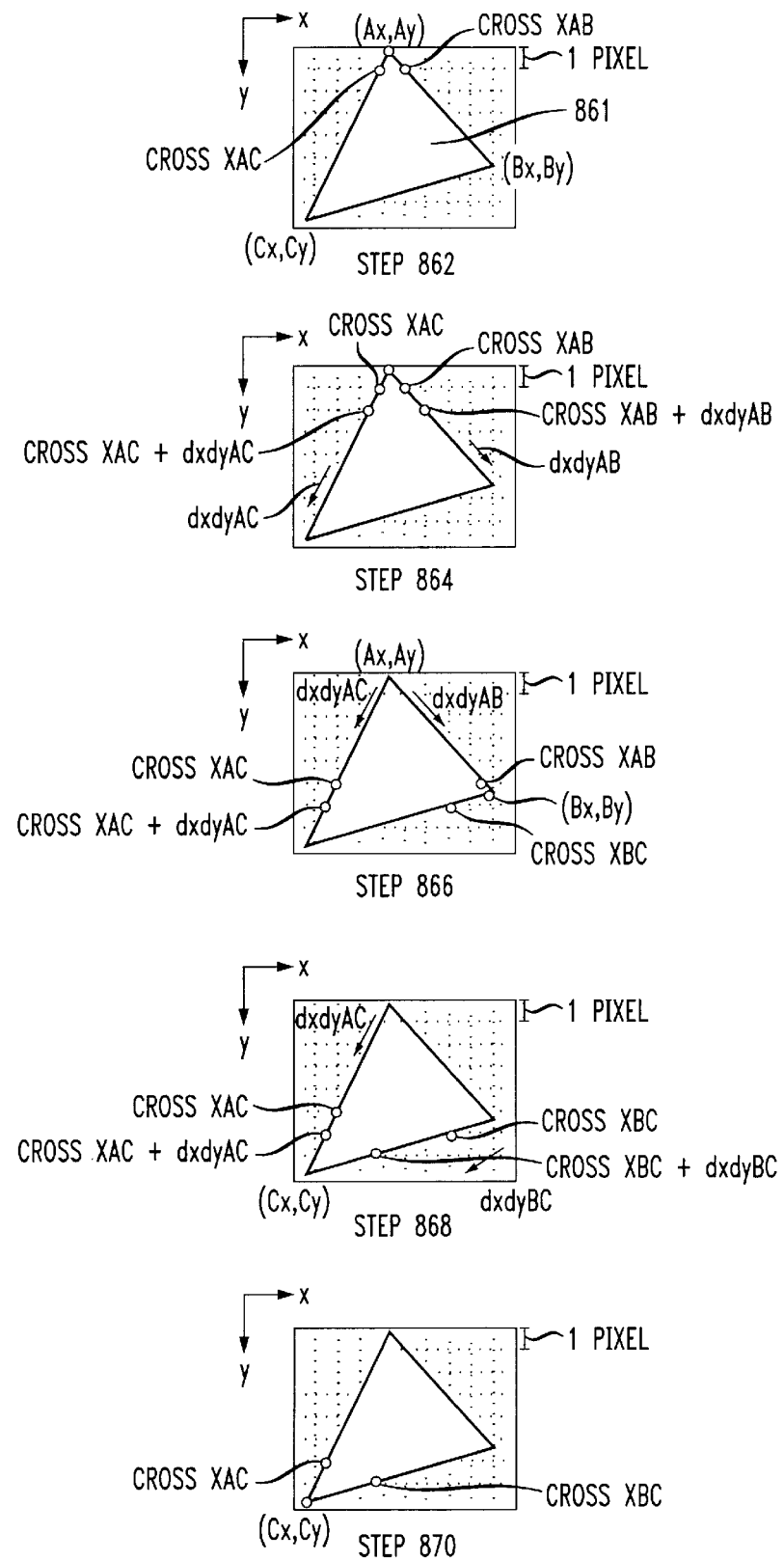
FIG. 26 is a plot of a triangle subjected to a binning process in accordance with one embodiment of the invention.

FIG. 26 illustrates the operation of a binning process on an exemplary triangle, such as 861, in accordance with one embodiment of the invention, although the invention is not limit in scope in that respect. Triangle 861 is divided into 2 sub-triangles with a horizontal line drawn through the middle node or vertex B. As illustrated in FIG. 26, triangle 861 spans several pixels both in the horizontal and vertical direction, which define a triangle window. Binning unit 644 spans these pixels line by line. Thus, at step 862, binning unit 644 processes the line that includes the top vertex a of the triangle. During the span, the x coordinate of the left-most pixel is Ax or Cross XAC and the x coordinate of the right-most pixel is Ax or Cross XAB. Cross XAC is the x coordinate of the cross point between the edge AC and the next span, and, Cross XAB is the x coordinate of the cross point between the edge AB and the next span. In order to extract the bins in which these pixels belong, binning unit 644 employs the condition X=[min 2(Ax, Cross XAC), max2 (Ax, Cross XAB)], wherein X is the x-coordinate range of the triangle for each scanline.

At step 864, binning unit 644 employs the condition $$X=[\min 2(\text{Cross}XAC, \text{Cross}XAC+dxdy\,AC), \max 2 (\text{Cross}XAB, \text{Cross } XAB+dxdyAB)]$$

The x coordinate of each cross point between the edges AC and AB of the following span is derived by $$\text{Cross}XAC=\text{Cross } XAC+dxdyAC$$

$$\text{Cross}XAB=\text{Cross}XAB+dxdyAB$$

wherein dxdyAC is the slope of the edge AC of triangle 861, and dxdyAB is the slope of the edge AB of triangle 861. Step 864 repeats till the span includes the middle vertex B. Thereafter binning unit 644 goes to step 866.

At step 866, the x coordinate of the right-most pixel is the maximum of three parameters, such that $$X=[\min 2(\text{Cross } XAC, \text{Cross } XAC+dxdyAC), \max 3 (\text{Cross } XAB, Bx, \text{Cross } XBC)],$$

wherein CrossXBC is the x coordinate of the cross point between BC and the next span. Thereafter, binning unit 644 performs step 868, by continuing to add Cross XAC and Cross XBC with dxdyAC and dxdyBC until the spans include the bottom vertex C, such that $$X=[\min 2(\text{Cross } XAC, \text{Cross } XAC+dxdyAC), \text{Max } 2(\text{Cross } XBC, \text{Cross}XBC+dxdyBC)\},$$

and $$\text{Cross}XAC=\text{Cross}XAC+dxdyAC$$

$$\text{Cross}XBC=\text{Cross}XBC+dxdyBC.$$

Finally at step 870, binning unit 644 identifies the bins wherein the last pixels belong such that $$X=[\min 2 (\text{Cross } XAC, Cx), \max 2 (\text{Cross } XBC, Cx)].$$

During the above steps 862 through 870, binning unit 644 stores the IDs of all the bins which the pixels in the edges of each triangle belong to. As a result of the binning process for all triangles displayed in a screen, tile index buffer 630 and tile data buffer 646 are filled. This allows 3D unit 611 to retrieve the triangles which cross over a bin when each bin or tile is processed as explained hereinafter.

Figure 22:
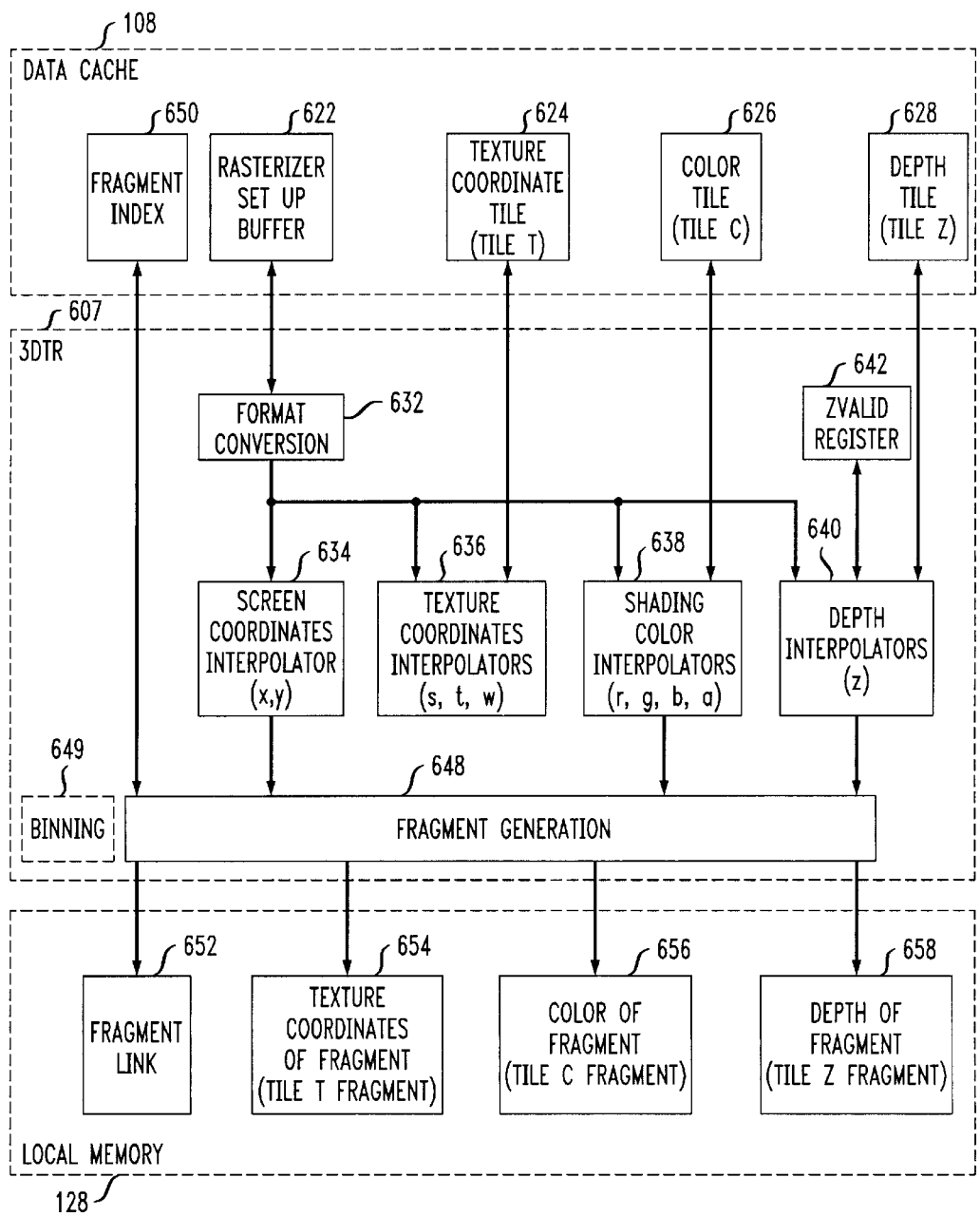
FIG. 22 is a block diagram of a 3D triangle rasterizer in interpolation mode in accordance with one embodiment of the invention.

FIG. 22 illustrates 3D triangle rasterizer 607 in a rasterization mode. It is noted that the data structures employed during the rasterization mode can re-use the memory of data cache 108, where the tile index buffer 630 was employed during the binning mode. Thus, prior to rasterization, the contents of tile index buffer 630 is written to local memory DRAM 128.

3D triangle rasterizer 607 includes a texture coordinates interpolator 636 which is coupled to format converter 632, and which is configured to obtain texture coordinate data of pixels within a triangle by employing an interpolation process. A color interpolator 618 is coupled to format converter 632, and is configured to obtain color coordinates of pixels within a triangle by employing an interpolation method.

A depth interpolator 640 is also coupled to format converter 632, and is configured to obtain the depth of the pixels within a triangle. It is important to note that in accordance with one embodiment of the invention, when a bin is being rendered it is likely that the triangles within a bin are in overlapping layers. Layer is a separable surface in depth from another layer. 3D triangle rasterizer 607 processes the layers front to back so as to avoid rasterizing complete triangles in succeeding layers. By rasterizing only the visible pixels, considerable calculation and processing may be saved. Thus, rasterizer 607 sorts the layers on a bin by bin basis. Because the average number of triangles in a bin is around 10, the sorting process does not take a long time. This sorting occurs prior to any triangle set-up or rasterization in accordance with one embodiment of the invention.

It is noted that preferably the triangles in a bin are not sorted just on each triangle's average depth or Z value. For larger triangles, depth interpolator 640 obtains the Z value of the middle of the triangle. Z-valid register 642 is coupled to depth interpolator 642 to track the valid depth values to be stored in a depth tile buffer 628 in data cache 108 as described below.

As illustrated in FIG. 22, the buffers employed in data cache 108 during rasterization mode are fragment index 650, rasterizer set-up buffer 622, texture coordinate tile (tile T) 624, color tile (tile C) 626 and depth tile (tile Z) 628. Fragment index 650 is coupled to a fragment generator 648, which provides fragments which are employed for anti-aliasing or α blending.

Fragment generator 648 is coupled to four buffer spaces in memory 128 including fragment link buffer 652, texture coordinate of fragment buffer 654, color of fragment buffer 656 and depth of fragment buffer 658. The operation of these buffers in memory is based on the same principle as will be discussed in reference with corresponding buffers in data cache 108. Rasterizer set-up buffer 622 is coupled to format converter 632 so as to provide the triangle parameters that are necessary for the rasterization process to complete. Furthermore, texture coordinate tile 624 is coupled to texture coordinate interpolator 636. Similarly, color tile 626 is coupled to color interpolator 638, and depth tile 628 is coupled to depth interpolator 640. Depth tile 628 holds the valid depth values of each triangle in a bin that is being processed.

Thus, during operation, 3D triangle rasterizer 607 reads triangle set-up data corresponding to the vertex of each triangle, including screen coordinates, texture coordinates, shading colors, depth and their partial differentials, dR/dX, dR/dY, etc. from data cache rasterizes set-up buffer 622. For these differentials, for example, R is red component of shading color and dR/dX means the difference of R for moving 1 pixel along x-direction. dR/dY means the difference of R for moving 1 pixel along y-direction. Using these set-up parameters, 3D triangle rasterizer 607 rasterizes inside of a given triangle by interpolation. By employing the Z-buffering only the results of visible triangles or portions thereof are stored in texture coordinate tile 624 and color tile 626. Thus, the Z value of each pixel is stored in tile 628. The Z value indicates the depth of a pixel away from the user's eyes. Thus, the Z values indicate whether a pixel is hidden by another object or not.

As a result, texture coordinate tile 624 stores texture-related information such as a texture map address and size, and texture coordinates for a tile. Texture coordinates are interpolated by texture coordinate interpolator 636 as a fixed point number and stored in texture coordinate tile 624 in the same fixed-point format. Similarly, color tile 626 defines a data structure that stores RGBA shading colors for visible pixels. Thus, the texture and color information provided after the rasterization relates to visible pixels in accordance with one embodiment of the invention.

Figure 23:
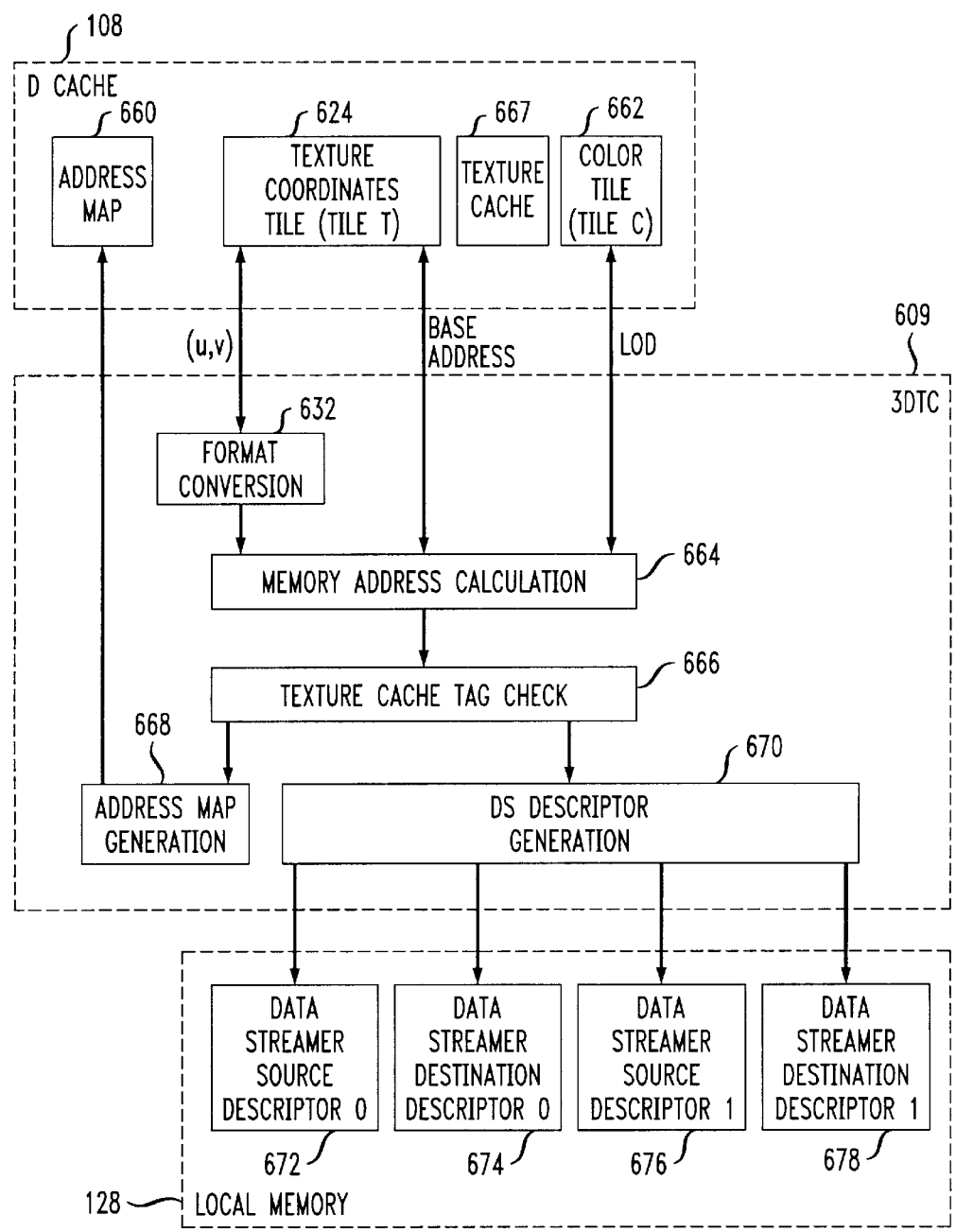
FIG. 23 is a block diagram of a 3D texture controller in accordance with one embodiment of the invention.

FIG. 23 illustrates a block diagram of a 3D texture controller 609 that is employed to generate texel addressed in accordance with one embodiment of the invention. 3D texture controller includes a format converter 632, coupled to a memory address calculator 664. The output port of memory address calculator is coupled to an input port of a texture cache tag check unit 666, which in turn is coupled to an address map generator 668 and a data streamer descriptor generator 670. 3D texture controller 609 is coupled to data cache 108.

Data cache 108 employs address map buffer 660, texture coordinate tile 624 and color tile 662 during the texture address generation as performed by 3D texture controller 609. Thus, address generator 668 provides address maps to address map buffer 660 of data cache 108. Furthermore, texture coordinate tile 624 provides the texture coordinates that were generated during the rasterization process to memory address calculator 664. Color tile 662 also provides color data to memory address calculator 664.

In response to the information provided by data cache 108, 3D texture controller 609 calculates memory addresses of necessary texels. Then, 3D texture controller 609 looks up cache tag 666 to check if the texel is in a predetermined portion of data cache 108 referred to as texture cache 667. If the cache hits, 3D Texture controller 609 stores the cache address into another data structure on the data cache 108 referred to as address map 660. Otherwise, 3D texture controller stores the missing cache line address as a data streamer descriptor so that data streamer 122 can move the line from memory 128 to texture cache 667. Address map 660 is also written during the cache-miss condition.

The data stored in address map 660 is employed at a later stage during texel filtering. Thus, address map buffer 660 is employed to indicate the mapping of texel addresses to pixels. The array stored in address map buffer 660 is a static array for the pixels in a bin and contains a pointer to the location in the buffer for the pixel to indicate which 4×4 texel block is applicable for a given pixel. The type of filter required is also stored in address map buffer 660.

Figure 24:
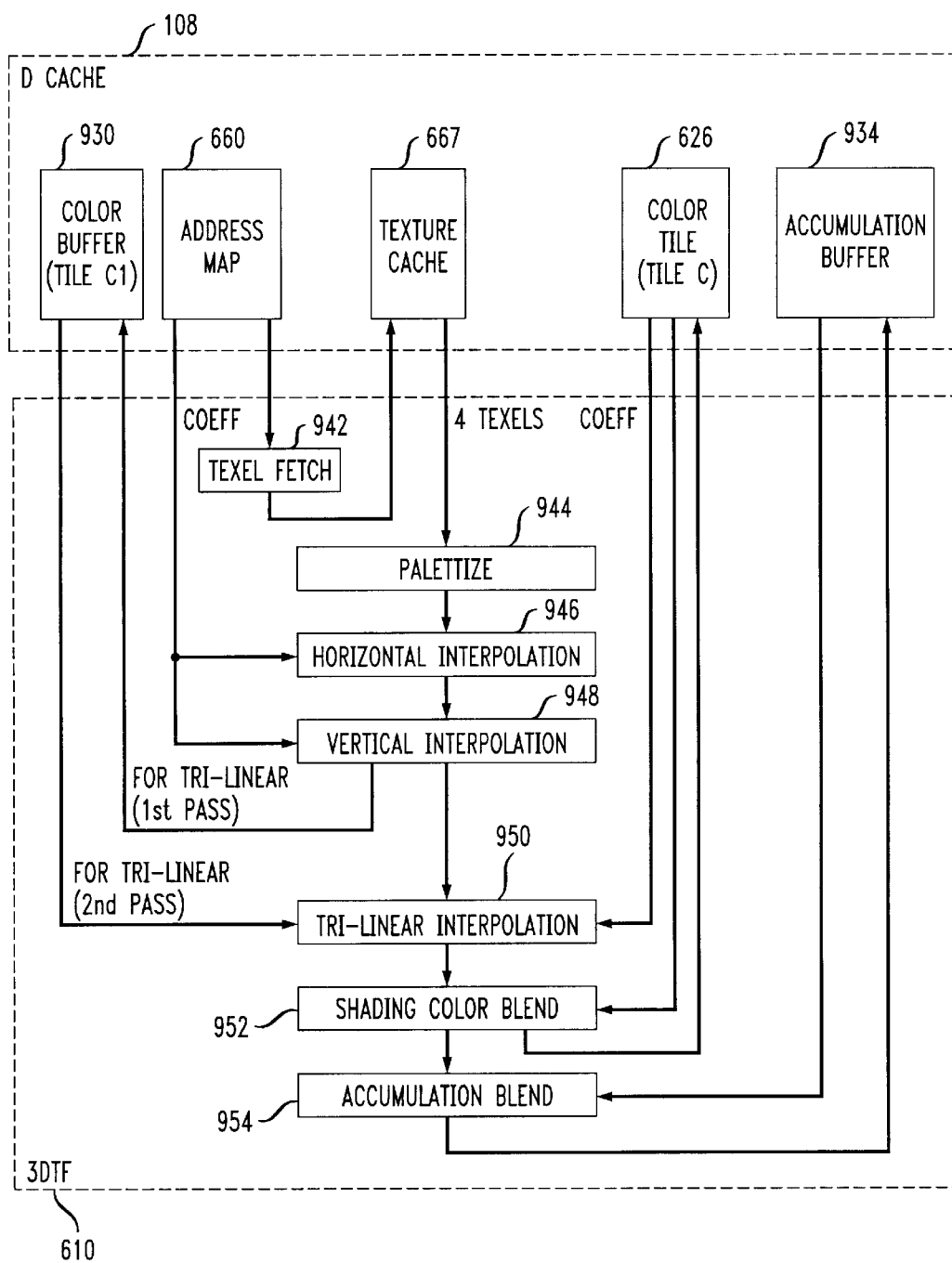
FIG. 24 is a block diagram of a 3D texture filter in accordance with one embodiment of the invention.

FIG. 24 illustrates 3D texture filter 610 in accordance with one embodiment of the invention. 3D texture filter 610 includes a texel fetch unit 942 that is configured to receive texel information from address map buffer 660. Information received by texel fetch unit 942 is in turn provided to texture cache 667 to indicate which texels in texture cache 667 need to be filtered next.

3D texture filter 610 also includes a palettize unit 944, which is configured to receive texels from texture cache 667. When the value in texture cache indicates the index of the texel colors, palettize unit 944 gets the texel color with the index from the table located in data cache. The output port of palettize unit 944 is coupled to a horizontal interpolator 946, which in turn is coupled to a vertical interpolator 948. Both horizontal interpolator 946 and vertical interpolator 948 are configured to receive coefficient parameters from address map buffer 660. The output port of vertical interpolator 948 is coupled to a tri-linear interpolator 950, which receives a coefficient parameter from color tile 622 for the first pass of interpolation and receives a coefficient parameter from a color buffer 930 for the second pass of interpolation.

It is noted that there are two kinds of coefficients in accordance with one embodiment of the invention. One coefficient is used for bi-linear interpolation and indicates how the weight of four neighborhood-texel colors are interpolated. The other coefficient is used for tri-linear interpolation, and indicates how the weight of two bi-linear colors are interpolated.

The output port of interpolator 950 is coupled to a shading color blend unit 952. Shading color blend unit 952 is also configured to receive color values from color tile 622. An output port of shading color blend unit 952 is coupled to color tile 622, and to accumulation blend unit 954. The output port of accumulation blend unit 954 is coupled to an input port of an accumulation buffer 934 that resides in data cache 108 in accordance with one embodiment of the invention.

During operation, 3D texture filter 610 performs bi-linear texture filtering. Input texels are read from texture cache 667 by employing memory addresses stored in address map buffer 660. The result of bi-linear filtering is blended with shading color in color tile 622 and written back into color tile 622 as a final textured color. When an accumulation is specified, the final color is blended into an accumulated color in accumulation buffer 934.

In order to perform tri-linear filtering two passes are required. In the first pass, 3D texture filter output bi-linear filtered result stored in color buffer 930. In the second pass, it generates the final tri-linear result by blending the color stored in color buffer 930 with another bi-linear filtered color.

The contents of palettize unit 944 is loaded from data cache 108 by activating 3D texture filter 610 in a set palette mode.

Bi-linear and tri-linear filtering employ a process that obtains the weighted sum of several neighboring texels. In accordance with one embodiment of the invention, a texel data is obtained by employing a vertical interpolation followed by a horizontal interpolation of neighboring texels. For example, the number of vertical texels may be 3 and the number of horizontal texels may be 5. Filtering is performed using specifiable coefficients. Thus, a filtering process is defined as the weighted sum of 15 texels and the final output T for a filtered texel is defined as follows:

$Tx = k11\ Txy + k12\ Txy+1 + k13\ Txy+2$ $Tx+1 = k21\ Tx+1y + k22\ Tx+1y+1 + k23\ Tx+1y+2$ $Tx+2 = k31\ Tx+2y + k32\ Tx+2y+1 + k33Tx+2y+2$ $Tx+3 = k41\ Tx+3y + k42\ Tx+3y+1 + k43\ Tx+3y+2$ $Tx+4 = k51\ Tx+4y + k52Tx+4y+1 + k53\ Tx+4y+2$ $Toutput = ka\ Tx + kb\ Tx+1 + kc\ Tx+2 + kd\ Tx+3 + kc\ Tx+4$ wherein T is a texel information corresponding to a fetched texel. It is noted that when the interpolation point is within the same grid as the previous one, there is no need to perform vertical interpolation in accordance with one embodiment of the invention. This follows because the result of vertical interpolation is the same as one of a previous computations. On the other hand, even the texel is within the same grid as the previous one, recalculation of the horizontal interpolation is necessary, because the relative position of the scaled texel on the grid may be different, thus the coefficient set is different.

Thus, as illustrated above, the core operation for texel filtering is multiplication and addition. In accordance with one embodiment of the invention, these function may be shared with multiplying and adding functions of video scaler 612 as illustrated in FIGS. 25a and 25b.

Figure 25A:
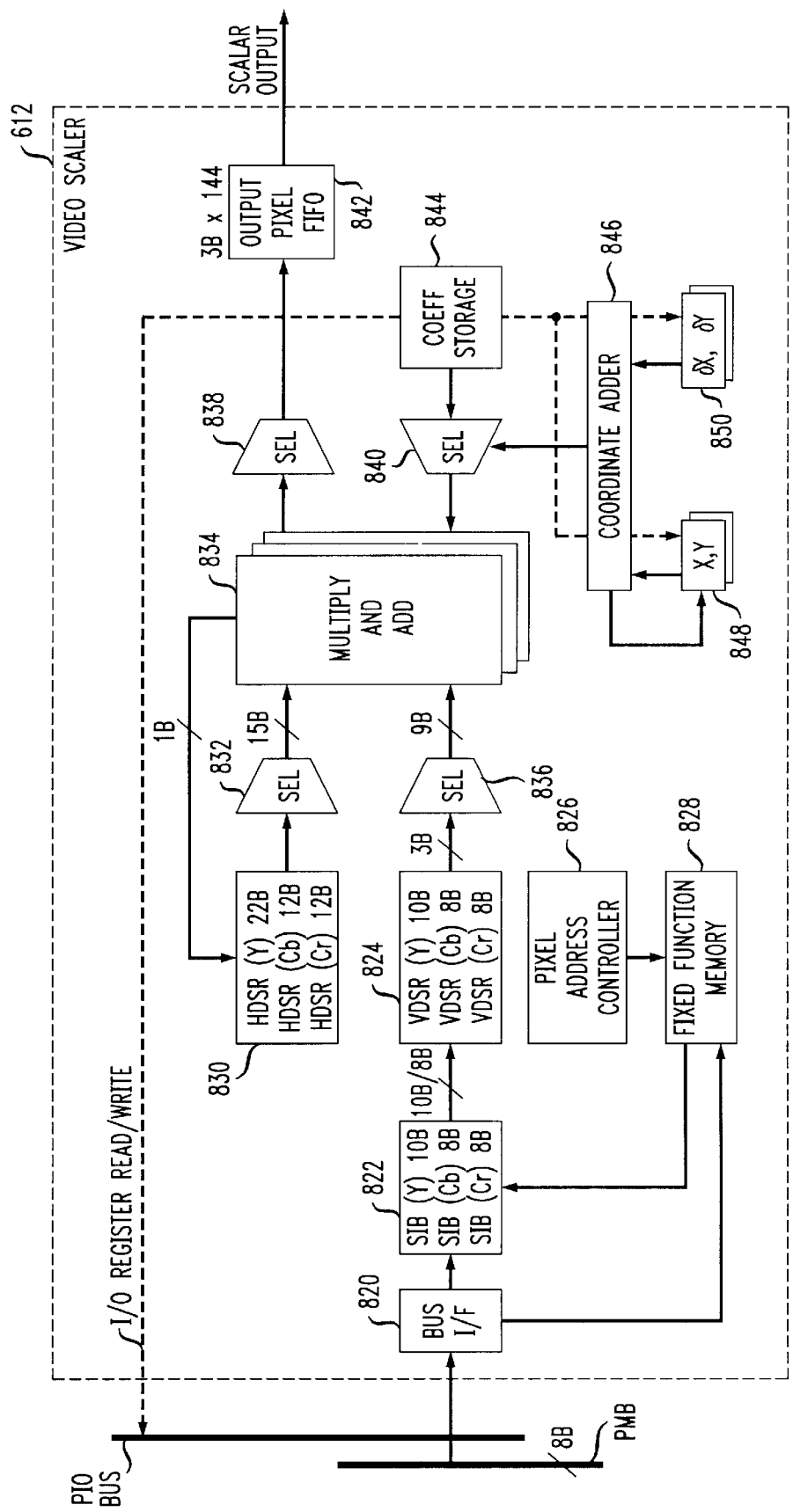
FIGS. 25(a) and 25(b) are block diagrams of a video scaler in accordance with one embodiment of the invention.
Figure 25B:
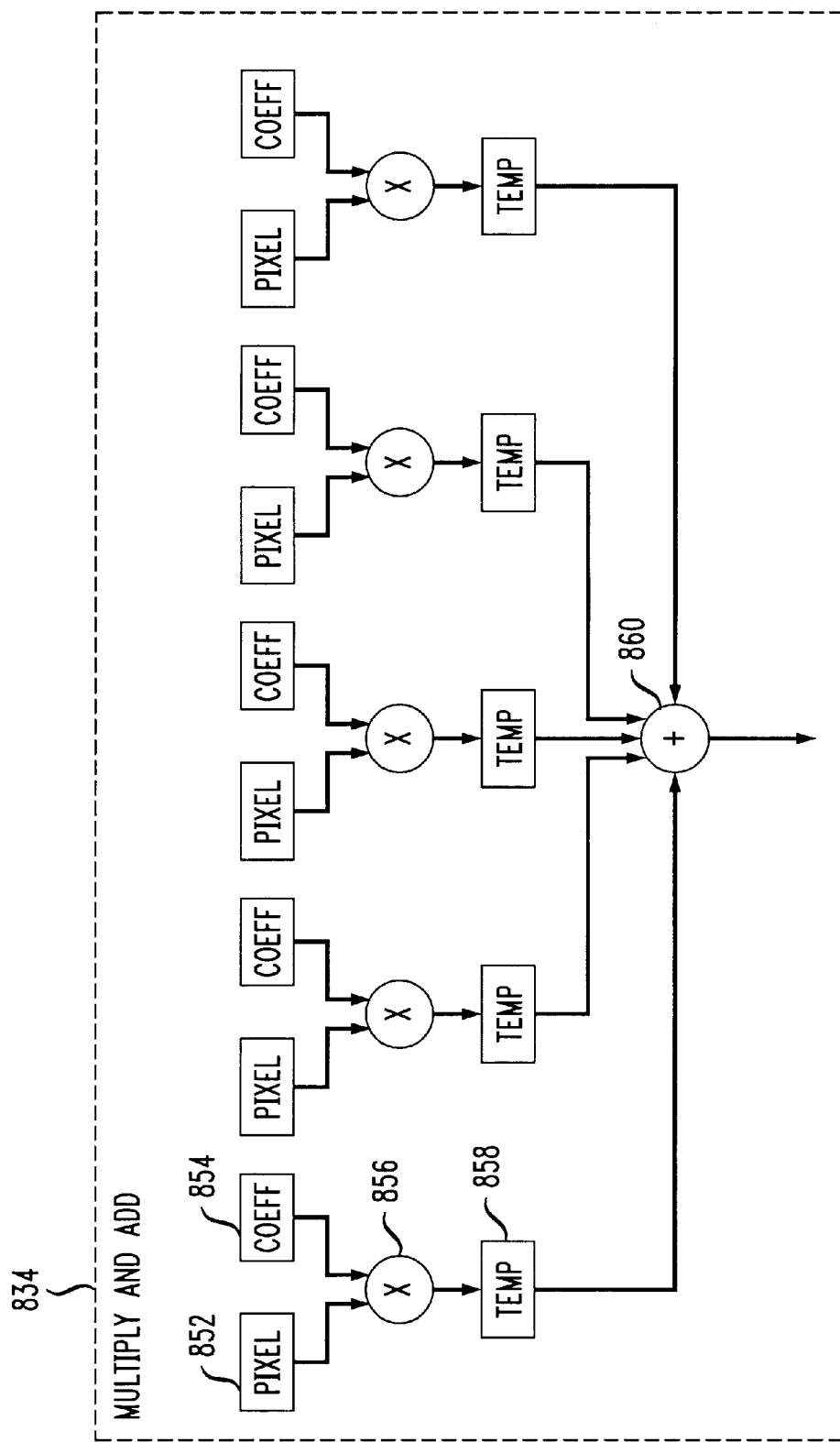

FIG. 25a illustrates a block diagram of video scaler 612 in accordance with one embodiment of the present invention. Video scaler 612 includes a bus interface 820 which is coupled to processor memory bus 114, and which is configured to send requests and receive pixel information therefrom. A fixed function memory 828 is coupled to bus interface unit 820 and is configured to receive YCbCr pixel data from memory 128 by employing data streamer 122. Fixed function memory 828 stores a predetermined portion of pixels that is preferably larger than a portion that is necessary for interpolation so as to reduce the traffic between memory 128 and video scaler 612.

A source image buffer 822 is coupled to fixed function memory 828, and is configured to receive pixel data that is sufficient to perform an interpolation operation. Pixel address controller 826 generates the address of pixel data that is retrieved from fixed function memory 828, for interpolation operation A vertical source data shift register 824 is coupled to source image buffer 822 and is configured to shift pixel data for multiply and add operation that is employed during an interpolation process. It is noted that when video scaler 612 is performing a filtering operation for 3D texture filter 610, vertical source data shift register 824 is configured to store and shift appropriate texel data for the multiply and add operation.

A horizontal source data shift register 830 is configured to store intermediate vertically interpolated pixels, as derived by multiply and add circuit 834. The data in horizontal data shift register 830 can be used again for multiplication and adding operation.

A coefficient storage unit 844 is configured to store prespecified coefficients for interpolation operation. Thus, when video scaler 612 is performing a filtering operation for 3D texture filter 610, coefficient storage unit 844 stores filtering coefficients for texels, and, when video scaler 612 is performing a scaling operation, coefficient storage unit 844 stores interpolation coefficients for pixels.

A coordinate adder 846 is coupled to a selector 840 to control the retrieval of appropriate coefficients for the multiply and add operation. Coordinate adder 846 is in turn coupled to an x,y base address, which correspond to the coordinates of a starting pixel, or texel. A Δ unit 850, is configured to provide the differential for vertical and horizontal directions for the coordinates of a desired scaled pixel on the non-scaled original pixel plane.

Multiply and add unit 834 is configured to perform the multiply and add operations as illustrated in FIG. 25b in accordance with one embodiment of the invention, although the invention is not limited in scope in that respect. Thus, multiply and add unit 834 comprises a plurality of pixel and coefficient registers 852, and 854, which are multiplied by multiplier 856 to generate a number via adder 860.

An output pixel first-in-first-out FIFO buffer 842 is configured to store the derived pixels for output to a display refresh unit, such as 226, or to data cache 108, depending on the value of a corresponding control bit in video scaler control register.

During operation, in accordance with one embodiment of the invention, video scaler 612 reads YCbCr pixel data from memory 128 using data streamer 122, and places them in fixed function memory 828. Thereafter, appropriate bits corresponding to Y, Cb, Cr pixel data are read from fixed function memory 828 using pixel address controller 826. The retrieved data is written into three source image buffer spaces in source image buffer 822 corresponding to Y, Cb and Cr data. When vertical source data shift registers have empty space, source image buffer 822 provides a copy of its data to vertical source data shift registers. For vertical interpolations, intermediate vertically interpolated pixels are stored in horizontal source data shift register 830.

The sequence for vertical and horizontal interpolations depends on the scaling factor. In accordance with one embodiment of the invention, there are three multiply and add units 834 in video scaler 612 so that three vertical and three horizontal interpolations can be performed simultaneously.

Figure 27:
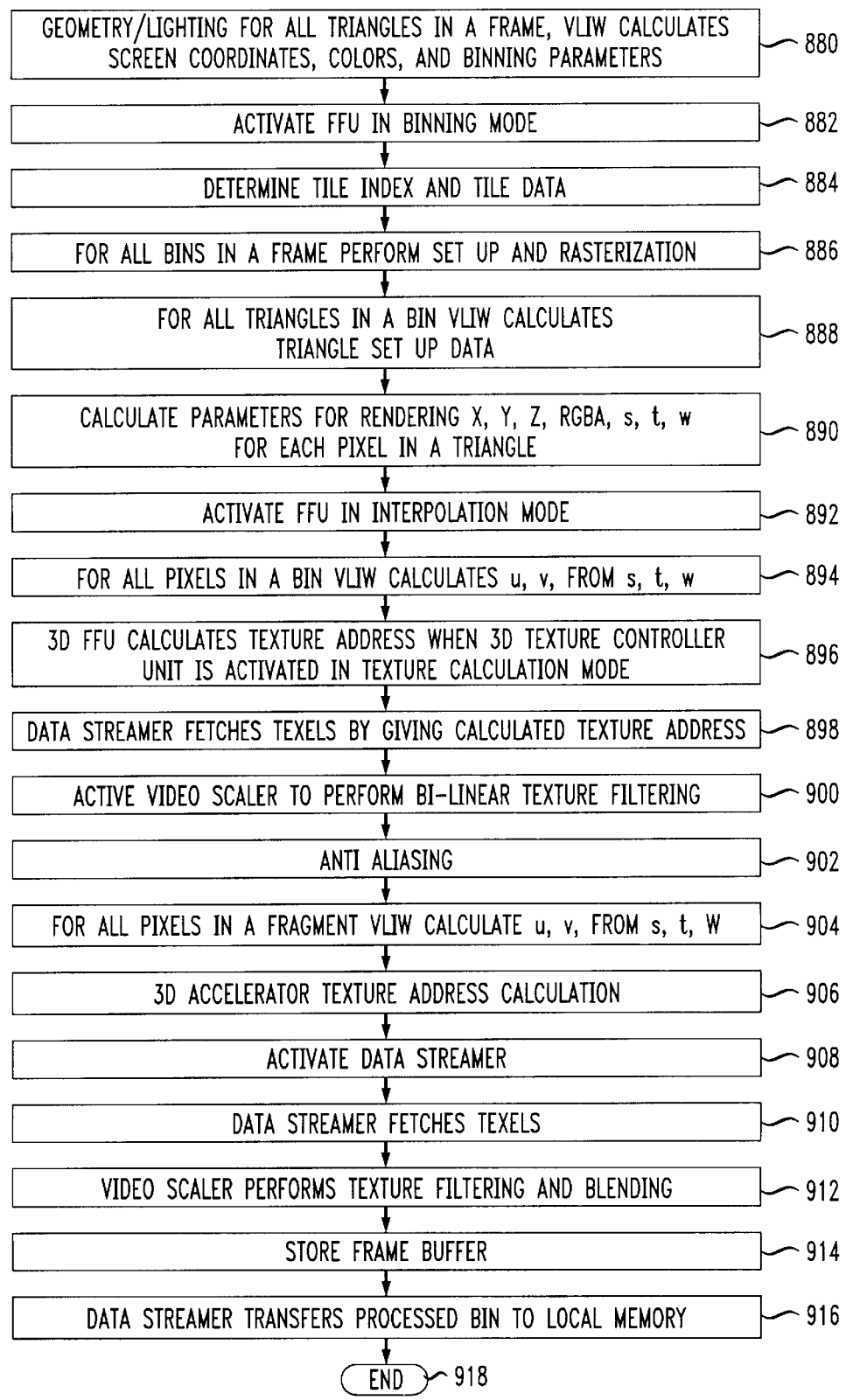
FIG. 27 is a flow chart illustrating the process for implementing 3D graphics in accordance with one embodiment of the invention.

FIG. 27 is a flow chart summarizing the steps involved in 3D graphics processing as discussed in connection with FIGS. 20–26. Thus, at step 880, VLIW processor 102 calculates geometry data by calculating screen coordinates, colors and binning parameters for all triangles inside a frame. At step 882 fixed function unit is activated for binning by providing binning indication signal to 3D triangle rasterizer 607. As a result of binning, tile index and tile data for all bins are calculated at step 884.

At step 886, for all bins in a frame set-up and interpolation for visible pixels within triangles begins. Thus, VLIW 102 calculates triangle set-up data at step 888. At step 890, 3D triangle rasterizer calculates parameters for rendering including x,y,z, RGBA, [s,t, and w] for each pixel in a triangle, by activating 3D triangle rasterizer 607 in interpolation mode at step 892. The s, t, and w parameters are homogeneous texture coordinates and are employed for, what is know as, perspective correction. Homogeneous texture coordinates indicate which texel does a pixel correspond with.

For all pixels in a bin VLIW 102 calculates texture coordinates for each pixel in response to s,t, w calculations obtained by 3D triangle rasterizer 607. At step 896 3D texture controller 609 calculates the texture addresses. At step 898 data streamer 122 fetches texels from memory 128 in response to calculated texture addresses. It is noted that while data streamer 122 is fetching texels corresponding to a bin, VLIW processor 102 is calculating texture coordinates u,v corresponding to a following bin. This is possible because of the structure of data cache 108 which allows access to cache by fixed function unit in accordance with one embodiment of the invention.

At step 900, video scaler 612 is activated in conjunction with 3D texture filter 610 to perform texel filtering on a portion of fetched filters.

In accordance with one embodiment of the invention at steps 902 through 912 3D graphics unit performs anti-aliasing and α blending for all pixels in a fragment based on the same principles discussed in connection with steps 894 through 900. At step 914 the data derived by fixed function unit is stored in a frame buffer, by employing data streamer 122 to transfer data to a local memory space, such as one in SDRAM 128.

Thus, the present invention allows for a binning process by employing data cache in a multimedia processor, and storing corresponding data relating to each bin in the data cache. Furthermore, in accordance with one aspect of the invention, before fetching texels, the visible pixels of a triangle are first identified and thus, only corresponding texels are retreived from a local memory.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. An integrated circuit having, a multimedia processor for performing three dimensional graphics processing comprising:

a microprocessor circuit configured to generate triangle set-up information corresponding to a plurality of triangles that define a three dimensional object displayed on a screen, wherein said screen is defined by a plurality of bins having a predetermined number of pixels;

a data cache directly coupled to said microprocessor configured to store said triangle set-up information; and a three dimensional triangle rasterizer directly coupled to said data cache and configured to perform bin allocation to triangles associated with said triangle set-up information so as to identify all bins that intersect with a triangle on said screen, wherein, said data cache having at least two ports allows said microprocessor and said three dimensional triangle rasterizer to access said data cache simultaneously.

2. The multimedia processor in accordance with claim 1, wherein said data cache includes a tile index buffer, that stores information relating to each one of said bins.

3. The multimedia processor in accordance with claim 2, wherein said three dimensional triangle rasterizer includes a binning unit that provides tile data information to a local memory unit.

4. The multimedia processor in accordance with claim 3, wherein said three dimensional triangle rasterizer includes a screen coordinate interpolator, that provides the coordinates of intersecting pixels along the sides of each triangle that cross a span line as defined by said binning unit.

5. The multimedia processor in accordance with claim 4 wherein said binning unit provides a tile data information corresponding to the identification of each triangle in a bin.

6. The multimedia processor in accordance with claim 5, wherein said binning unit divides each one of said triangles into an upper and a lower sub triangles along a horizontal line crossing the middle vertex of each one of said triangles.

7. The multimedia processor in accordance with claim 6, wherein said binning unit identifies said bins in which each one of said upper triangles is located by employing the condition $$X=[\min 2(\text{Cross}XAC, \text{Cross}XAC+dxdy\,AC), \max 2 (\text{Cross}XAB, \text{Cross } XAB+dxdyAB)]$$

wherein, Cross XAC is the x coordinate of the cross point between the edge AC of a triangle ABC, and the next span, and, Cross XAB is the x coordinate of the cross point between the edge AB and the next span.

8. The multimedia processor in accordance with claim 6, wherein said binning unit identifies said bins in which each one of said lower triangles is located by employing the condition $$X=[\min 2(\text{Cross } XAC, \text{Cross } XAC+dxdyAC), \max 3 (\text{Cross } XAB, Bx, \text{Cross } XBC)],$$

wherein Cross XAC is the x coordinate of the cross point between the edge AC of a triangle ABC, and the next span, CrossXBC is the x coordinate of the cross point between BC and the next span.

9. The multimedia processor in accordance with claim 3, further comprising a memory unit coupled to said data cache configured to store said tile index information.

10. The multimedia processor in accordance with claim 9, further comprising a data streamer coupled to said memory unit and said data cache configured to transfer data.

11. An integrated circuit having, a multimedia processor for performing three dimensional graphics processing comprising:

a microprocessor circuit configured to generate triangle set-up information corresponding to a plurality of triangles that define a three dimensional object displayed on a screen, wherein said screen is defined by a plurality of bins having a predetermined number of pixels;

a data cache directly coupled to said microprocessor configured to store said triangle set-up information; and a three dimensional triangle rasterizer directly coupled to said data cache and configured to perform bin allocation to said triangles so as to provide pixel information for all pixels within each said triangle to said data cache, wherein said data cache having at least two ports allows said microprocessor and said three dimensional triangle rasterizer to access said data cache simultaneously.

12. The multimedia processor in accordance with claim 11, wherein said three dimensional triangle rasterizer comprises:

a texture coordinate interpolator coupled to said data cache and configured to receive triangle set up information corresponding to each one of said triangles;

a shading color interpolator coupled to said data cache and configured to receive said triangle set-up information corresponding to each one of said triangles; and a depth interpolator coupled to said data cache and configured to receive said triangle set-up information corresponding to each one of said triangles.

13. The multimedia processor in accordance with claim 12, wherein said texture coordinate interpolator provides texture coordinates of each pixel within said triangles to said data cache.

14. The multimedia processor in accordance with claim 12, wherein said texture coordinate interpolator provides texture coordinates of each pixel that will be visible on said screen to said data cache.

15. The multimedia processor in accordance with claim 14, further comprising a three dimensional texture controller coupled to said data cache and configured to generate the memory location of said pixels that will be visible on said screen.

16. The multimedia processor in accordance with claim 12 wherein said shading color interpolator provides shading color coordinates of each pixel within said triangles to said data cache.

17. The multimedia processor in accordance with claim 12 wherein said shading color interpolator provides shading color coordinates of each pixel that will be visible on said screen to said data cache.

18. The multimedia processor in accordance with claim 17 further comprising a three dimensional texture controller coupled to said data cache and configured to generate the memory location of said pixels that will be visible on said screen.

19. An integrated circuit having, a multimedia processor for performing three dimensional graphics processing comprising:

a microprocessor circuit configured to generate triangle set-up information corresponding to a plurality of triangles that define a three dimensional object displayed on a screen, wherein said screen is defined by a plurality of bins having a predetermined number of pixels;

a data cache directly coupled to said microprocessor configured to store said triangle set-up information;

a three dimensional triangle rasterizer directly coupled to said data cache and configured to perform bin allocation to said triangles so as to identify all bins that intersect with a triangle on said screen;

a three dimensional texture filter coupled to said data cache and configured to perform filtering of texels received in response to said pixel information provided by said triangle rasterizer; and a video scaler coupled to said texture filter and configured to perform scaling operation for providing a scaled image to a display screen, wherein said data cache having at least two ports allows said microprocessor and said three dimensional rasterizer to access said data cache simultaneously.

20. The multimedia processor in accordance with claim 19 wherein said video scaler comprises a multiply and add unit configured to multiply information corresponding to a plurality of neighboring vertical and horizontal pixels with a predetermined coefficient associated with each pixel.

21. The multimedia processor in accordance with claim 20 wherein said texture filter includes a horizontal and a linear interpolator coupled to said data cache, and configured to interpolate a plurality of horizontal and vertical texels.

22. The multimedia processor in accordance with claim 21, wherein said linear interpolators receive their interpolation results from said multiply and add unit of said video scaler.

* * * * *

UNITED STATES PATENT AND TRADEMARK OFFICE
CERTIFICATE OF CORRECTION

PATENT NO.     : 6,608,625 B1
DATED          : August 19, 2003
INVENTOR(S)    : Chen et al.

It is certified that error appears in the above-identified patent and that said Letters Patent is hereby corrected as shown below:

<u>Title page,</u>
Item [12], should read -- Chen et al. --
Item [75], Inventor, "Ken C. Chin" should read -- Ken C. Chen --.

Signed and Sealed this

Sixth Day of January, 2004

JAMES E. ROGAN
*Director of the United States Patent and Trademark Office*